US010490023B2

(12) United States Patent
Takeda

(10) Patent No.: US 10,490,023 B2
(45) Date of Patent: Nov. 26, 2019

(54) IMAGING SYSTEM

(71) Applicant: Universal Entertainment Corporation, Koto-ku, Tokyo (JP)

(72) Inventor: Kengo Takeda, Tokyo (JP)

(73) Assignee: UNIVERSAL ENTERTAINMENT CORPORATION, Tokyo (JP)

(*) Notice: Subject to any disclaimer, the term of this patent is extended or adjusted under 35 U.S.C. 154(b) by 135 days.

(21) Appl. No.: 15/464,276

(22) Filed: Mar. 20, 2017

(65) Prior Publication Data

US 2017/0278348 A1 Sep. 28, 2017

(30) Foreign Application Priority Data

Mar. 23, 2016 (JP) ................................ 2016-058906

(51) Int. Cl.
*G07F 17/32* (2006.01)
*G06K 9/00* (2006.01)
*H04N 7/18* (2006.01)
*H04N 5/232* (2006.01)

(52) U.S. Cl.
CPC ..... *G07F 17/3241* (2013.01); *G06K 9/00375* (2013.01); *G07F 17/3206* (2013.01); *G07F 17/3239* (2013.01); *H04N 7/181* (2013.01); *H04N 7/188* (2013.01); *H04N 5/23296* (2013.01)

(58) Field of Classification Search
CPC ............. G07F 17/3241; G07F 17/3206; G07F 17/3239; G06K 9/00375; H04N 5/23296; H04N 7/181; H04N 7/188

USPC .......................................................... 463/25
See application file for complete search history.

(56) References Cited

U.S. PATENT DOCUMENTS

| 5,801,766 | A  | * | 9/1998 | Alden ....................... | A63F 5/00 273/142 R |
|---|---|---|---|---|---|
| 6,641,484 | B2 | * | 11/2003 | Oles ......................... | G07F 17/32 463/47 |
| 2004/0048661 | A1 | * | 3/2004 | Oles ......................... | G07F 17/32 463/29 |
| 2005/0064926 | A1 | * | 3/2005 | Walker ..................... | G07F 17/32 463/16 |
| 2009/0118002 | A1 | * | 5/2009 | Lyons ...................... | G06Q 30/02 463/29 |
| 2014/0323193 | A1 | * | 10/2014 | Keilwert .............. | G07F 17/3206 463/16 |

* cited by examiner

*Primary Examiner* — Allen Chan
(74) *Attorney, Agent, or Firm* — Potomac Law Group, PLLC; Kenneth Fagin

(57) ABSTRACT

An object is to achieve appropriate imaging of a fraud person.

An imaging system includes: a gaming machine provided in a facility and including an imager; an imaging device provided in the facility and operable to image the gaming machine; and an information processing device communicable with the gaming machine and the imaging device. The imager images a person existing in front of the gaming machine. Upon obtaining information concerning a fraud in the gaming machine, the information processing device instructs the imaging device to perform imaging under a predefined imaging condition that covers surroundings of the gaming machine.

6 Claims, 46 Drawing Sheets

FIG. 11

SYMBOL COMBINATION TABLE

| COMBINATION OF SYMBOLS | | | | | THE NUMBER OF PAYOUTS | WINNING COMBINATION |
|---|---|---|---|---|---|---|
| 1st VIDEO REEL | 2nd VIDEO REEL | 3rd VIDEO REEL | 4th VIDEO REEL | 5th VIDEO REEL | | |
| RED | RED | RED | RED | RED | 15 | RED |
| APPLE | APPLE | APPLE | APPLE | APPLE | 12 | APPLE |
| BLUE 7 | BLUE 7 | BLUE 7 | BLUE 7 | BLUE 7 | 10 | BLUE |
| BELL | BELL | BELL | BELL | BELL | 8 | BELL |
| CHERRY | CHERRY | CHERRY | CHERRY | CHERRY | 5 | CHERRY3 |
| STRAWBERRY | STRAWBERRY | STRAWBERRY | STRAWBERRY | STRAWBERRY | 5 | STRAWBERRY |
| PLUM | PLUM | PLUM | PLUM | PLUM | 4 | PLUM |
| ORANGE | ORANGE | ORANGE | ORANGE | ORANGE | 3 | ORANGE3 |
| CHERRY | CHERRY | CHERRY | (ANY) | (ANY) | 2 | CHERRY2 |
| ORANGE | ORANGE | ORANGE | (ANY) | (ANY) | 2 | ORANGE2 |
| CHERRY | (ANY) | (ANY) | (ANY) | (ANY) | 1 | CHERRY1 |
| ORANGE | (ANY) | (ANY) | (ANY) | (ANY) | 1 | ORANGE1 |

FIG. 23

| PLAYER IDENTIFICATION CODE | NAME OF MEMBER | ICON DATA | ... | PLAYER CLASS | FACE IMAGE DATA | SUSPICIOUS PERSON IDENTIFIER |
|---|---|---|---|---|---|---|
| 0001 | ○○○○ | ..¥image0001.jpg | ... | VIP | ..¥face0001.jpg | 0 |
| 0002 | △△△△ | ..¥image0002.jpg | ... | MEMBER | ..¥face0002.jpg | 0 |
| 0003 | ▽▽▽▽ | ..¥image0003.jpg | ... | MEMBER | ..¥face0003.jpg | 0 |
| 0004 | □□□□ | ..¥image0004.jpg | ... | VISITOR | ..¥face0004.jpg | 0 |
| 0005 | ××××× | ..¥image0005.jpg | ... | MEMBER | ..¥face0005.jpg | 1 |
| 0006 | ◎◎◎◎ | ..¥image0006.jpg | ... | MEMBER | ..¥face0006.jpg | 0 |
| 0007 | ◇◇◇◇ | ..¥image0007.jpg | ... | MEMBER | ..¥face0007.jpg | 0 |
| 0008 | ◁◁◁◁ | ..¥image0008.jpg | ... | VIP | ..¥face0008.jpg | 0 |
| 0009 | ☆☆☆☆ | ..¥image0009.jpg | ... | VISITOR | ..¥face0009.jpg | 0 |
| ... | ... | ... | ... | ... | ... | ... |

FIG. 24

| APPARATUS IDENTIFICATION CODE | IP ADDRESS | APPARATUS IDENTIFIER | OBJECT DATA | COORDINATE DATA | APPARATUS STATUS |
|---|---|---|---|---|---|
| 0001 | 192.168.52.4 | GM-1 | obj0001 | (x1, y1) | ON LINE |
| 0002 | 192.168.52.8 | GM-2 | obj0002 | (x2, y2) | ON LINE |
| 0003 | 192.168.52.13 | GM-3 | obj0003 | (x3, y3) | ON LINE |
| 0004 | 192.168.52.22 | GM-4 | obj0004 | (x4, y4) | ON LINE |
| 0005 | 192.168.52.28 | GM-8 | obj0005 | (x5, y5) | ON LINE |
| 0006 | 192.168.52.29 | GM-10 | obj0006 | (x6, y6) | ERROR |
| 0007 | 192.168.52.48 | GM-9 | obj0007 | (x7, y7) | ON LINE |
| 0008 | 192.168.52.51 | KIOSK-1 | obj0008 | (x8, y8) | ON LINE |
| 0009 | 192.168.52.09 | SIGNAGE-1 | obj0009 | (x9, y9) | ON LINE |
| 0010 | 192.168.52.10 | GM-5 | obj0010 | (x10, y10) | ON LINE |
| 0011 | 192.168.52.11 | GM-11 | obj0011 | (x11, y11) | OFF LINE |
| 0012 | 192.168.52.12 | GM-12 | obj0012 | (x12, y12) | JACKPOT |
| 0013 | 192.168.52.35 | GM-13 | obj0013 | (x13, y13) | HAND PAY |
| 0014 | 192.168.52.14 | GM-14 | obj0014 | (x14, y14) | MAINTENANCE |
| ... | ... | ... | ... | ... | ... |
| 6006 | 192.168.52.16 | CAMERA-1 | obj0016 | (x16, y16) | ON LINE |
| 6007 | 192.168.52.17 | CAMERA-2 | obj0017 | (x17, y17) | ON LINE |
| ... | ... | ... | ... | ... | ... |

FIG. 25

| SLOT MACHINE, ETC. | | MONITOR CAMERA A | | MONITOR CAMERA B | | MONITOR CAMERA C | | ... | MONITOR CAMERA n | |
|---|---|---|---|---|---|---|---|---|---|---|
| APPARATUS ID CODE | SETTING FILE | APPARATUS ID CODE | SETTING FILE | APPARATUS ID CODE | SETTING FILE | APPARATUS ID CODE | SETTING FILE | | APPARATUS ID CODE | SETTING FILE |
| 0010 | ..¥setting10¥0010.ini | 6008 | ..¥setting10¥6008.ini | 6009 | ..¥setting10¥6009.ini | — | — | ... | — | — |
| 0011 | ..¥setting11¥0011.ini | 6011 | ..¥setting11¥6011.ini | 6012 | ..¥setting11¥6012.ini | 6023 | ..¥setting11¥6023.ini | ... | — | — |
| 0012 | ..¥setting12¥0012.ini | 6053 | ..¥setting12¥6053.ini | 6054 | ..¥setting12¥6054.ini | 6055 | ..¥setting12¥6055.ini | ... | — | — |
| 0013 | ..¥setting13¥0013.ini | 6066 | ..¥setting13¥6066.ini | 6067 | ..¥setting13¥6067.ini | — | — | ... | — | — |
| 0014 | ..¥setting14¥0014.ini | 6083 | ..¥setting14¥6083.ini | 6084 | ..¥setting14¥6084.ini | 6085 | ..¥setting14¥6085.ini | ... | 6087 | ..¥setting14¥6087.ini |
| ... | ... | ... | ... | ... | ... | ... | ... | ... | ... | ... |

FIG. 26

| SETTING ITEM | REMARKS |
|---|---|
| RESOLUTION | RESOLUTION SET IN CAMERA, UNLESS DESIGNATED |
| VIDEO IMAGE FORMAT | JPEG, MPEG-4, H.264, ETC. |
| MAXIMUM FRAME RATE | SET WITHIN RANGE OF 0.1 to 30 FRAMES/SEC. |
| AUDIO RECORDING | ACTIVE/INACTIVE |
| CAMERA POSITION AT THE TIME OF STARTING VIDEO RECORDING | PRESET DESIGNATION |
| IMAGE QUALITY | EXPOSURE, WHITE BALANCE, ETC. |
| FOCUS | DESIGNATE FROM MULTIPLE LEVELS (e.g., FAR, NEAR) |
| EXTERNAL DEVICE OUTPUT | ACTIVE/INACTIVE |
| VIDEO RECORDING TIME BEFORE AND AFTER EVENT | EVENT: DETECTION OF FRAUD, ETC. |

FIG. 27

| APPARATUS ID CODE OF USED MONITOR CAMERA | APPARATUS ID CODE OF MONITORING OBJECT | HAND AREA IMAGING IDENTIFIER |
|---|---|---|
| 0005 | 0005 | 0 |
| 6006 | 0005 | 1 |
| 6007 | 0005 | 0 |
| 0010 | 0010 | 1 |
| 6008 | 0010 | 0 |
| 6009 | 0010 | 0 |
| . . . | . . . | . . . |

FIG. 28

| IMAGING AREA CLASSIFICATION | MONITOR CAMERA A | | MONITOR CAMERA B | | MONITOR CAMERA C | | ... | MONITOR CAMERA n | |
|---|---|---|---|---|---|---|---|---|---|
| | APPARATUS ID CODE | SETTING FILE | APPARATUS ID CODE | SETTING FILE | APPARATUS ID CODE | SETTING FILE | | APPARATUS ID CODE | SETTING FILE |
| AREA0001 | 6006 | ..¥tracking1¥6008.ini | — | — | — | — | | — | — |
| AREA0002 | 6008 | ..¥tracking2¥6008.ini | 6009 | ..¥tracking2¥6009.ini | 6010 | ..¥tracking2¥6010.ini | | 6012 | ..¥tracking2¥6012.ini |
| AREA0003 | 6025 | ..¥tracking3¥6025.ini | 6026 | ..¥tracking3¥6026.ini | — | — | | — | — |
| AREA0004 | 6055 | ..¥tracking4¥6055.ini | 6056 | ..¥tracking4¥6056.ini | 6057 | ..¥tracking4¥6057.ini | | — | — |
| AREA0005 | 6096 | ..¥tracking5¥6096.ini | 6097 | ..¥tracking5¥6097.ini | — | — | | — | — |
| ... | ... | ... | ... | ... | ... | ... | | ... | ... |

FIG. 33

| ENTERING/EXITING PERSON ID NO. | REGISTERED IMAGES | | | APPARATUS ID CODE OF SLOT MACHINE, ETC., WHERE PERSON IS SEATED | SUSPICIOUS PERSON INFORMATION | | ENTRY TIME | EXIT TIME |
|---|---|---|---|---|---|---|---|---|
| | FACE IMAGE DATA | CLOTHES (BOTTOM CLOTHES) IMAGE DATA | SHOES IMAGE DATA | | NUMBER OF TIMES OF SUSPICIOUS PERSON DETECTION | TRACKING IDENTIFIER | | |
| USR0000000001 | ..¥face¥0000000001.bmp | ..¥bottom¥0000000001.bmp | ..¥shoes¥0000000001.bmp | 0006 | 10 | 1 | 2016/2/22 17:00:05 | |
| USR0000000002 | ..¥face¥0000000002.bmp | ..¥bottom¥0000000002.bmp | ..¥shoes¥0000000002.bmp | | 0 | 0 | 2016/2/22 17:01:05 | 2016/2/22 17:21:36 |
| USR0000000003 | ..¥face¥0000000003.bmp | ..¥bottom¥0000000003.bmp | ..¥shoes¥0000000003.bmp | 0003 | 0 | 0 | 2016/2/22 17:03:51 | |
| USR0000000004 | ..¥face¥0000000004.bmp | ..¥bottom¥0000000004.bmp | ..¥shoes¥0000000004.bmp | 0001 | 0 | 0 | 2016/2/22 17:11:43 | |
| USR0000000005 | ..¥face¥0000000005.bmp | ..¥bottom¥0000000005.bmp | ..¥shoes¥0000000005.bmp | | 5 | 1 | 2016/2/22 17:23:20 | 2016/2/22 17:32:41 |
| USR0000000006 | ..¥face¥0000000006.bmp | ..¥bottom¥0000000006.bmp | ..¥shoes¥0000000006.bmp | | 0 | 0 | 2016/2/22 17:36:33 | 2016/2/22 17:40:25 |
| USR0000000007 | ..¥face¥0000000007.bmp | ..¥bottom¥0000000007.bmp | ..¥shoes¥0000000007.bmp | 0005 | 0 | 0 | 2016/2/22 17:40:16 | |
| USR0000000008 | ..¥face¥0000000008.bmp | ..¥bottom¥0000000008.bmp | ..¥shoes¥0000000008.bmp | | 0 | 0 | 2016/2/22 17:41:06 | |
| ... | ... | ... | ... | ... | ... | ... | ... | ... |

FIG. 34

| ENTERING/EXITING PERSON ID NO. | IMAGING AREA CLASSIFICATION (CURRENT POSITION) | IMAGING TIME/DATE | APPARATUS ID CODE FOR MONITORING | OBTAINED IMAGE |
|---|---|---|---|---|
| USR0000000001 | AREA0001 | 2016/2/22 17:42:46 | 6006 | ..¥tracking¥16022217 4246.bmp |
| USR0000000001 | AREA0001 | 2016/2/22 17:42:51 | 6006 | ..¥tracking¥16022217 4251.bmp |
| USR0000000001 | AREA0001 | 2016/2/22 17:42:56 | 6006 | ..¥tracking¥16022217 4256.bmp |
| USR0000000001 | AREA0001 | 2016/2/22 17:43:01 | 6006 | ..¥tracking¥16022217 4301.bmp |
| USR0000000001 | AREA0005 | 2016/2/22 17:43:06 | 6096 | ..¥tracking¥16022217 4306.bmp |
| USR0000000001 | AREA0005 | 2016/2/22 17:43:11 | 6097 | ..¥tracking¥16022217 4311.bmp |
| ... | ... | ... | ... | ... |

IMAGING SYSTEM

CROSS-REFERENCE TO RELATED APPLICATION

This application claims the benefit of Japanese Patent Application No. 2016-058906, filed Mar. 23, 2016, which application is incorporated herein by reference in its entirety.

FIELD OF THE INVENTION

The present invention relates to an imaging system that performs imaging in relation to a fraud.

BACKGROUND OF THE INVENTION

In a game arcade as exemplified as a casino, a fraud in which a fake playing chip is used on a table game, a fraud in which a radio wave transmitter is used to transmit a high-intensity radio wave to a gaming machine to forcibly provoke a jackpot or make medals paid out, and the like, may be committed. To find and prevent a fraud, the game arcade adopts various kinds of monitor devices, monitor systems, and the like, to check whether or not unauthorized behaviors, unauthorized wins and losses, unauthorized cash flows, etc., are occurring.

Recently, a technique is disclosed that enables a fraud to be found by monitoring player's behaviors with a camera provided in a game table device (see specification of U.S. Pat. No. 8,506,401).

This however involves a problem that, even though a player's fraud can be imaged by such a technique, a player who has committed a fraud cannot be dealt with or caught if the player leaves the game table device.

The present invention was accomplished in view of the problems described above, and an object of the present invention is to provide an imaging system capable of appropriately imaging a fraud person.

Objects of the present invention, problems to be solved by the present invention, and effects (benefits) of the present invention should be understood from the claims, and should not be wrongly interpreted from the following description.

BRIEF SUMMARY OF THE INVENTION

In a first aspect of the present invention, an imaging system of the present invention includes:

a gaming machine provided in a facility and including an imager;

an imaging device provided in the facility and operable to image the gaming machine; and an information processing device communicable with the gaming machine and the imaging device, the imager operable to image a person existing in front of the gaming machine, the information processing device operable to, upon obtaining information concerning a fraud in the gaming machine, instruct the imaging device to perform imaging under a predefined imaging condition that covers surroundings of the gaming machine.

In the above-described configuration, a person existing in front of a gaming machine is imaged, and if information concerning a fraud in the gaming machine is obtained, imaging is performed so as to cover surroundings of the gaming machine.

In the above-described configuration, the imager images operations of a person existing in front of the gaming machine. Since the imaging device performs imaging so as to cover surroundings of the gaming machine; when a fraud is committed, details of a fraud and operations such as hiding a device used in the fraud can be recognized. Accordingly, surroundings (scene) of a person (fraud person) engaged in the fraud can be recognized. Even if, for example, the fraud person is leaving, the direction of his/her escape can be recognized because the surroundings are imaged.

In the above-described configuration, therefore, local imaging using the imager and global imaging using the imaging device are performed in cooperation, to enable appropriate imaging of the fraud person.

In the imaging system, further, upon determining that a fraud is committed in the gaming machine, the information processing device instructs the gaming machine to image a hand area of the person.

In the above-described configuration, the imager images a hand area of the person.

In general, if a person who is committing a fraud notices a monitor camera, the person tries to hinder the monitor camera from imaging the fraud. For example, when a plurality of persons are committing a fraud, a situation sometimes occurs in which one person commits a fraud while the other persons make a wall by standing between the one person and the monitor camera and spreading their clothes like a bat so as to prevent the fraud from being imaged.

In such a situation, the above-described configuration which is able to image the hand area of the person with the imager provided in the gaming machine enables appropriate imaging of the fraud.

In the imaging system, further, upon determining that the imager is not able to image a hand area of the person, the information processing device instructs the imaging device to image a hand area of the person.

In the above-described configuration, when the imager is not able to image the hand area of the person, the imaging device performs imaging.

In the above-described configuration, even when, for example, the hand area of the person exists on a side of the gaming machine and cannot be imaged by the imager, the imaging device performs imaging. This enables appropriate imaging of the fraud person.

In the imaging system, further, a plurality of gaming machines including the gaming machine are provided in the facility, a plurality of imaging devices including the imaging device are provided in the facility, and upon determining that there is a suspicious person in the facility based on imaging information of an image captured by each of the plurality of imaging devices and that the suspicious person is seated on one of the plurality of gaming machines, the information processing device instructs an imaging device associated with the one gaming machine to perform imaging under a predefined imaging condition.

In the above-described configuration, a suspicious person is detected based on imaging information of the plurality of imaging devices provided in the facility, and if the suspicious person is seated on a gaming machine, an imaging device associated with this gaming machine performs imaging.

Here, there are various tricks of frauds. In one of the tricks, for example, a person (preparing person) who has put a large number of bonus games into a gaming machine by using an instrument leaves the gaming machine immediately, and then an empty-handed person who is hired by the preparing person sits down on the gaming machine and consumes the stock of bonus games. In this trick, there is no evidence unless the moment when the preparing person is committing a fraud is clearly recorded on a video. Moreover, the preparing person leaves immediately after completing the preparation. It is therefore necessary to sense an abnormality fast and image all the ins and outs of a fraud.

In this respect, the above-described configuration, in which imaging is started when a suspicious person is seated and if the suspicious person commits a fraud, a series of fraud-related operations is imaged before, during, and after the fraud, enables appropriate imaging of the fraud person.

In the imaging system, further, a plurality of gaming machines including the gaming machine are provided in the facility, a plurality of imaging devices including the imaging device are provided in the facility, and upon determining that a player is seated on one of the plurality of gaming machines and that the player is a suspicious person based on a predetermined list at a time of authenticating the player, the information processing device instructs an imaging device associated with the one gaming machine to perform imaging under a predefined imaging condition.

In the above-described configuration, at a time of authentication of the player, whether or not the player is a suspicious person is determined. If it is determined that the player is a suspicious person, an imaging device associated with the one gaming machine where the player is seated performs imaging.

Here, there are various tricks of frauds. It is important to sense an abnormality fast and image a fraud.

In the above-described configuration, if a player is a suspicious person, imaging is started upon the player being seated, and if the suspicious person commits a fraud, a series of fraud-related operations is imaged before, during, and after the fraud. This enables appropriate imaging of the fraud person.

In the imaging system, further, the information processing device instructs an imaging device associated with the one gaming machine to perform imaging so as to cover surroundings of the one gaming machine.

In the above-described configuration, the imager images an operation of a person seated on a gaming machine, and the imaging device associated with the gaming machine performs imaging that covers surroundings of the gaming machine. Accordingly, details of a fraud and operations such as hiding a device used in the fraud can be recognized from many aspects. This enables surroundings (scene) of a person (fraud person) committing the fraud to be recognized in details. Even if, for example, the fraud person is leaving, the direction of his/her escape can be recognized because the surroundings are imaged.

In the above-described configuration, local imaging using the imager and global imaging using the imaging device are performed in cooperation, to enable appropriate imaging of the fraud person.

The present invention achieves appropriate imaging of a fraud person.

BRIEF DESCRIPTION OF THE DRAWINGS

The nature and mode of operation of the present invention will now be more fully described in the following detailed description of the invention taken with the accompanying drawing figures, in which:

FIG. 11 exemplifies a symbol combination table of the slot machine;
FIG. 23 shows an exemplary table;
FIG. 24 shows an exemplary table;
FIG. 25 shows an exemplary table;
FIG. 26 shows an exemplary setting file;
FIG. 27 shows an exemplary table;
FIG. 28 shows an exemplary table;
FIG. 33 shows an exemplary table;
FIG. 34 shows an exemplary table.

DETAILED DESCRIPTION OF THE PREFERRED EMBODIMENT

It should be appreciated that, in the detailed description of the invention that follows, like reference numbers on different drawing views are intended to identify identical structural elements of the invention in the respective views.

First Embodiment

A first embodiment of the present invention is described based on the drawings.

[Outline of Imaging System]

Figure 1:
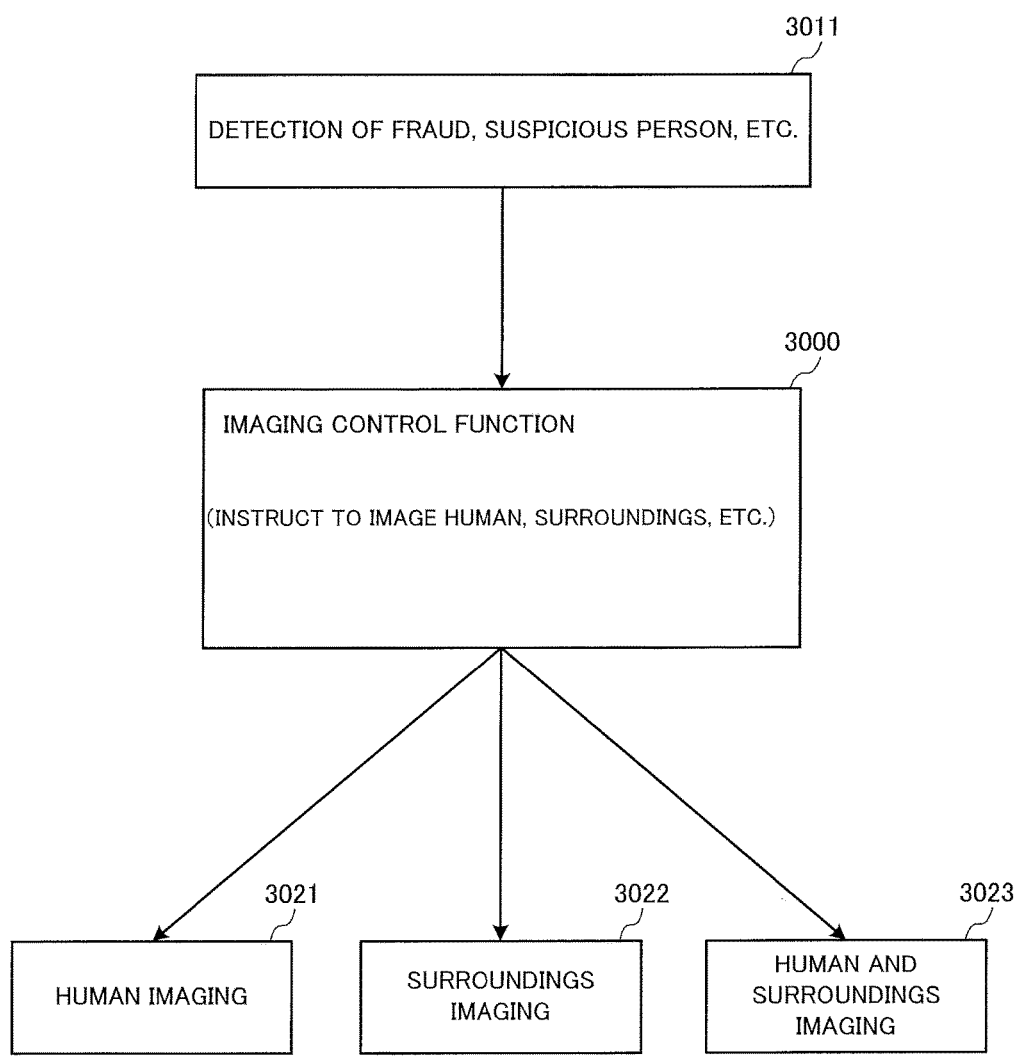
FIG. 1 shows outline of an imaging system.

Outline of an imaging system according to the embodiment is described with reference to an imaging control function 3000 shown in FIG. 1 as an example.

In the imaging system, the imaging control function 3000 controls imaging performed by a plurality of cameras provided in a game arcade. The imaging control function 3000 instructs imaging while designating a camera suitable for human imaging 3021, surroundings imaging 3022, or human and surroundings imaging 3023, based on detection of fraud, a suspicious person, etc. 3011.

For example, if fraud committed by a person is detected by various devices, the imaging control function 3000 controls two or more cameras such that the cameras cooperate with one another to image the person, etc., involved in the fraud. For example, if a suspicious person is detected by various devices, the imaging control function 3000 controls two or more cameras such that the cameras cooperate with one another to image a suspicious person, etc.

The imaging control function 3000 receives (or obtains) image pickup information from each camera in real-time, at regular intervals, or at appropriate timing, and performs image analysis processing. By performing the image analysis processing, the imaging control function 3000 recognizes contents of images picked up by the respective cameras, and controls imaging performed by these and other cameras in accordance with the contents of the imaging.

For example, the imaging control function 3000 instructs a first camera to perform human imaging 3021, a second camera to perform surroundings imaging 3022, and a third camera to human and surroundings imaging 3023, based on a result of the image analysis processing.

For example, the imaging control function 3000 instructs change of imaging conditions based on the result of the image analysis processing performed on the image pickup information, which is transmitted from the first to third cameras in real-time, at regular intervals, or at appropriate timing.

In this manner, the imaging control function 3000 causes a plurality of cameras to cooperate with one another to perform imaging, thus enabling behaviors of a suspicious person, behaviors of a fraud person, and the like, to be monitored appropriately.

Figure 2:
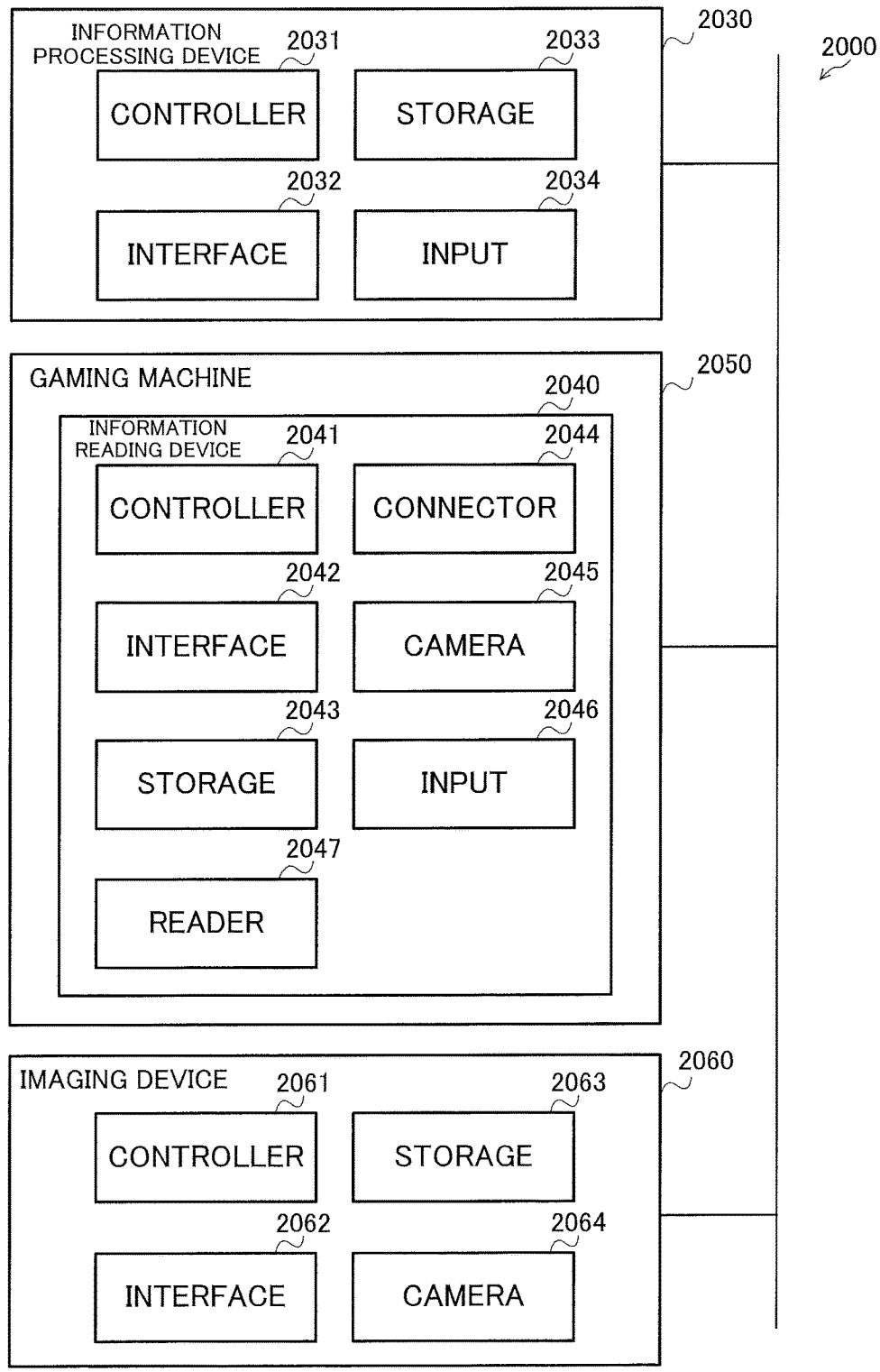
FIG. 2 shows a configuration of the imaging system.

FIG. 2 shows an example (imaging system 2000) of a system capable of providing the imaging control function 3000. The imaging system 2000 includes an information processing device 2030, a plurality of gaming machines 2050, and a plurality of imaging devices 2060.

The information processing device 2030 includes a controller 2031, an interface 2032, a storage 2033, and an input 2034.

The controller 2031 is operable to control the interface 2032 and the storage 2033. The controller 2031 is operable to execute image analysis processing and the like. A CPU (Central Processing Unit), an MCU (Micro-Control Unit), a motherboard, a GPU (Graphics Processing Unit), a video card (graphic board), or the like, functions as the controller 2031.

Here, it may be possible that a display control unit operable to control displaying of images on a display unit such as a display is provided separately from the controller 2031.

The interface 2032 is communicable with an apparatus connected to a network. For example, a communication apparatus for wired communication or wireless communication (e.g., a communication module for a wired LAN, a wireless LAN, or mobile phone communication) functions as the interface 2032.

The storage 2033 is operable store various information (e.g., programs and tables concerning a control of the imaging system 2000). A ROM (Read Only Memory), a RAM (Random Access Memory), a silicon disk, a hard disk, or the like, functions as the storage 2033.

For example, the CPU reads programs and table data stored in the ROM or the like and executes them on the RAM, to implement the respective functions of the controller 2031, the interface 2032, and the input 2034.

The input 2034 is operable to input various information to the information processing device 2030 based on a user operation. An input/output interface as exemplified by a USB terminal, a physical button, a physical keyboard, a mouse, a joystick, a user interface displayed on a liquid crystal touch panel, or the like, functions as the input 2034.

The gaming machine 2050 includes an information reading device 2040.

The information reading device 2040 includes a controller 2041, an interface 2042, a storage 2043, a connector 2044, a camera 2045, an input 2046, and a reader 2047.

The controller 2041 is operable to control the other elements 2042 to 2048. A CPU, an MCU, a motherboard, a GPU, a video card (graphic board), or the like, functions as the controller 2041.

Here, it may be possible that a display control unit operable to control displaying of images on a display unit such as a display is provided separately from the controller 2041.

The interface 2042 is communicable with an apparatus connected to a network. For example, a communication apparatus for wired communication or wireless communication (e.g., a communication module for a wired LAN, a wireless LAN, or mobile phone communication) functions as the interface 2042.

The storage 2043 is operable store various information. A ROM, a RAM, a silicon disk, a hard disk, or the like, functions as the storage 2043.

The connector 2044 is communicable with the gaming machine 2050. A communication apparatus for wired communication or wireless communication (e.g., a USB, an expansion slot, or a network terminal) functions as the connector 2044.

The camera 2045 is operable to take an image of a place where the information reading device 2040 is located. The camera 2045 is capable of horizontal rotation (for example, rotatable over a range of −25° to 205° so as to be oriented edge-on, frontward, and edge-on) and vertical rotation (for example, endlessly rotatable through 360°). For example, an image pickup device as exemplified by a CCD image sensor functions as the camera 2045.

The input 2046 is operable to input various information to the information reading device 2040 based on a user operation. An input/output interface as exemplified by a USB terminal, a physical button, a physical keyboard, a mouse, a user interface displayed on a liquid crystal touch panel, or the like, functions as the input 2046.

The reader 2047 is operable to read, for example, identification information by which a user can be identified, which is stored in a storage medium (e.g., an IC card). A contact type reader/writer, a contactless reader/writer, or the like, functions as the reader 2047.

The imaging device 2060 includes a controller 2061, an interface 2062, a storage 2063, and a camera 2064.

The controller 2061 is operable to control the other elements 2062 to 2064. A CPU, an MCU, a motherboard, a GPU, a video card (graphic board), or the like, functions as the controller 2061.

Here, it may be possible that a display control unit operable to control displaying of images on a display unit such as a display is provided separately from the controller 2061.

The interface 2062 is communicable with an apparatus connected to a network. For example, a communication apparatus for wired communication or wireless communication (e.g., a communication module for a wired LAN, a wireless LAN, or mobile phone communication) functions as the interface 2062.

The storage 2063 is operable store various information. A ROM, a RAM, a silicon disk, a hard disk, or the like, functions as the storage 2063.

The camera 2064 is operable to take an image of a place where the imaging device 2060 is located. The camera 2064 is capable of horizontal rotation (for example, endlessly rotatable through 360°, in a case of being located on a ceiling of a game arcade) and vertical rotation (for example, rotatable over a range of −25° to 210° so as to be oriented horizontally, directly downward, and horizontally, in a case of being located on a ceiling of the game arcade). An image pickup device as exemplified by a CCD image sensor functions as the camera 2064.

[Description of Outline of Game System]

Figure 3:
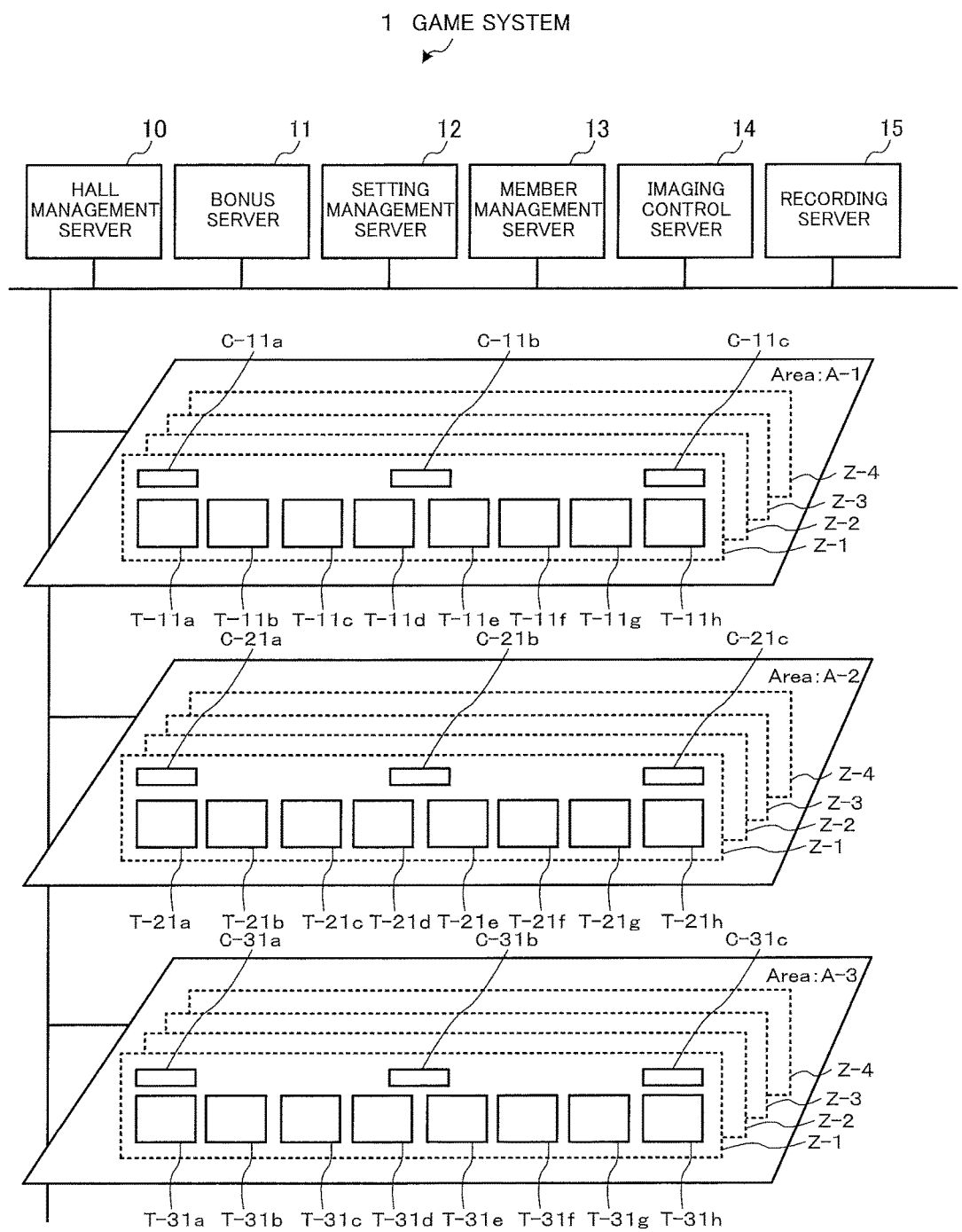
FIG. 3 schematically shows a game system.

Outline of a game system is described with reference to FIG. 3. FIG. 3 is an outline diagram schematically showing an overall configuration of a game system 1 according to a first embodiment.

The game system 1 includes a hall management server 10, a bonus server 11, a setting management server 12, a member management server 13, an imaging control server 14, a recording server 15, a plurality of network cameras, and a plurality of gaming machines (such as slot machines or game table devices).

The number of each of the devices may be arbitrary. For example, the number of each device may be one, or may be two or more. If, for example, the function of one device can be served by another device, the one device may not be provided.

The hall management server 10 aggregates and manages a money flow in a hall (game arcade) to make a balance sheet or the like, and also manages the other servers. The hall management server 10 obtains accounting information from each gaming machine and accumulates the accounting information, the accounting information including timing when the gaming machine has started a unit game, timing when the gaming machine has terminated the unit game, a lottery result in the unit game, and the like.

The bonus server 11 controls a bonus lottery held in a bonus game, and an interlocking effect produced in association with the bonus lottery. The bonus server 11 also manages a cumulative value for awarding a bonus (for example, a credit accumulated for a progressive bonus), for example.

The setting management server 12 stores and manages setting of a gaming machine for which a bonus lottery is to be held and setting of the interlocking effect. Although this embodiment illustrates a bonus game as an example, other types of games including a slot tournament are adoptable.

The member management server 13 is a server for storing and managing member's personal information, information about a member card (IC card), member's previous playing outcome s, and the like. The member card (IC card) is issued by, for example, a member card issuing terminal. At a time of membership registration, member's personal information that is inputted as well as an identification code of a member card is stored in the member management server 13. The member card issuing terminal may be provided with a camera so that the face of a player whose member card which is an IC card is being issued can be imaged at a time of issuance of the member card. The captured image is stored in the member management server 13 in association with the identification code.

The imaging control server 14 is a server for controlling imaging of the hall (monitoring the circumstances in the hall).

More specifically, the imaging control server 14 obtains image pickup information from the network cameras, the gaming machines, and the like, that are located in the hall, at appropriate timing (for example, in real-time, at regular intervals, or in response to human behaviors); and causes the obtained image pickup information to be displayed on a display, or causes a result of image analysis processing performed on the image pickup information to be mapped on a floor map and displayed on a display In addition, the imaging control server 14 instructs the network cameras, the gaming machines, and the like, to perform imaging under an imaging condition that is predefined in accordance with the circumstances (for example, human behaviors such as entry and exit of a person, movement of a person, fraud, etc.) in the hall.

The recording server 15 is a server for recording (storing) the circumstances in the hall. To be more specific, the recording server 15 receives and records image pickup information transmitted from the network cameras, the gaming machines, and the like, that are located in the hall. In addition, the recording server 15 sends record information requested by the imaging control server 14 (past image pickup information searched for by a staff, an administrator, or the like) back to the imaging control server 14.

As shown in FIG. 3, the gaming machines and the network cameras are installed in a plurality of areas (for example, A-1 to A-3 shown in FIG. 3). Here, the area corresponds to, for example, one floor of the hall or an area on a floor. This example shows the areas A-1 to A-3 which is merely illustrative.

The gaming machines and the network cameras are also installed in each zone (for example, Z-1 to Z-4 shown in FIG. 3) within the area. Here, the zone corresponds to a certain space within the area. Although this example shows four zones (Z-1 to Z-4) provided in each area, this is merely illustrative. Although this example shows eight gaming machines and three network cameras arranged in each zone, this is also merely illustrative and a various number of gaming machines and network cameras can be arranged therein.

As shown in FIG. 3, eight gaming machines T-11a to T-11h are arranged in the zone Z-1 of the area A-1. Though not shown, eight gaming machines T-12a to T-12h are arranged in the zone Z-2 of the area A-1, eight gaming machines T-13a to T-13h are arranged in the zone Z-3 of the area A-1, and eight gaming machines T-14a to T-14h are arranged in the zone Z-4 of the area A-1.

As shown in FIG. 3, eight gaming machines T-21a to T-21h are arranged in the zone Z-1 of the area A-2. Though not shown, eight gaming machines T-22a to T-22h are arranged in the zone Z-2 of the area A-2, eight gaming machines T-23a to T-23h are arranged in the zone Z-3 of the area A-2, and eight gaming machines T-24a to T-24h are arranged in the zone Z-4 of the area A-2.

Eight gaming machines T-31a to T-31h are arranged in the zone Z-1 of the area A-3. Though not shown, eight gaming machines T-32a to T-32h are arranged in the zone Z-2 of the area A-3, eight gaming machines T-33a to T-33h are arranged in the zone Z-3 of the area A-3, and eight gaming machines T-34a to T-34h are arranged in the zone Z-4 of the area A-3.

As shown in FIG. 3, three network cameras C-11a to C-11c are arranged in the zone Z-1 of the area A-1. Though not shown, three network cameras C-12a to C-12c are arranged in the zone Z-2 of the area A-1, three network cameras C-13a to C-13c are arranged in the zone Z-3 of the area A-1, and three network cameras C-14a to C-14c are arranged in the zone Z-4 of the area A-1.

As shown in FIG. 3, three network cameras C-21a to C-21c are arranged in the zone Z-1 of the area A-2. Though not shown, three network cameras C-22a to C-22c are arranged in the zone Z-2 of the area A-2, three network cameras C-23a to C-23c are arranged in the zone Z-3 of the area A-2, and three network cameras C-24a to C-24c are arranged in the zone Z-4 of the area A-2.

Three network cameras C-31a to C-31c are arranged in the zone Z-1 of the area A-3. Though not shown, three network cameras C-32a to C-32c are arranged in the zone Z-2 of the area A-3, three network cameras C-33a to C-33c are arranged in the zone Z-3 of the area A-3, and three network cameras C-34a to C-34c are arranged in the zone Z-4 of the area A-3.

The diagram schematically illustrates that each of the gaming machines is connected to the hall management server 10, the bonus server 11, the imaging control server 14, the recording server 15, and the like, via LAN connection using Ethernet (registered trademark), though more detailed manner of the connection will be described later.

Each of the gaming machines and the network cameras is assigned a unique identifier, and the hall management server 10, the imaging control server 14, or the like, uses the identifier to identify the source of data transmitted from each of the gaming machines and the network cameras. The hall management server 10, the imaging control server 14, or the like, also uses the identifier to designate the destination of data when transmitting the data to the gaming machines and the network cameras. Examples of the identifier include a network address such as an IP address, but an identifier different from the network address is also adoptable for managing each individual gaming machine.

The game system 1 may be built in a single hall (game arcade) capable of offering various games, or may be built across a plurality of halls. In a case of being built in a single hall, the game system 1 may be built in each floor or each section of the hall. A communication line that connects the servers to the gaming machines and the network cameras may be either wired or wireless, and a dedicated line, a circuit-switched line, or the like, is also adoptable therefor.

[Description of Outline of Gaming Machine]

Figure 4:
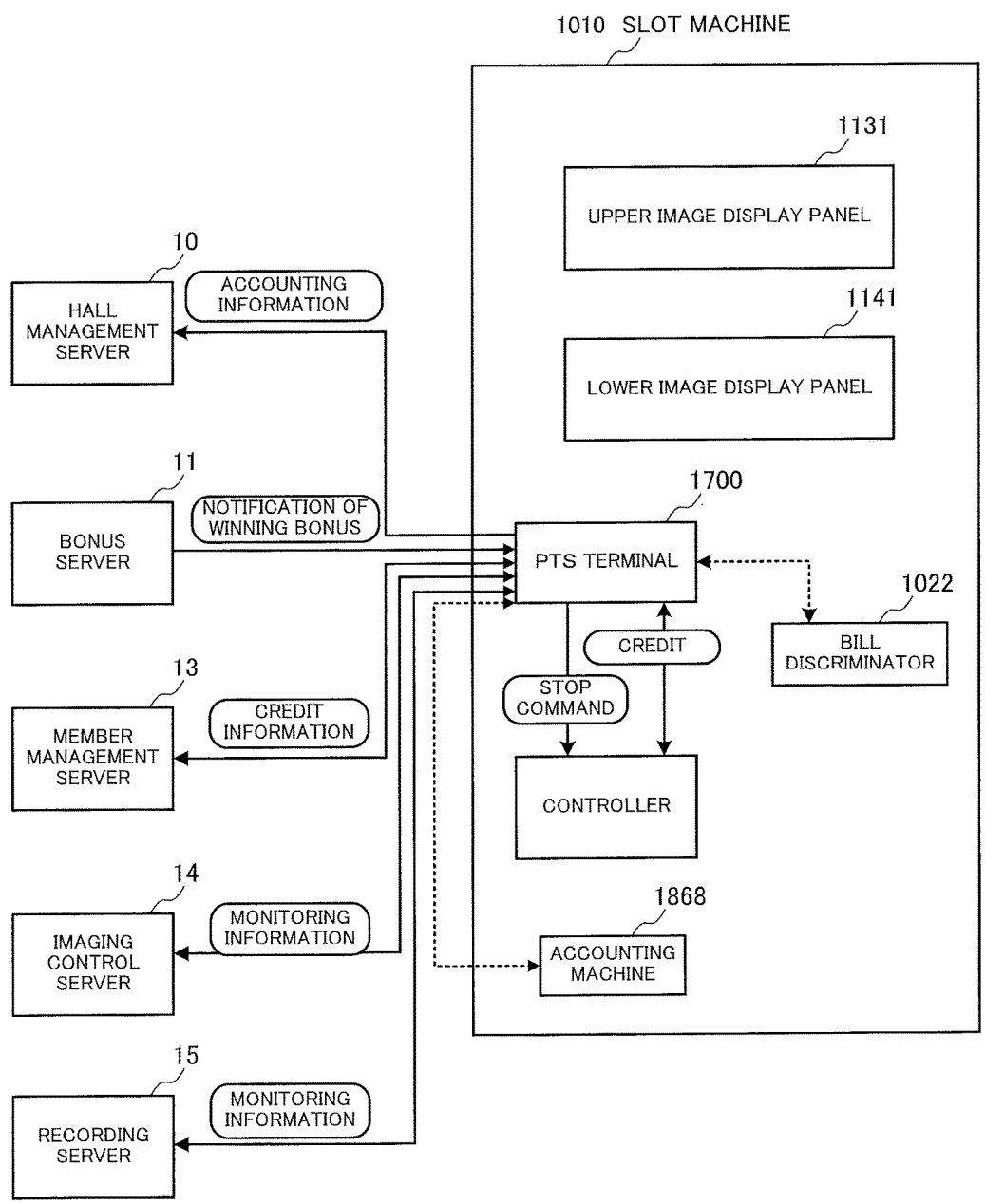
FIG. 4 schematically shows a slot machine.

Outline of a gaming machine according to the embodiment of the present invention is described with reference to FIG. 4. FIG. 4 shows a gaming machine integrated with a player tracking device. A configuration of a slot machine 1010 is conceptually shown. The player tracking device is a terminal for implementing a player tracking system. In the specification herein, this device will hereinafter be referred to as a PTS terminal. Although a slot machine is illustrated as the gaming machine in the following description, the present invention is applicable not only to the slot machine but also to gaming machines for playing various games.

As shown in FIG. 4, the slot machine 1010 includes a PTS terminal 1700, and also includes an accounting machine 1868. The PTS terminal 1700 connects the slot machine 1010 to the hall management server 10, the bonus server 11, the member management server 13, the imaging control server 14, the recording server 15, and the like, via a network. In this embodiment, one slot machine 1010 is provided with one PTS terminal 1700 that is arranged in a part of a housing thereof.

In this embodiment, the PTS terminal 1700 is connected to a bill discriminator 1022 via a communication line (or the slot machine 1010).

The PTS terminal 1700 transmits and receives data to and from a controller (a controller 1100 of the slot machine 1010 which will be described later) based on a predetermined protocol, and communicates data with the hall management server 10, the bonus server 11, the member management server 13, the imaging control server 14, the recording server 15, and the like, that are connected via the network. For example, information about a credit necessary for starting a play, and a stop command to stop a unit game at a time of the interlocking effect, are transmitted from the PTS terminal 1700 to the controller; and information about a credit that is a playing outcome, a notification of starting a unit game, a notification of ending a unit game, and the like, can be transmitted from a gaming controller to the PTS terminal 1700.

For example, accounting information including a notification of starting a unit game, a notification of ending a unit game, a lottery result, and the like, is transmitted from the PTS terminal 1700 to the hall management server 10. A notification of winning a bonus is transmitted from the bonus server 11 to the PTS terminal 1700 (of a predetermined slot machine 1010). For example, information about a member's credit is exchanged between the PTS terminal 1700 and the member management server 13.

In addition, monitoring information including image pickup information captured by a human body detection camera 1713 is transmitted from the PTS terminal 1700 to the imaging control server 14, as will be described later. Instructions concerning imaging are transmitted from the imaging control server 14 to the PTS terminal 1700.

Monitoring information including image pickup information captured by the human body detection camera 1713 is transmitted from the PTS terminal 1700 to the recording server 15, as will be described later.

A game flow for a member is outlined as follows. First, membership registration is made at the member card issuing terminal, and a member card (IC card) is issued at this time. Then, a player inserts the member card into the PTS terminal 1700 of the slot machine 1010, and inserts cash. Upon insertion of a bill, the bill discriminator 1022 identifies the denomination and amount, and transmits a result of the identification, which means denomination data and amount data, to the PTS terminal 1700. The PTS terminal 1700 obtains a play credit based on the denomination data and the amount data, and transmits the obtained credit to the controller.

The controller executes a game based on the credit transmitted from the PTS terminal 1700. A credit according to a playing outcome is transmitted from the controller to the PTS terminal 1700. The PTS terminal 1700 calculates a payout based on the playing outcome, to determine the amount to be paid out to the player. The PTS terminal 1700 writes the determined amount into the member card without any change, and discharges the member card. In addition, a predetermined point is given to the member card in accordance with the playing, or the like.

In a case where the member player plays a next game, the PTS terminal 1700 reads the member card inserted therein, to read the amount stored in the member card. The read amount is converted into a credit, which is then transmitted to the controller. In the same manner as mentioned above, a credit according to a playing outcome is transmitted from the controller to the PTS terminal 1700, and the PTS terminal 1700 calculates a payout based on the playing outcome, to determine the amount to be paid out to the player. The amount obtained as a result of the play is added to the amount stored in the inserted member card, which is thereby updated.

Furthermore, the PTS terminal 1700 transmits the updated amount and the identification code (or a player identification code) read from the member card to the member management server 13. The member management server 13 adds the amount transmitted from the PTS terminal 1700 to the amount owned by a member specified by the identification code, and stores a result of the addition. Constant management of the amount owned by the member is achieved by this process.

Thereafter, when needed, the member player can settle the account based on the amount stored in the member card in a cashier counter, for example. In a case of the slot machine 1010 including the accounting machine 1868 as illustrated above, settlement of the account can be made in the slot machine 1010 by using the member card.

A game flow for a non-member is outlined as follows. First, a player inserts cash into the PTS terminal 1700 of the slot machine 1010. Upon insertion of a bill, the bill discriminator 1022 identifies the denomination and amount, and transmits a result of the identification, which means denomination data and amount data, to the PTS terminal 1700. The PTS terminal 1700 obtains a play credit based on the denomination data and the amount data, and transmits the obtained credit to the controller.

The controller executes a game based on the credit transmitted from the PTS terminal 1700. The credit according to the playing outcome is transmitted from the controller to the PTS terminal 1700. The PTS terminal 1700 calculates the payout based on the playing outcome, to determine the amount to be paid out to the player. The PTS terminal 1700 writes the determined amount into a new IC card stocked in the slot machine 1010, and discharges the IC card. This is the first time the non-member obtains the IC card.

Thereafter, when needed, the non-member player can settle the account based on the amount stored in the IC card in a cashier counter, for example. In a case of the slot machine 1010 including the accounting machine 1868 as illustrated above, settlement of the account can be made in the slot machine 1010 by using the IC card.

[Description of Functional Flow Diagram]

Figure 5:
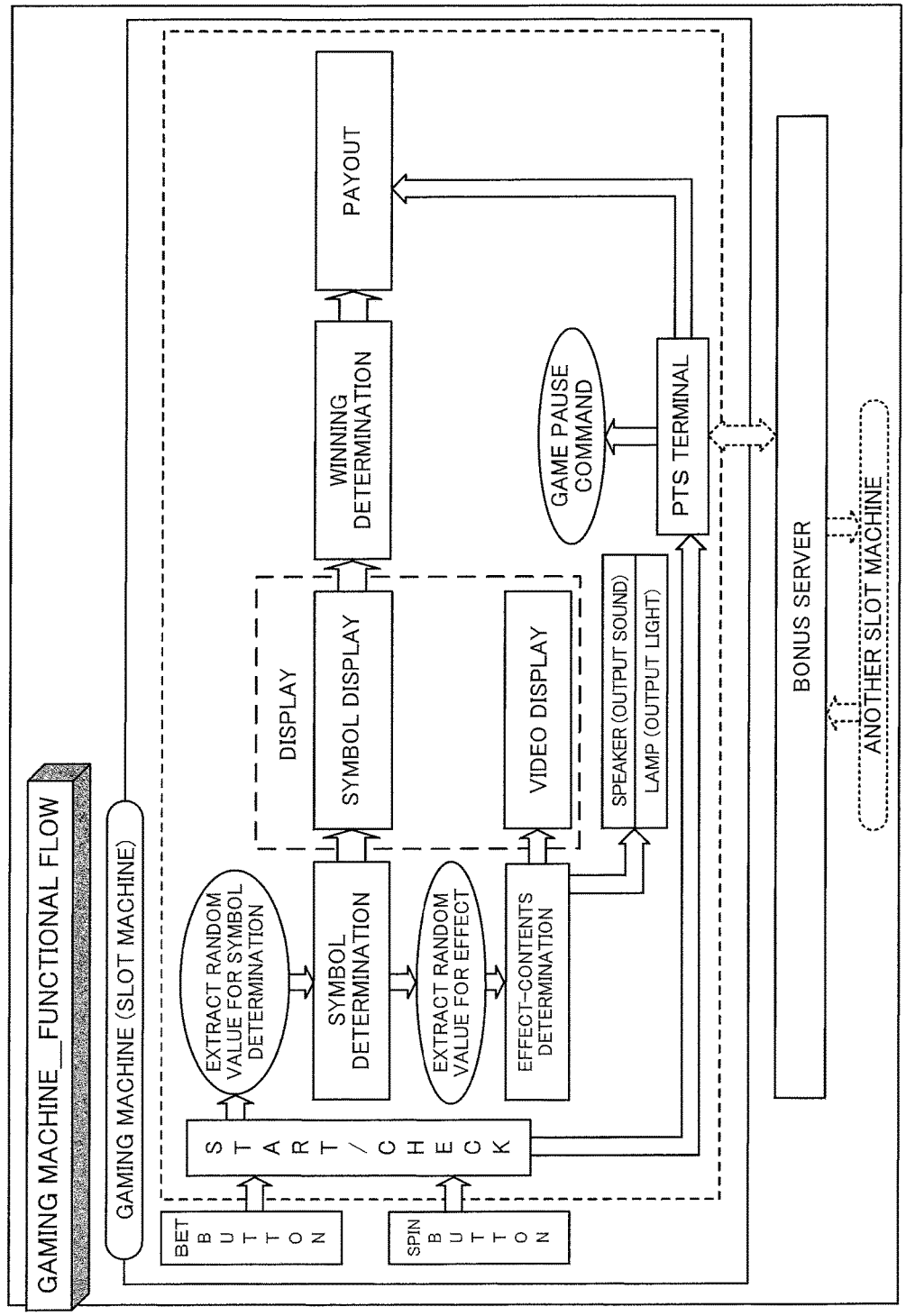
FIG. 5 shows basic functions of the slot machine.

Basic functions of the slot machine are described with reference to FIG. 5. As shown in FIG. 5, the slot machine 1010 is connected to an external control device (for example, the bonus server 11) so as to allow data communication therewith. The external control device is connected to a plurality of other slot machines 1010 installed in the hall so as to allow data communication therewith.

<Start-Check>

First, the slot machine 1010 checks whether or not a BET button is pressed by a player, and subsequently checks whether or not a spin button is pressed by the player.

<Symbol Determination>

Next, if the spin button is pressed by the player, the slot machine 1010 extracts random values for symbol determination, and determines symbols to be displayed to the player when symbol arrays stop scrolling, for each of a plurality of video reels displayed on a display.

<Symbol Display>

Next, the slot machine 1010 starts scrolling the symbol array of each video reel, and then stops scrolling so that the determined symbols are displayed to the player.

<Winning Determination>

After scrolling of the symbol array of each video reel is stopped, the slot machine 1010 determines whether or not a combination of symbols displayed to the player is a combination related to winning.

<Payout>

Then, if the combination of symbols displayed to the player is a combination related to winning, the slot machine 1010 offers benefits according to the type of the symbol combination to the player. For example, if a combination of symbols related to a payout is displayed, the slot machine 1010 pays out a payout to the player, the payout corresponding to the combination of symbols.

In response to the slot machine 1010 starting a unit game by a player pressing the spin button or terminating a unit game, the bonus server 11 accordingly holds a lottery for a bonus game. If any of the slot machines 1010 wins the lottery for the bonus game, the slot machine 1010 stops a unit game and then the PTS terminal 1700 produces the interlocking effect. Here, the unit game represents a series of operations from start of receiving a BET to a state in which an award can be established.

A payout is given from the bonus server 11 to the slot machine 1010 having won the bonus game via the PTS terminal 1700. For example, the bonus server 11 accumulates a part of a credit consumed by the player on the slot machine 1010 as a credit for a progressive bonus, and upon the slot machine 1010 winning the bonus game, pays out a part of the progressive bonus to the winning slot machine 1010.

<Determination of Effects>

The slot machine 1010 produces effects by displaying images to the display, outputting light from lamps, and outputting sounds from speakers. The slot machine 1010 extracts a random value for effect and determines contents of the effects based on the symbols determined by lottery, etc.

At the lottery for the bonus game, the interlocking effect is produced in a plurality of gaming machines through display devices, light-emitting units, and speakers of the PTS terminals 1700.

[Overall Configuration of Slot Machine]

Figure 6:
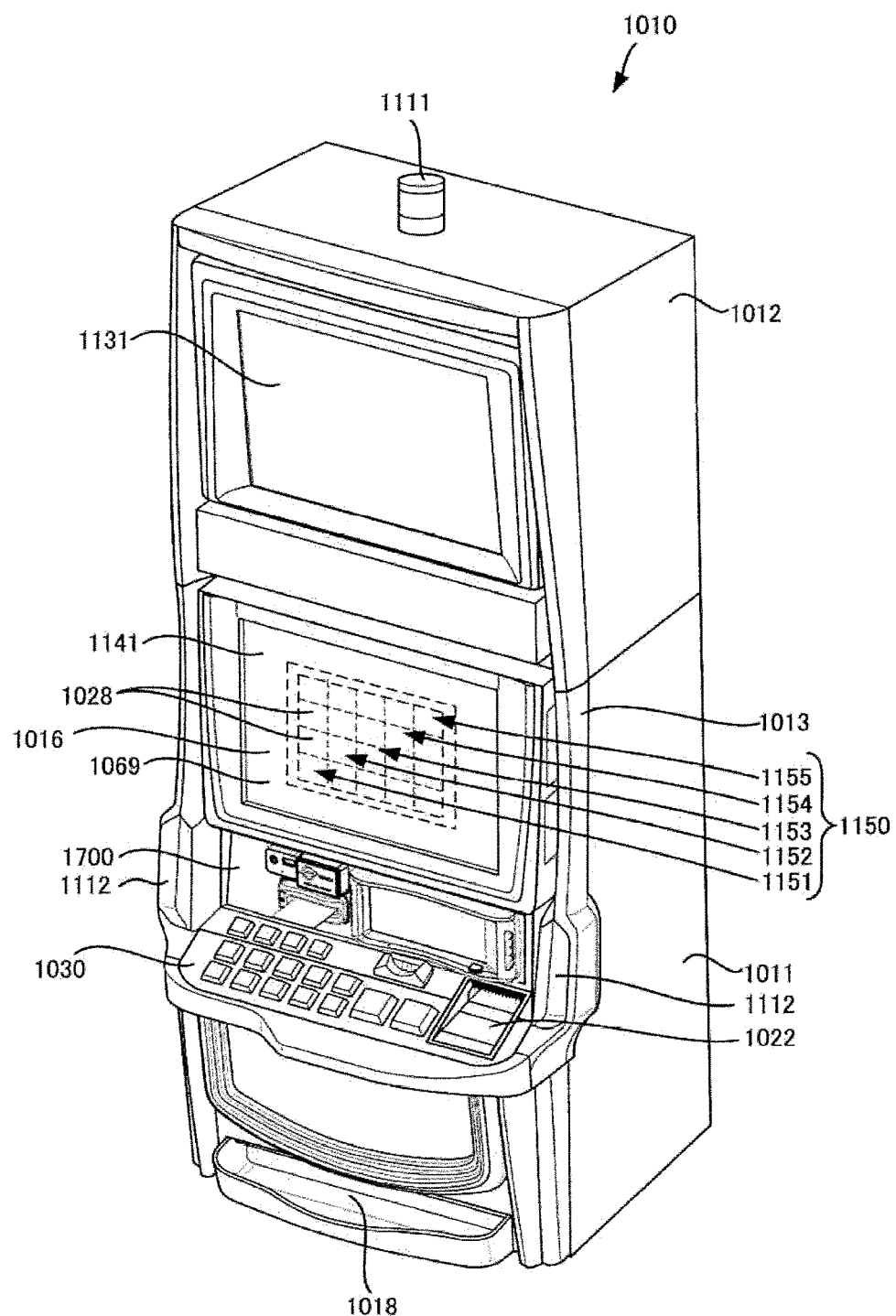
FIG. 6 shows an overall structure of the slot machine.

Next, an overall structure of the slot machine 1010 is described with reference to FIG. 6.

A member card (IC card), a bill, or electronic value information equivalent thereto is used as a game medium for the slot machine 1010. Particularly in this embodiment, credit-related data such as cash data stored in an IC card 1500 is adopted.

The slot machine 1010 includes a cabinet 1011, a top box 1012 provided on the upper side of the cabinet 1011, and a main door 1013 provided on a front face of the cabinet 1011.

The main door 1013 includes a symbol display device 1016 which is referred to as a lower image display panel 1141. The symbol display device 1016 is formed of a transparent liquid crystal panel. A screen displayed on the symbol display device 1016 has a display window 1150 in a central region thereof. The display window 1150 is made up of 20 display blocks 1028 that form five columns and four rows. The four display blocks 1028 included in each column, which constitute each of pseudo reels 1151 to 1155, rotate in accordance with a player's operation. In each of the pseudo reels 1151 to 1155, the four display blocks 1028 move downward with the entire speed thereof varying, so that symbols 1501 displayed in the display blocks 1028 are vertically rotated and then stopped, thus performing rearrangement.

Here, the "rearrangement" represents a state where the symbols 1501 are arranged again after an arrangement of the symbols 1501 is dissolved. The "arrangement" represents a state where the symbols 1501 are visually recognizable by an external player. The slot machine 1010 runs a so-called slot game in which a payout corresponding to a predetermined win is awarded in accordance with how the symbols 1501 are arranged as a result of stopping the rotation of the pseudo reels 1151 to 1155.

Although this embodiment illustrates a case where the slot machine 1010 is a so-called video slot machine, the slot machine 1010 of the present invention may adopt so-called mechanical reels as a substitute for all or part of the pseudo reels 1151 to 1155.

The symbol display device 1016 has a touch panel 1069 provided on a front face thereof, and the player is able to input various instructions by operating the touch panel 1069. The touch panel 1069 transmits an input signal to the main CPU 1071.

An upper image display panel 1131 is provided on a front face of the top box 1012. The upper image display panel 1131 includes a liquid crystal panel, and forms the display. The upper image display panel 1131 displays images related to effects and images showing introduction of game contents and explanation of game rules. Further, the top box 1012 is provided with a lamp 1111. The slot machine 1010 produces effects for the unit game by displaying images, outputting sounds, and outputting the light.

A number-of-credit indicator (not shown) is displayed in an upper part of the display window 1150, to display the current number of credits. Here, the "credit" is a virtual game medium on the game, which the player uses for making a BET. The number-of-credit indicator displays the total number of credits currently owned by the player.

A fractional cash indicator (not shown) is displayed below the number-of-credit indicator. The fractional cash indicator displays fractional cash. The "fractional cash" means cash that remains without being converted into the credit in the event that an insufficient amount of cash is inserted.

Upon insertion of the IC card 1500 into the PTS terminal 1700 which will be described later, the number of credits stored in the IC card is displayed by the number-of-credit indicator while a fractional cash stored in the IC card is displayed by the fractional cash indicator. These numerical values are stored in the member management server 13 in association with the identification code of the member card.

The IC card is a contactless IC card in which an IC (Integrated Circuit) is built for recording and calculating various data such as a credit, by which near field wireless communication as exemplified by NFC (Near Field Communication) is enabled using RFID (Radio Frequency Identification) technology. The IC card 1500 enables the player to own credit-related data and carry the data from one to another of different slot machines. The player inserts the IC card 1500 into the PTS terminal 1700 of the slot machine 1010, and thereby can play a game such as a unit game on the slot machine 1010 by using the credit-related data (amount data) stored in the IC card 1500.

It may be acceptable that the player is able to use a machine installed in the hall to accumulate cash data of cash including coins, bills, and the like, in the IC card 1500.

The PTS terminal 1700 is installed in the cabinet 1011, at a position below the lower image display panel 1141. Speakers 1112 are arranged to the left and right of the PTS terminal 1700, respectively. The lamp 1111 is arranged on the top of the top box 1012. The slot machine 1010 produces effects for the unit game by displaying images on the upper image display panel 1131, outputting sounds from the speakers 1112, outputting light from the lamp 1111, and the like.

[Configuration of PTS Terminal]

Figure 7:
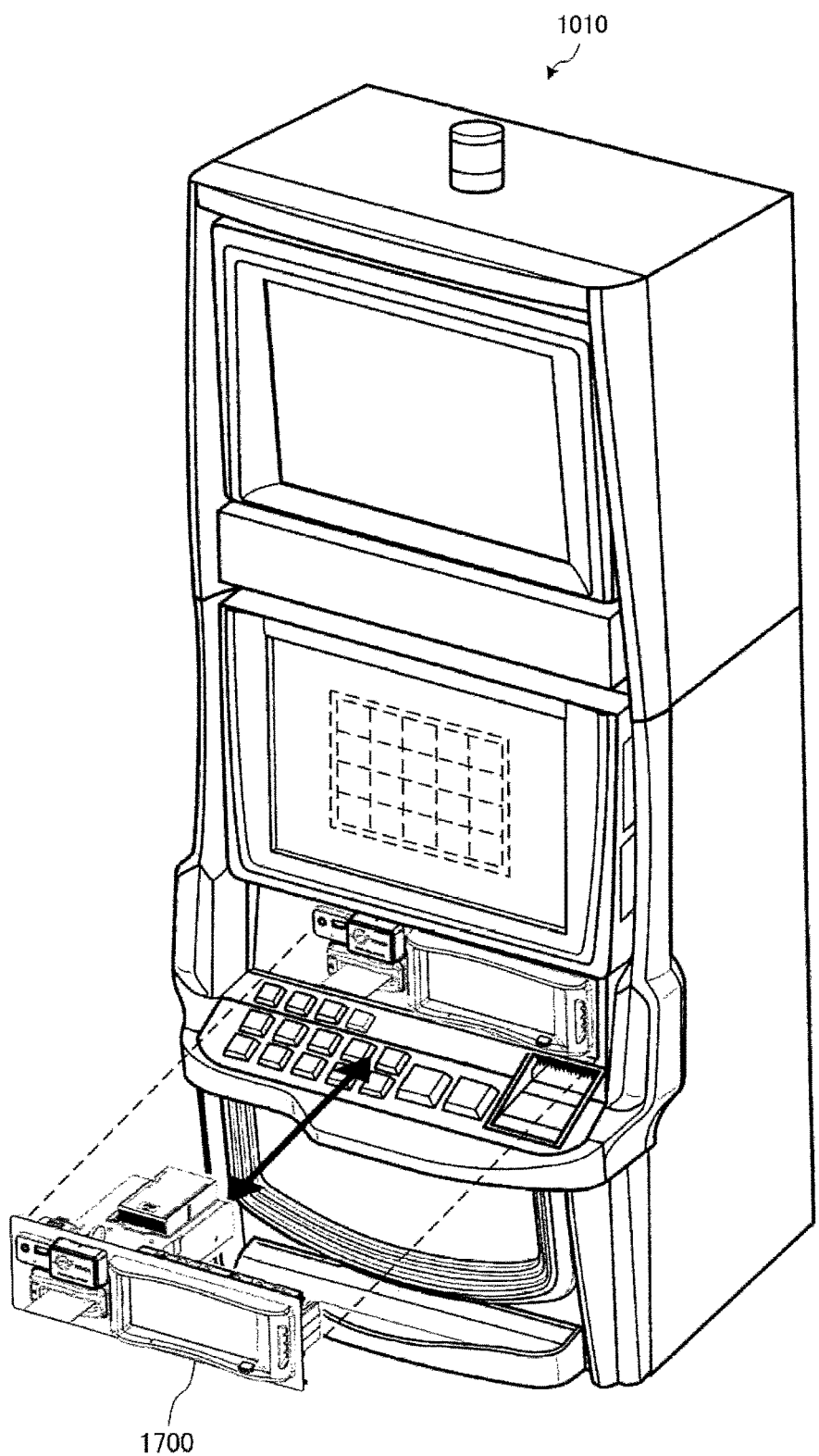
FIG. 7 shows a PTS terminal installed in the slot machine.

FIG. 7 shows the PTS terminal 1700 installed in the slot machine 1010. The PTS terminal 1700, which is operable to exchange data through a data interface that is common to gaming machines, is installable in various types of gaming machines provided by various manufacturers.

Figure 8:
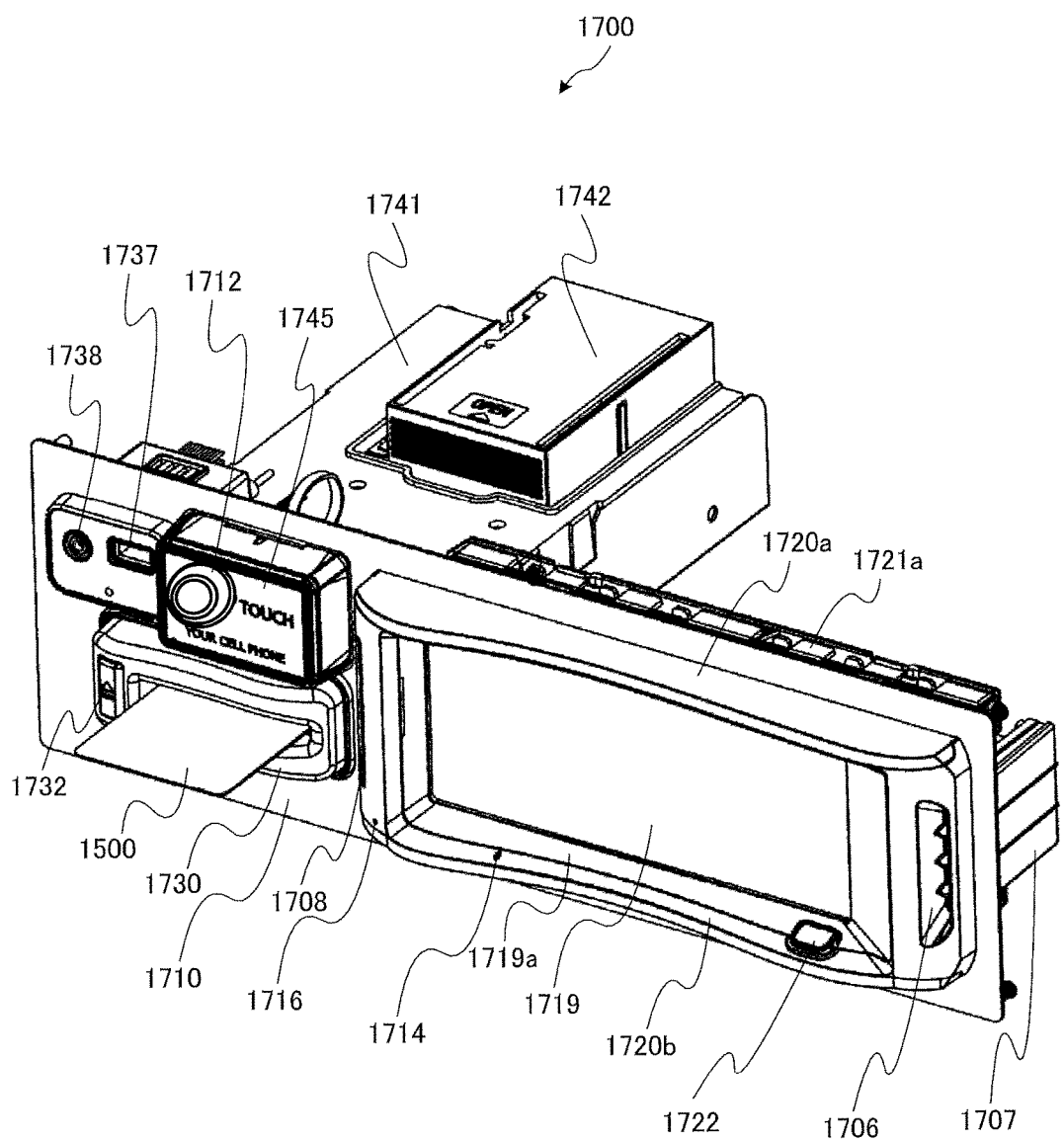
FIG. 8 shows the PTS terminal on an enlarged scale.

FIG. 8 shows the PTS terminal 1700 of FIG. 7 on an enlarged scale. As shown in FIG. 8, the PTS terminal 1700 includes a panel 1710. Parts arranged on a front face of the panel 1710 are visually recognizable by the player. Members arranged on a rear face of the panel 1710, which are housed within the slot machine 1010, are not visually recognizable by the player.

The panel 1710 has, in a right part of the front face thereof, an LCD 1719 with a touch panel function. For example, the LCD 1719 displays information about the member and information directed to the member, and has a screen size of 6.2 inches (about 15.7 cm). An LCD covering 1719*a* is provided around the LCD 1719. While the LCD 1719 is provided with the touch panel function in this example, the player may input instructions by using another input device such as a keyboard or a mouse.

A light-emitting plate 1720*a* for emitting light, which is connected to LEDs, is provided above the LCD 1719 and the LCD covering 1719*a*. For example, the light-emitting plate 1720*a* is made of polycarbonate, and connected to a plurality of (e.g., seven) full-color LEDs 1721*a* arranged on the rear side of the panel 1710 so that the light-emitting plate 1720*a* emits light in accordance with light emission of the full-color LEDs 1721*a*.

Likewise, a light-emitting plate 1720*b* for emitting light, which is connected to LEDs, is provided below the LCD 1719 and the LCD covering 1719*a*. For example, the light-emitting plate 1720*b* is made of polycarbonate, and connected to a plurality of (e.g., seven) full-color LEDs 1721*b* (not shown) arranged on the rear side of the panel 1710 so that the light-emitting plate 1720*b* emits light in accordance with light emission of the full-color LEDs 1721*b*.

An imaging window 1712 is provided to the left of the LCD 1719. A human body detection camera 1713 (not shown) arranged inside the LCD covering 1719*a* or on the rear side of the panel 1710 images the player or the like through the imaging window 1712. The imaging window 1712 may be made of, for example, a half mirror material given a shielding process such as smoking. Positions where the imaging window 1712 and the human body detection camera 1713 are mounted are not limited to the ones illustrated in FIG. 8, and they can be mounted at appropriate positions on the PTS terminal 1700.

The LCD covering 1719*a* has a home button 1722 provided to the lower right of the LCD 1719. The home button 1722 is a button for shifting a screen displayed on the LCD 1719 into a predetermined superordinate screen.

The LCD covering 1719*a* has a speaker duct 1706 provided to the right of the LCD 1719. At a position corresponding thereto and on the rear side of the panel 1710, a bass-reflex type speaker 1707 is provided. Likewise, a speaker duct 1708 is provided to the left of the LCD 1719, and at a position corresponding thereto and on the rear side of the panel 1710, a bass-reflex type speaker 1709 (not shown) is provided. These speakers are speakers exclusive for the PTS terminal 1700, and provided separately from a slot machine game speaker provided in the slot machine 1010.

These speakers are capable of producing interlocking effects, implementing voice conversations, and outputting an announcement sound when the IC card 1500 is left inserted. Since the speakers are configured to allow stereophonic sound such that sounds outputted therefrom reach the front side (player side) through the above-mentioned speaker ducts 1706, 1708, it is possible to arrange the speakers on the rear side of the panel 1710, which results in achievement of space saving of the PTS terminal 1700 (panel face).

The LCD covering 1719*a* has a microphone opening 1714 and a microphone opening 1716 provided to the lower left of the LCD 1719. At positions corresponding thereto and inside the LCD covering 1719*a*, microphones 1715 and 1717 (not shown) are provided, respectively.

A card slot opening 1730 through which the IC card 1500 can be inserted or removed is provided in a lower left part of the front face of the panel 1710. A full-color LED 1731 (not shown), which is provided in a card insertion portion of the card slot 1730, lights up in multiple colors to announce the number of IC cards 1500 stored in a card stacker 1742 which will be described later. An eject button 1732 is provided in the card slot 1730. A red LED 1733 (not shown) arranged near the eject button 1732 lights up to show the position of the eject button 1732 and a progress of ejection.

A card unit 1741 and the card stacker 1742 are provided on the rear side of the panel 1710 at a position corresponding to the card slot 1730. The card slot 1730 is configured as a part of the card unit 1741. The card stacker 1742 is capable of storing about 30 IC cards 1500. To pay back a credit to a new player who has played a unit game, the IC card 1500 stored in the card stacker 1742 is taken out and discharged through the card slot 1730.

At a time of payback of a credit, the IC card 1500 accepted through the card slot 1730 and held in the card unit 1741 is updated in its credit information by NFC or the like, and then the IC card 1500 is discharged through the card slot 1730. The IC card 1500 is fully received within the card unit 1741 while a player is playing a unit game.

In a conceivable configuration, the IC card 1500 may be kept in the card stacker 1742 if the human body detection camera or the like detects absence of the player while the IC card 1500 remains at a time of payback of the credit. This can avoid occurrence of a situation in which the IC card 1500 is left in the card unit 1741 for a long time even when, for example, a player who recognizes that the IC card 1500 holds only a small amount of credits leaves the machine with the IC card 1500 left therein or a player who simply forgets to take the IC card 1500 leaves the machine.

A USB terminal 1737 and an audio terminal 1738 are provided in an upper left part of the front face of the panel 1710. The USB terminal 1737 is configured such that a USB device connected thereto can be charged, for example. The audio terminal 1738 is, for example, of 4-terminal type, to which a headset can be inserted to enable the player to make a phone call by using headphones and a microphone. Alternatively, the audio terminal 1738 may be of 2-terminal or 3-terminal type which enables the player to hear voices by using headphones.

The front face of the panel 1710 has a touch unit 1745 provided to the right of the LCD 1719. The touch unit 1745 includes an RFID module that is able to function as a writer and a reader, the writer writing data to an IC device (e.g., a mobile phone or a smart phone having a communication function using a contactless IC card or NFC) including an IC chip by data communication, the reader reading data from the IC device by data communication. LEDs 1746 (not shown) are arranged at the four corners of the front face of the touch unit 1745. In addition to the touch unit 1745 or instead of the touch unit 1745, an information recording medium reading apparatus may be provided for reading information stored in an information recording medium as exemplified by a magnetic card. In such a configuration, a magnetic card instead of the IC card 1500 can be used as the member card.

As described above, the PTS terminal 1700 achieves space saving because various devices having a microphone function, a camera function, a speaker function, a display function, and the like, are integrated into a single unit. This does not cause an inconvenient situation in which, for example, speakers cannot be directed to the player while the LCD is directed to the player, which situation might be caused if the respective functions are provided as separate parts.

[Advantages of Providing Both Card Unit and Touch Unit]

The PTS terminal 1700 is configured such that, upon insertion of the IC card 1500 into the card slot 1730, the card unit 1741 reads the IC card 1500 and the entire IC card 1500 is accepted and held (inside the PTS terminal 1700). In addition to this, the touch unit 1745 is provided to allow data communication with another IC card, a mobile phone, or a smart phone.

The above-described configuration of the PTS terminal 1700 of the present invention makes it possible that, for example, in an event requiring any maintenance while a member player is playing on the gaming machine (at this time, the member card is held in the card unit 1741), a staff brings a maintenance IC card into touch with the touch unit 1745 to display a maintenance screen on the LCD 1719 of the PTS terminal 1700 or to transmit the contents or history of maintenance to the server, for accumulation.

For example, in a case of performing maintenance concurrently on a plurality of machines or sequentially on many machines, their touch units 1745 are sequentially touched with the maintenance card so that an operation for displaying the maintenance screen or registering the contents of maintenance can be performed quickly.

If the PTS terminal 1700 is configured such that the touch unit 1745 is the only access to the IC card or the like, the gaming machine cannot recognize exchange of players in a situation where a player who has initially played by touching the touch unit 1745 with the IC card 1500 leaves the gaming machine and then another player uses the gaming machine.

To eliminate such inconvenience, the card unit 1741 configured to hold the IC card 1500 during the play is preferable. For example, if the player who has initially played by touching the touch unit 1745 with the IC card 1500 leaves the gaming machine and then another player plays on the same gaming machine by inserting a bill (without using any IC card), the credit-related data is stored in the IC card 1500 of the initial player at a time of payback.

[Circuit Configuration of Slot Machine]

Figure 9:
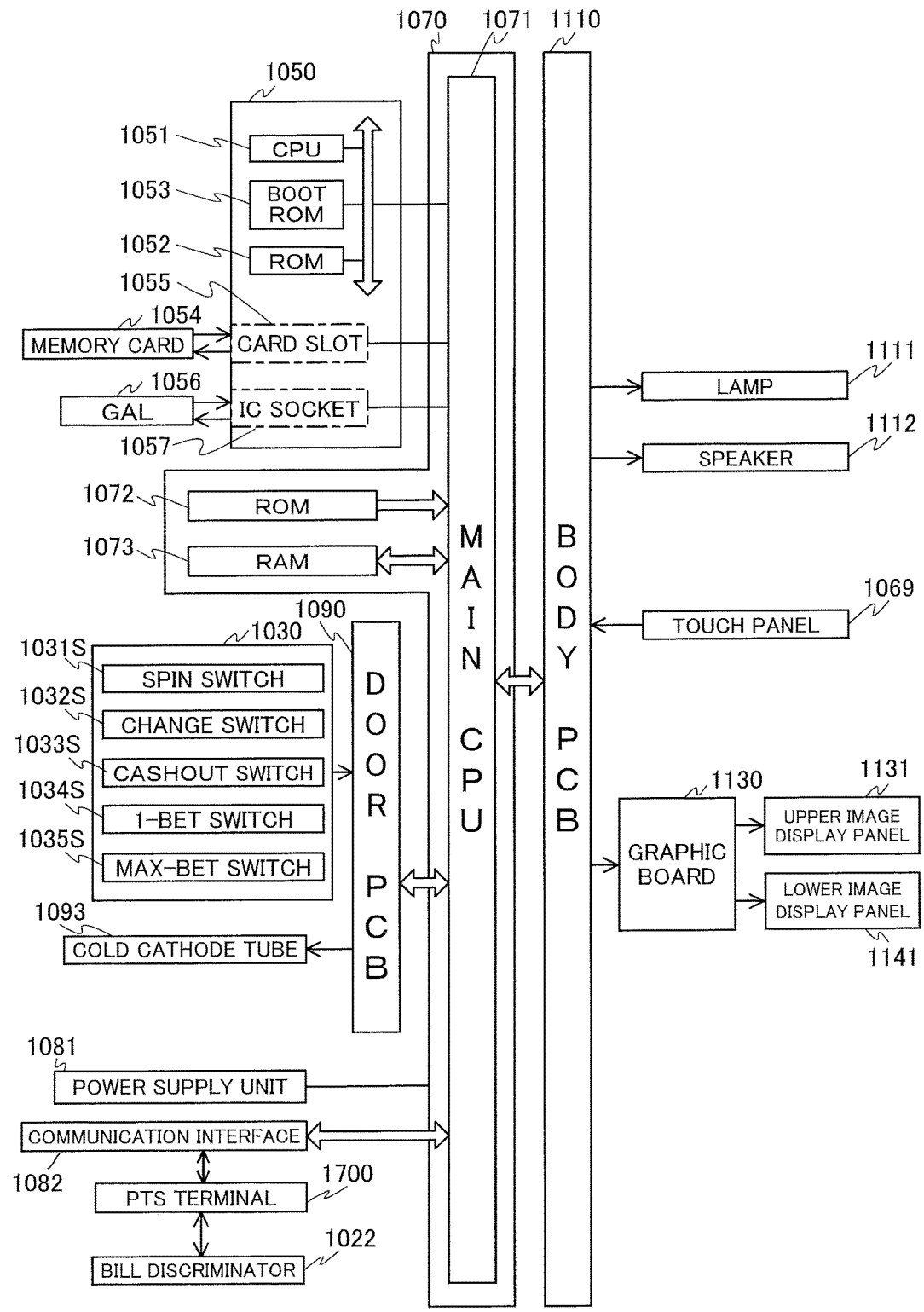
FIG. 9 shows a circuit configuration of the slot machine.

Next, a configuration of a circuit included in the slot machine 1010 is described with reference of FIG. 9.

A gaming board 1050 is provided with: a CPU 1051, a ROM 1052, and a boot ROM 1053, which are mutually connected by an internal bus; a card slot 1055 corresponding to a memory card 1054; and an IC socket 1057 corresponding to a GAL (Generic Array Logic) 1056.

The memory card 1054 includes a non-volatile memory, and stores a game program and a game system program. The game program includes a program related to game progression, and a program for producing effects by images and sounds. Further, the aforementioned game program includes a symbol determination program. The symbol determination program is a program for determining symbols to be rearranged in the display blocks 1028.

Further, the card slot 1055 is configured so that the memory card 1054 can be inserted thereinto and removed therefrom, and is connected to a motherboard 1070 by an IDE bus. Accordingly, the type and contents of the game to be played on the slot machine 1010 can be changed by removing the memory card 1054 from the card slot 1055, writing another game program in the memory card 1054, and then inserting the memory card 1054 into the card slot 1055.

The GAL 1056 is a type of PLD (Programmable Logic Device) having a fixed OR array structure. The GAL 1056 is provided with a plurality of input ports and output ports, and predetermined input into the input port causes output of the corresponding data from the output port.

Further, the IC socket 1057 is configured so that the GAL 1056 can be inserted thereinto and removed therefrom, and is connected to the motherboard 1070 by a PCI bus. The contents of the game to be played on the slot machine 1010 can be changed by replacing the memory card 1054 with another memory card 1054 having another program written therein or by rewriting the program written on the memory card 1054 into another program.

The CPU 1051, the ROM 1052 and the boot ROM 1053 mutually connected by the internal bus are connected to the motherboard 1070 by a PCI bus. The PCI bus enables a signal transmission between the motherboard 1070 and the gaming board 1050, and power supply from the motherboard 1070 to the gaming board 1050.

The ROM 1052 stores an authentication program. The boot ROM 1053 stores a pre-authentication program, a program (boot code) to be used by the CPU 1051 for activating the pre-authentication program, and the like.

The authentication program is a program (tamper check program) for authenticating the game program and the game system program. The pre-authentication program is a program for authenticating the aforementioned authentication program. The authentication program and the pre-authentication program are written along a procedure (authentication procedure) for proving that the program to be the subject has not been tampered.

The motherboard 1070, which is configured with a general-purpose mother board commercially available (a printed circuit board on which basic parts of a personal computer are mounted), includes a main CPU 1071, a ROM (Read Only Memory) 1072, a RAM (Random Access Memory) 1073, and a communication interface 1082. The motherboard 1070 corresponds to the controller 1100 of this embodiment.

The ROM 1072 includes a memory device such as a flash memory, and stores a program such as BIOS (Basic Input/Output System) to be executed by the main CPU 1071, and permanent data. When the BIOS is executed by the main CPU 1071, processing for initializing predetermined peripheral devices is conducted; further, through the gaming board 1050, processing of loading the game program and the game system program stored in the memory card 1054 is started. In the present invention, the ROM 1072 may be either rewritable or non-rewritable.

The RAM 1073 stores data which are used in operation of the main CPU 1071 and programs such as the symbol determination program. For example, when the processing of loading the aforementioned game program, game system program or authentication program is conducted, the RAM 1073 can store the program. The RAM 1073 is provided with working areas used for operations in execution of these programs. Examples of the areas include: an area that stores a counter for managing the number of games, the number of BETs, the number of payouts, the number of credits and the like; and an area that stores symbols (code numbers) determined by a lottery.

The communication interface 1082 is for controlling transmission and reception of data to and from the PTS terminal 1700. Further, the motherboard 1070 is connected with a later-described door PCB (Printed Circuit Board) 1090 and a body PCB 1110 by respective USBs. The motherboard 1070 is also connected with a power supply unit 1081.

When power is supplied from the power supply unit 1081 to the motherboard 1070, the main CPU 1071 of the motherboard 1070 is activated, and then power is supplied to the gaming board 1050 through the PCI bus so as to activate the CPU 1051.

The door PCB 1090 and the body PCB 1110 are connected with input devices such as a switch and a sensor, and peripheral devices the operations of which are controlled by the main CPU 1071.

The door PCB 1090 is connected with the control panel 1030 and a cold cathode tube 1093.

The control panel 1030 is provided with a spin switch 1031S, a change switch 1032S, a cashout switch 1033S, a 1-BET switch 1034S, and a MAX-BET switch 1035S, which correspond to the above-mentioned buttons, respectively. Each of the switches detects the corresponding button being pressed by the player, and outputs a signal to the main CPU 1071.

The cold cathode tube 1093 functions as a backlight installed on the rear face side of the upper image display panel 1131 and the lower image display panel 1141, and lights up based on a control signal outputted from the main CPU 1071.

The body PCB 1110 is connected with the lamp 1111, the speakers 1112, the touch panel 1069, and a graphic board 1130. The bill discriminator 1022, though connected to the PTS terminal 1700 in this example, may be connected to the slot machine 1010.

The lamp 1111 lights up based on a control signal outputted from the main CPU 1071. The speakers 1112 output sounds such as BGM, based on a control signal outputted from the main CPU 1071.

The touch panel 1069 detects a place on the lower image display panel 1141 touched by the player's finger or the like, and outputs to the main CPU 1071 a signal corresponding to the detected place.

The bill discriminator 1022 identifies whether or not a bill is proper, and receives a genuine bill into the cabinet 1011. The bill received into the cabinet 1011 is converted into a credit, and this credit is added to the credit owned by the player.

The graphic board 1130 controls display of images conducted respectively by the upper image display panel 1131 and the lower image display panel 1141, based on a control signal outputted from the main CPU 1071. The graphic board 1130 is provided with a VDP (Video Display Processor) for generating image data, a video RAM for storing the image data generated by the VDP, and the like. It is to be noted that the image data used for generation of image data by the VDP is included in the game program that has been read from the memory card 1054 and stored into the RAM 1073.

The graphic board 1130 is provided with a VDP (Video Display Processor) for generating image data based on a control signal outputted from the main CPU 1071, a video RAM for temporarily storing the image data generated by the VDP. It is to be noted that the image data used for generation of image data by the VDP is included in the game program that has been read from the memory card 1054 and stored into the RAM 1073.

[Circuit Configuration of PTS Terminal]

Figure 10:
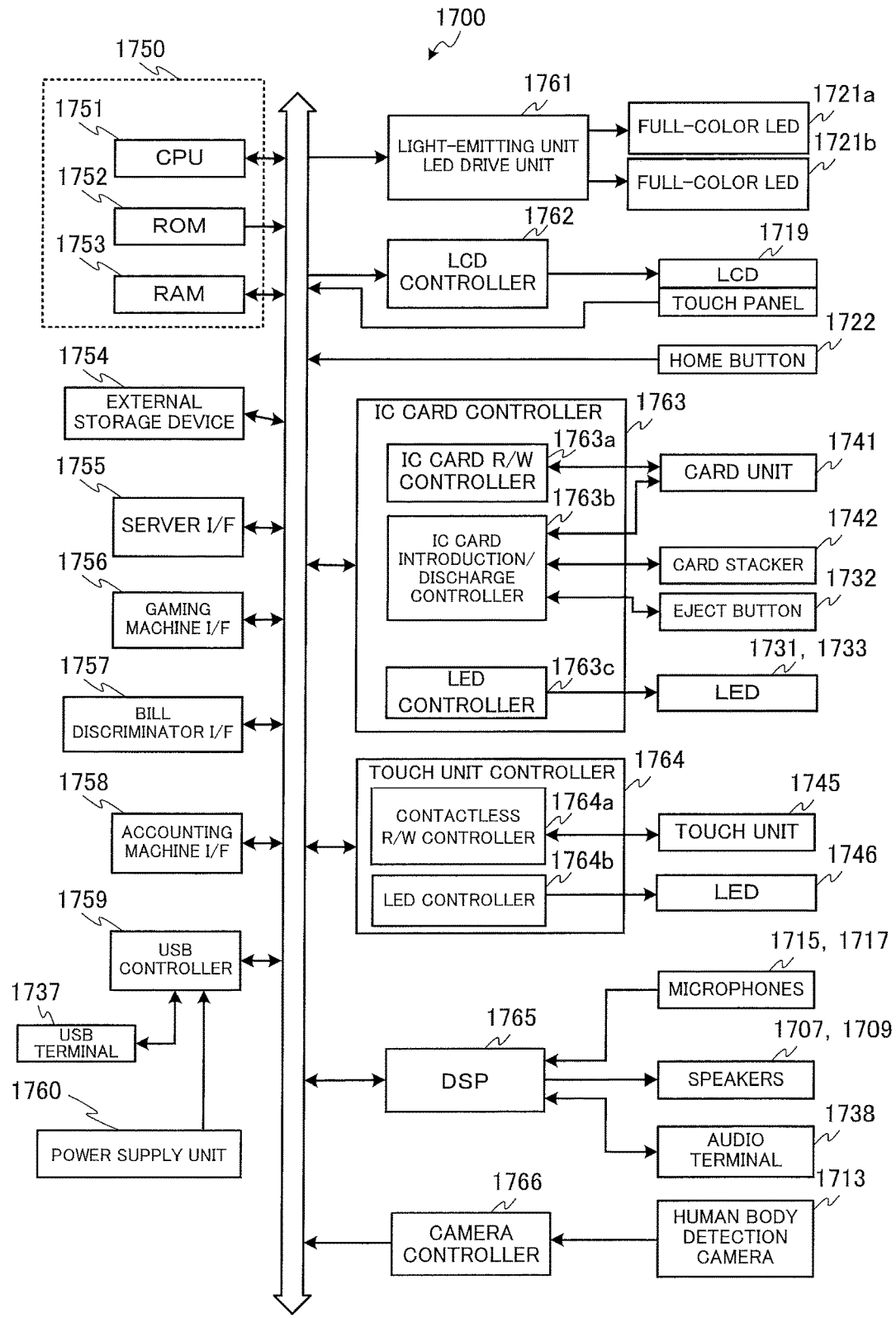
FIG. 10 shows a circuit configuration of the PTS terminal.

Next, a configuration of a circuit included in the PTS terminal 1700 is described with reference to FIG. 10.

A PTS controller 1750 that controls the PTS terminal 1700 includes a CPU 1751, a ROM 1752, and a RAM 1753.

The CPU 1751 controls operations of respective parts of the PTS terminal 1700, executes various programs stored in the ROM 1752, and performs calculation. For example, the CPU 1751 executes a credit update program, to update the credit-related data stored in the IC card 1500.

The ROM 1752 includes a memory device such as a flash memory, and stores permanent data to be executed by the CPU 1751. For example, the ROM 1752 can store the credit update program for rewriting the credit-related data stored in the IC card 1500, an interlocking effect control program to be executed in accordance with a request from the bonus server 11, and the like.

The RAM 1753 temporarily stores data necessary for executing the various programs stored in the ROM 1752.

An external storage device 1754, which is a storage device such as a hard disk device, stores programs to be executed by the CPU 1751 and data used for the programs to be executed by the CPU 1751.

A server I/F (interface) 1755 implements data communication between the PTS terminal 1700 and servers including the hall management server 10, the bonus server 11, the imaging control server 14, the recording server 15, and the like. A gaming machine I/F (interface) 1756 implements data communication between the PTS terminal 1700 and the controller 1100 of the slot machine 1010. For this data communication, a prescribed protocol can be used.

In addition, the PTS terminal 1700 is connected to the bill discriminator 1022 via a bill discriminator I/F (interface) 1757 and to the accounting machine 1868 via an accounting machine I/F (interface) 1758, so that the PTS terminal 1700 can transmit and receive data as need arises.

A USB controller 1759 determines whether or not to supply power from the power supply unit 1760 to the USB terminal 1737, and upon satisfaction of a predetermined condition, allows the USB terminal 1737 to be charged. If the predetermined condition is satisfied, the player is able to charge an electronic device by connecting the electronic device to the USB terminal 1737.

A light-emitting unit LED drive unit 1761 controls the full-color LEDs 1721a so as to light up them at predetermined timing and controls the full-color LEDs 1721b so as to light up them at predetermined timing in order that the light-emitting plate 1720a arranged above the LCD 1719 and the light-emitting plate 1720b arranged below the LCD 1719 can emit light, in accordance with an interlocking effect start request given from the bonus server 11.

An LCD controller 1762 controls the LCD 1719 so as to display the information about the member, the information directed to the member, and the like; and displays data read by the IC card 1500 or data inputted by the player. The LCD 1719 has a touch panel function, and in response to the player's operating the touch panel, transmits a predetermined signal to the CPU 1751.

The home button 1722, which is provided near the LCD 1719, is a button for shifting a screen displayed on the LCD 1719 into a predetermined superordinate screen. In response to the player's pressing the home button 1722, the player's operation is transmitted to the CPU 1751, and the CPU 1751 transmits a command to the LCD controller 1762, the command instructing the LCD controller 1762 to update the display of the LCD 1719 in accordance with the player's operation.

An IC card controller 1763 controls insertion and discharge of the IC card 1500, writing of credit data, and the like. The IC card controller 1763 includes an IC card R/W (reader/writer) controller 1763a, an IC card introduction/discharge controller 1763b, and an LED controller 1763c.

The IC card R/W controller 1763a controls the card unit 1741, to update the credit-related data stored in the IC card 1500. In a case of issuing a new IC card 1500, the IC card R/W controller 1763a stores credit-related data corresponding to the payback amount into the new IC card 1500. The card unit 1741 includes an antenna for reading or writing data from or to the IC card 1500 by NFC or the like.

The card unit 1741 has a function as an IC card reader for reading information stored in the IC card 1500 and a function as an IC card writer for writing information into the IC card 1500, but either one of the functions may be provided as appropriate.

The IC card introduction/discharge controller 1763b controls introduction and discharge of the IC card 1500. After the player inserts the IC card 1500 into the card slot 1730, the IC card introduction/discharge controller 1763b performs a control of keeping the IC card held in the card unit 1741 while the player is playing. The IC card introduction/discharge controller 1763b also performs a control of discharging the IC card 1500 after the credit-related data is written into the IC card 1500 at a time of payback. The IC card introduction/discharge controller 1763b also discharges the IC card 1500 in response to the eject button 1732 being pressed.

In a case of issuing a new IC card 1500, a new IC card 1500 is taken out from the card stacker 1742 and fed to the card unit 1741 so that credit-related data can be stored in the IC card 1500.

The LED controller 1763c performs a control of lighting up the LED (full-color LED 1731) provided near the card slot 1730 of the card unit 1741, and also performs a control of lighting up the LED (red LED 1733) provided near the eject button 1732.

The touch unit controller 1764 controls transmission and reception of data involved in touch operations using the IC card 1500, a mobile phone, a smart phone, or the like. The touch unit controller 1764 includes a contactless R/W (reader/writer) controller 1764a and an LED controller 1764b.

The contactless R/W controller 1764a determines whether or not the IC card 1500 or a mobile phone is within a predetermined distance from the touch unit 1745 (for example, a touch operation is made), and if it is within the predetermined distance, obtains a reading result or the like from the touch unit 1745. The touch unit 1745 includes an antenna for transmitting and receiving data to and from the IC card 1500 or the mobile phone by NFC or the like.

The touch unit 1745 has a function as an IC card reader for reading information stored in the IC card 1500 or the mobile phone and a function as a IC card writer for writing information into the IC card 1500 or the mobile phone, but either one of the functions may be provided as appropriate.

The LED controller 1764b controls the LEDs 1746 arranged at the four corners of the front face of the touch unit 1745, and lights up the LEDs 1746 at predetermined timing.

A DSP 1765 receives voice data obtained from the microphones 1715 and 1717, performs predetermined voice processing, and then transmits the resultant data to the CPU 1751. The DSP 1765 also transmits the received voice data to the speakers 1707 and 1709. The DSP 1765 also outputs a received voice to the headphones via the audio terminal having the headset connected thereto, and processes a voice received from the microphone to transmit the processed voice to the CPU 1751. It is to be noted that merely an outline configuration is illustrated herein with an A/D converter, a D/A converter, an amplifier, and the like, being omitted.

A camera controller 1766 obtains an image of the player or the like captured by the human body detection camera 1713, performs predetermined image processing as appropriate, and transmits the resultant data to the CPU 1751. The data is, for example, transmitted to the hall management server 10, the member management server 13, the imaging control server 14, the recording server 15, or the like, via a server I/F 1755.

The camera controller 1766 also transmits image pickup information of an image captured by the human body detection camera 1713 to the imaging control server 14 in accordance with an instruction from the imaging control server 14.

[Configuration of Symbol Combination Table]

Next, a symbol combination table is described with reference to FIG. 11.

The symbol combination table specifies combinations of drawn symbols relating to winning, and the number of payouts. In the slot machine 1010, the scrolling of symbol arrays of the pseudo reels 1151 to 1155 (first to fifth video reels) in the five columns is stopped, and winning is established when a combination of symbols displayed on a winning line matches one of the combinations of symbols specified by the symbol combination table. According to a combination of symbols related to winning (winning combination), a benefit such as a payout of the credit is offered to the player. It is to be noted that winning is not established (i.e. the game is lost) when the combination of symbols displayed on the winning line does not match any of the combinations of symbols specified by the symbol combination table.

Basically, winning is established when all the symbols forming "RED", "APPLE", "BLUE 7", "BELL", "CHERRY", "STRAWBERRY", "PLUM", or "ORANGE" are displayed on the winning line by the pseudo reels 1151 to 1155 in the five columns. However, with respect to the symbols forming "CHERRY" or "ORANGE", winning is also established when one or three of the symbols is/are displayed on the winning line by the corresponding one or three pseudo reels.

For example, if all the symbols forming "BLUE 7" are displayed on the winning line by the pseudo reels 1151 to 1155 in the five columns, the winning combination is "BLUE" and it is determined that the number of payouts is "10". Based on the number of payouts thus determined, the credit is paid out. The payout of the credit is implemented by, for example, storing the credit obtained by addition into the IC card 1500 and then discharging the IC card 1500 through the card slot 1730.

[Contents of Programs Executed in Slot Machine]

Next, programs executed by the slot machine 1010 are described with reference to FIGS. 12 to 16. The slot machine 1010 is configured such that, upon detection of an error, fraud, or the like, it is transmitted as circumstances information to the hall management server 10 and the imaging control server 14.

<Main Control Process>

Figure 12:
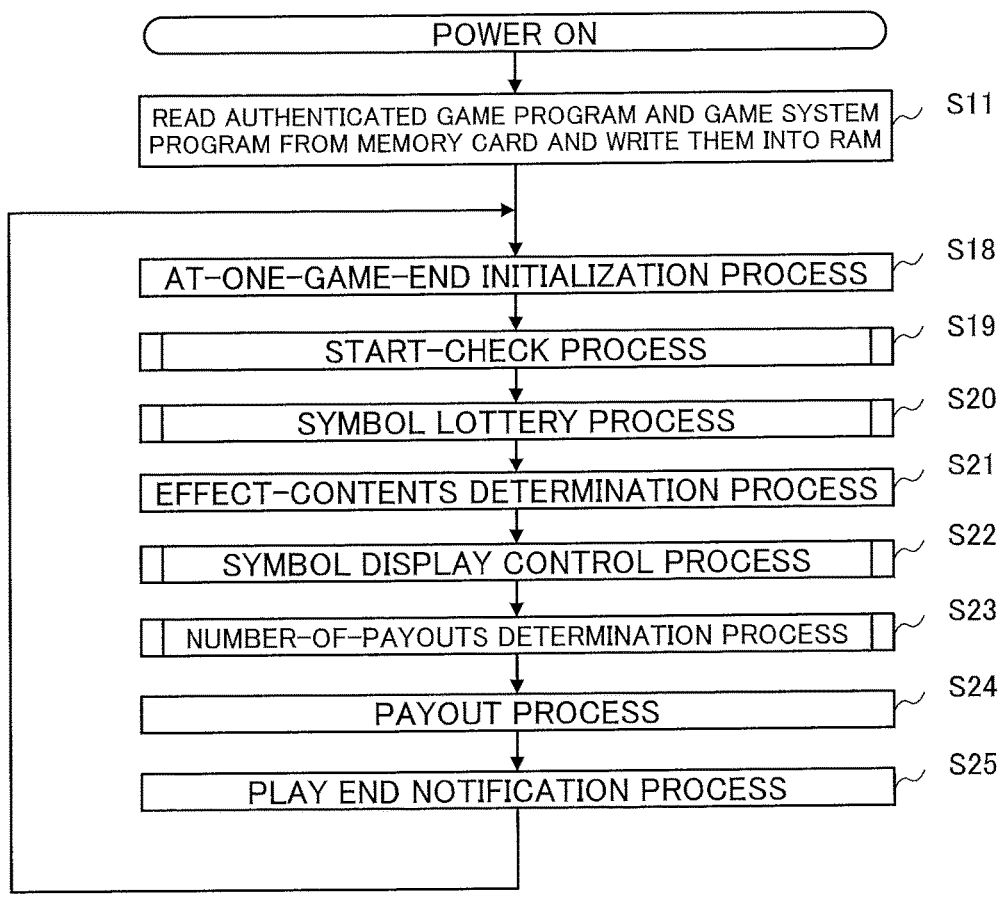
FIG. 12 exemplifies a flowchart of a main control process of the slot machine.

A main control process is described with reference to FIG. 12. First, when the slot machine 1010 is powered on, the main CPU 1071 reads the authenticated game program and game system program from the memory card 1054 through the gaming board 1050, and writes the programs into the RAM 1073 (step (hereinafter abbreviated as "S") 11).

Next, the main CPU 1071 conducts an at-one-game-end initialization process (S18). For example, data that becomes unnecessary after each game in the working areas of the RAM 1073, such as the number of BETs and the symbols determined by lottery, is cleared.

Then, the main CPU 1071 conducts a start-check process which will be described later (S19). In this process, inputs from the BET switch and the spin switch are checked, for example.

The main CPU 1071 then conducts a symbol lottery process which will be described later (S20). In this process, to-be stopped symbols are determined based on random values for symbol determination.

Then, the main CPU 1071 conducts an effect-contents determination process (S21). The main CPU 1071 extracts a random value for effect, and determines by lottery any of a plurality of effect contents that are preset. The effect contents can be determined in accordance with the winning combination and the playing status on the slot machine 1010. In a possible configuration, for example, the probability of winning the lottery for each effect varies in accordance with the winning combination and the playing status on the slot machine 1010.

The main CPU 1071 then conducts a symbol display control process which will be described later (S22). In this process, scrolling of the pseudo reels 1151 to 1155 in the five columns (first to fifth video reels) is started, and each of the to-be stopped symbols determined in the symbol lottery processing of S20 is stopped at a predetermined position (e.g., in the display window 1150 of the lower image display panel 1141). That is, four symbols including the to-be stopped symbol are displayed in the display window 1150 with respect to each reel. For example, when the to-be stopped symbol is the symbol associated with the code number "10" and it is to be displayed in an upper region, the symbols associated with the code numbers "11", "12" and "13" are to be displayed in an upper central region, a lower central region and a lower region of the display window 1150, respectively.

Next, the main CPU 1071 conducts a number-of-payouts determination process which will be described later (S23). In this process, the number of payouts is determined based on the combination of symbols displayed on the winning line, and is stored into a number-of-payouts counter provided in the RAM 1073.

Then, the main CPU 1071 conducts a payout process (S24). The main CPU 1071 adds the value stored in the number-of-payouts counter to the value stored in a number-of-credits counter provided in the RAM 1073. If, for example, the player presses a cashout button at this time, the cashout switch 1033S detects the pressing and outputs a signal to the main CPU 1071, so that the number of credits stored in the IC card 1500 received in the card unit 1741 is updated with the value stored in the number-of-credits counter.

Then, the main CPU 1071 conducts a play end notification process (S25). This process is a process in which data indicating the end of one unit game (together with, for example, the identification code of the IC card 1500, in a case where the IC card 1500, etc., is inserted so that the player can be identified) is transmitted to the PTS terminal 1700. The PTS terminal 1700 transmits this data to the hall management server 10, and in accordance with this data, the bonus server 11 holds a bonus game lottery. After the processing of S25 ends, the process returns to S18, to repeat the unit game.

<Start-Check Process>

Figure 13:
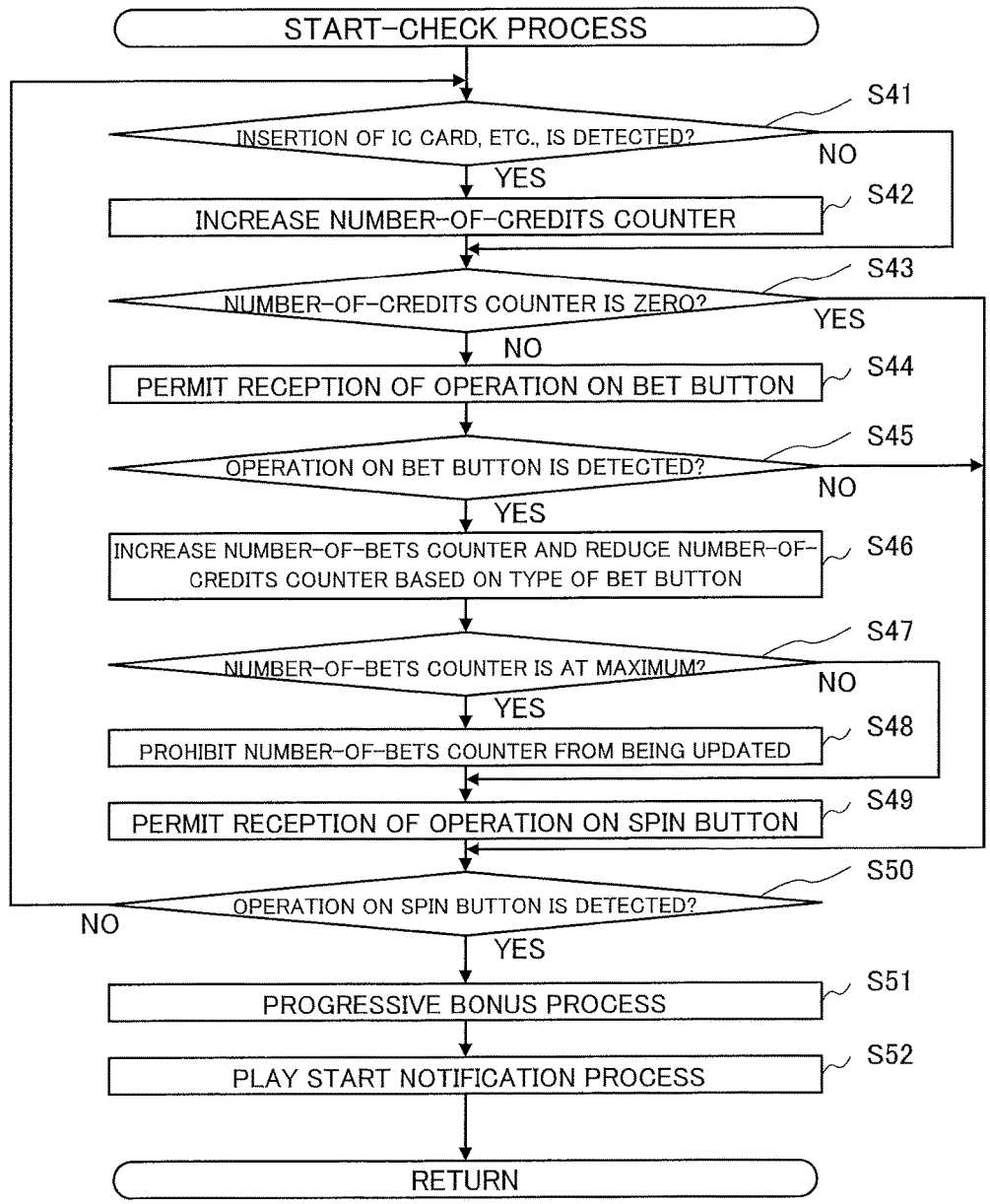
FIG. 13 exemplifies a flowchart of a coin-insertion/start-check process of the slot machine.

Next, a start-check process is described with reference to FIG. 13. First, the main CPU 1071 determines whether or not insertion of the IC card 1500, etc., has been detected (S41). Upon determination that the insertion of the IC card 1500, etc., has been detected, the main CPU 1071 makes an addition to the value stored in the number-of-credits counter (S42). In addition, the main CPU 1071 determines whether or not insertion of a bill has been detected by the bill discriminator 1022 as well as the insertion of the IC card 1500, etc., and upon determination that the insertion of a bill has been detected, the main CPU 1071 adds a value equivalent to the bill to the value stored in the number-of-credits counter.

After S42 or upon determining in S41 that insertion of the IC card 1500, etc., has not been detected, the main CPU 1071 determines whether or not the value stored in the number-of-credits counter is zero (S43). When the main CPU 1071 determines that the value stored in the number-of-credits counter is not zero, the main CPU 1071 permits an operation on the BET buttons to be received (S44).

Next, the main CPU 1071 determines whether or not an operation on any of the BET buttons has been detected (S45). Upon determination that the BET switch has detected pressing of the BET button by the game player, the main CPU 1071 makes an addition to the value stored in a number-of-BETs counter provided in the RAM 1073 and makes a subtraction from the value stored in the number-of-credits counter, based on the type of the BET button (S46).

Then, the main CPU 1071 determines whether or not the number-of-BETs counter is at its maximum (S47). Upon determination that the number-of-BETs counter is at its maximum, the main CPU 1071 prohibits the number-of-BETs counter from being updated (S48). After S48 or upon determining in S47 that the number-of-BETs counter is not at its maximum, the main CPU 1071 permits an operation on the spin button to be received (S49).

After S49, or upon determining in S45 that the operation on any of the BET buttons is not detected or in S43 that the value stored in the number-of-credits counter is zero; the main CPU 1071 determines whether or not an operation on the spin button is detected (S50). Upon determination that an operation on the spin button is not detected, the main CPU 1071 proceeds to the processing of S41.

Upon determination that an operation on the spin button is detected, the main CPU 1071 conducts a progressive bonus process. In this process, the credit that has been bet is partially paid to the bonus server 11 via the PTS terminal 1700, as a credit to be accumulated for a progressive bonus, for example (S51).

Then, the main CPU 1071 conducts a play start notification process (S52). This process is a process in which data indicating the start of one unit game (together with, for example, the identification code of the IC card 1500, in a case where the IC card 1500, etc., is inserted so that the player can be identified) is transmitted to the PTS terminal 1700. The PTS terminal 1700 transmits this data to the hall management server 10, and in accordance with this data, the bonus server 11 holds a bonus game lottery. After the processing of S52 ends, the start-check process is terminated.

<Symbol Lottery Process>

Figure 14:
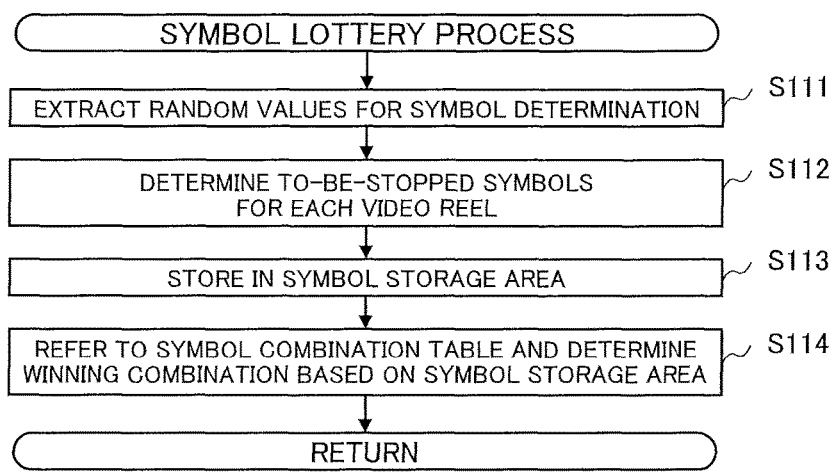
FIG. 14 exemplifies a flowchart of a symbol lottery process of the slot machine.

Next, a symbol lottery process is described with reference to FIG. 14. First, the main CPU 1071 extracts random values for symbol determination (S111). The main CPU 1071 then determines to-be stopped symbols for the pseudo reels 1151 to 1155 in the five columns (first to fifth video reels), by lottery (S112). The main CPU 1071 holds a lottery for each video reel, and determines any one of 22 symbols (code numbers from "00" to "21") as a to-be stopped symbol. At this time, each of the 22 symbols (code numbers from "00" to "21") is determined at an equal probability (i.e. 1/22).

The main CPU 1071 then stores the determined to-be stopped symbols for the respective video reels into a symbol storage area provided in the RAM 1073 (S113). Next, the main CPU 1071 references the symbol combination table (FIG. 11) and determines a winning combination based on the symbol storage area (S114). The main CPU 1071 determines whether or not the combination of symbols to be displayed on the winning line by the respective video reels matches any of the combinations of symbols specified by the symbol combination table, and determines the winning combination. Upon completion of this processing, the symbol lottery process ends.

<Symbol Display Control Process>

Figure 15:
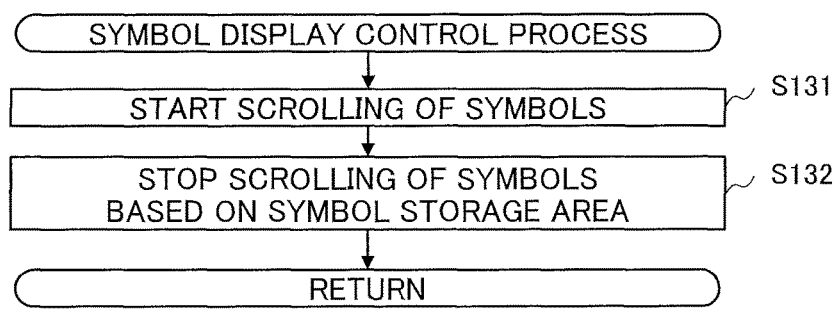
FIG. 15 exemplifies a flowchart of a symbol display control process of the slot machine.

Next, a symbol display control process is described with reference to FIG. 15. First, the main CPU 1071 starts scrolling of the symbol arrays of the respective video reels that are displayed in the display window 1150 of the lower image display panel 1141 (S131). The main CPU 1071 then stops the scrolling of the symbol arrays of the respective video reels, based on the aforementioned symbol storage area (S132). Upon completion of this processing, the symbol display control process ends.

The effect determined in the effect-contents determination process (FIG. 12) is produced in time with the timing when the scrolling of the symbol arrays is started and stopped in the symbol display control process or another timing. This effect can be produced by, for example, displaying a moving image or a still image on the upper image display panel 1131 of the slot machine 1010 and, in synchronization with this, outputting a voice from the speakers 1112 as well as lighting up the lamp 1111.

<Number-of-Payouts Determination Process>

Figure 16:
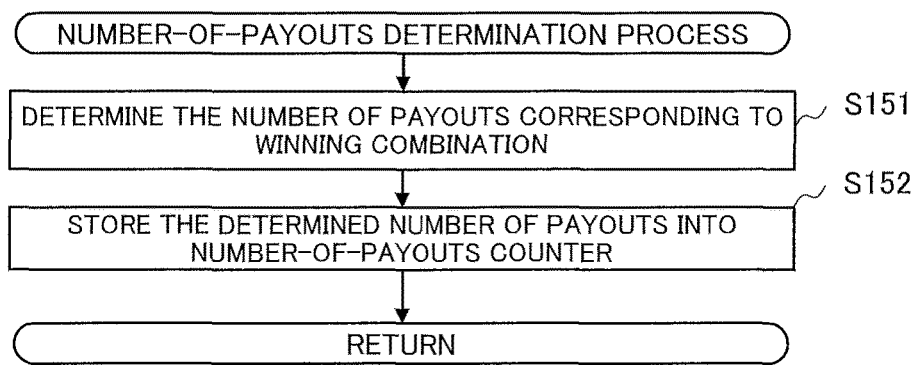
FIG. 16 is a flowchart illustrating steps of a number-of-payouts determination process of the slot machine.

Next, a number-of-payouts determination process is described with reference to FIG. 16. First, the main CPU 1071 determines the number of payouts corresponding to a combination of symbols (winning combination) stopped (S151). For example, in a case of the winning combination of "BELL", it is determined that the number of payouts is "8" (see FIG. 11). In a case of losing, it is determined that the number of payouts is "0". Then, the main CPU 1071 stores the determined number of payouts into the number-of-payouts counter (S152). Upon completion of this processing, the number-of-payouts determination process ends.

If the bonus game lottery held by the bonus server 11 is won, the interlocking effect is produced by the PTS terminals 1700 of the plurality of slot machines 1010 including the winning slot machine 1010, and concurrently the bonus server 11 pays out a bonus. This bonus is added to the number-of-payouts counter, for example.

[Configuration of Signage]

Figure 17:
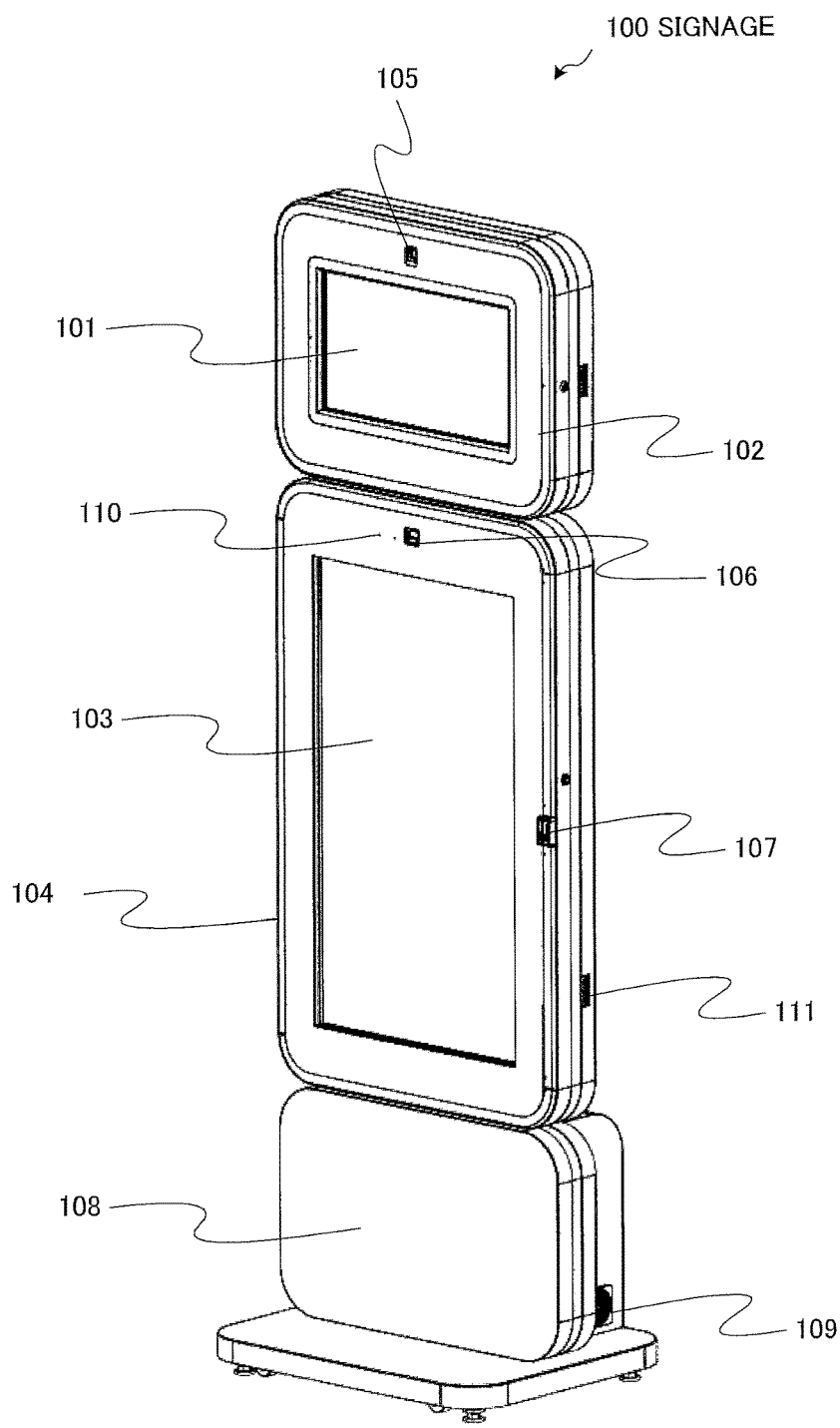
FIG. 17 shows an overall structure of a signage.

FIG. 17 shows a signage 100 adopted in the game system 1. The signage 100 is an information display apparatus used mainly to display a store advertisement (including a billboard), a hall floor guide, and the like. The signage 100 is connectable to the server of the game system 1 (e.g., to the bonus server 11 or the member management server 13) via a network.

The signage 100 includes an LCD 101 and an LCD 103 with a touch panel function. The LCD 101 is a liquid crystal display device of 24 inches (about 60.96 cm), for example. The LCD 103 is a liquid crystal display device of 46 inches (about 116.84 cm), for example. As mentioned above, these LCDs display advertisement information, guidance information, and the like. The touch panel function of the LCD 103 is implemented by, for example, a touch panel having an infrared scheme. While the LCD 103 is provided with the touch panel function in this example, another input device such as a keyboard or a mouse may also be used to input instructions.

Each of the LCD 101 and the LCD 103 is housed in a cabinet. Effect LEDs 102 and 104, which are for effect purposes, are provided in peripheral portions of front faces of the respective cabinets. The effect LEDs 102 and 104 are, for example, LED lights arranged on tapes.

The signage 100 further includes motion sensors 105 and 106 provided in the cabinets of the LCD 101 and the LCD 103, respectively. For example, the motion sensors 105 and 106 are cameras. Video images captured by the motion sensors 105 and 106 are used to analyze behaviors of a user using the signage 100 or a person passing through a passage. Image pickup information is transmitted to the imaging control server 14 and the recording server 15.

The signage 100 is also provided with a touch unit 107 including an RFID module capable of data communication with a mobile phone or a smart phone having a communication function using a contactless IC card or NFC. A member is able to login by placing a member card (IC card) associated with the member over the touch unit 107, so that the LCD 101 or the LCD 103 displays a member menu screen and information concerning the member. The information concerning the member is, for example, obtained from the member management server 13.

A hall staff is able to login by placing a staff IC card, so that the LCD 101 or the LCD 103 displays a staff menu screen, and the like.

Unlike the PTS terminal 1700, the signage 100 does not include any card unit capable of holding the IC card 1500. The signage 100 includes the touch unit 107 alone. The signage 100 is configured such that the information concerning the member, which has been displayed on the LCD 103 or the like by the user's touching with the IC card, is hidden upon elapse of a predetermined period so that log off of the user is automatically made even though the user leaves the signage 100 without logging off.

The signage 100 further includes a microphone 133 for obtaining a voice, which is provided in the cabinet of the LCD 103. The cabinet of the LCD 103 has a microphone opening 110 at a position corresponding to the microphone. In FIG. 17, the microphone opening 110 is shown at a side of the motion sensor 106.

The signage 100 also includes speakers 134 and 135 for outputting a voice, which are provided in the cabinet of the LCD 103. The cabinet of the LCD 103 has speaker ducts at positions corresponding to the speakers, respectively. In FIG. 17, a speaker duct 111 corresponding to one of the speakers is shown.

In addition, the signage 100 includes a base unit 108 that supports the cabinets of the LCD 101 and the LCD 103, and a control unit 109 provided therein with a controller that controls the LCDs, the LEDs, and the like.

[Circuit Configuration of Signage]

Figure 18:
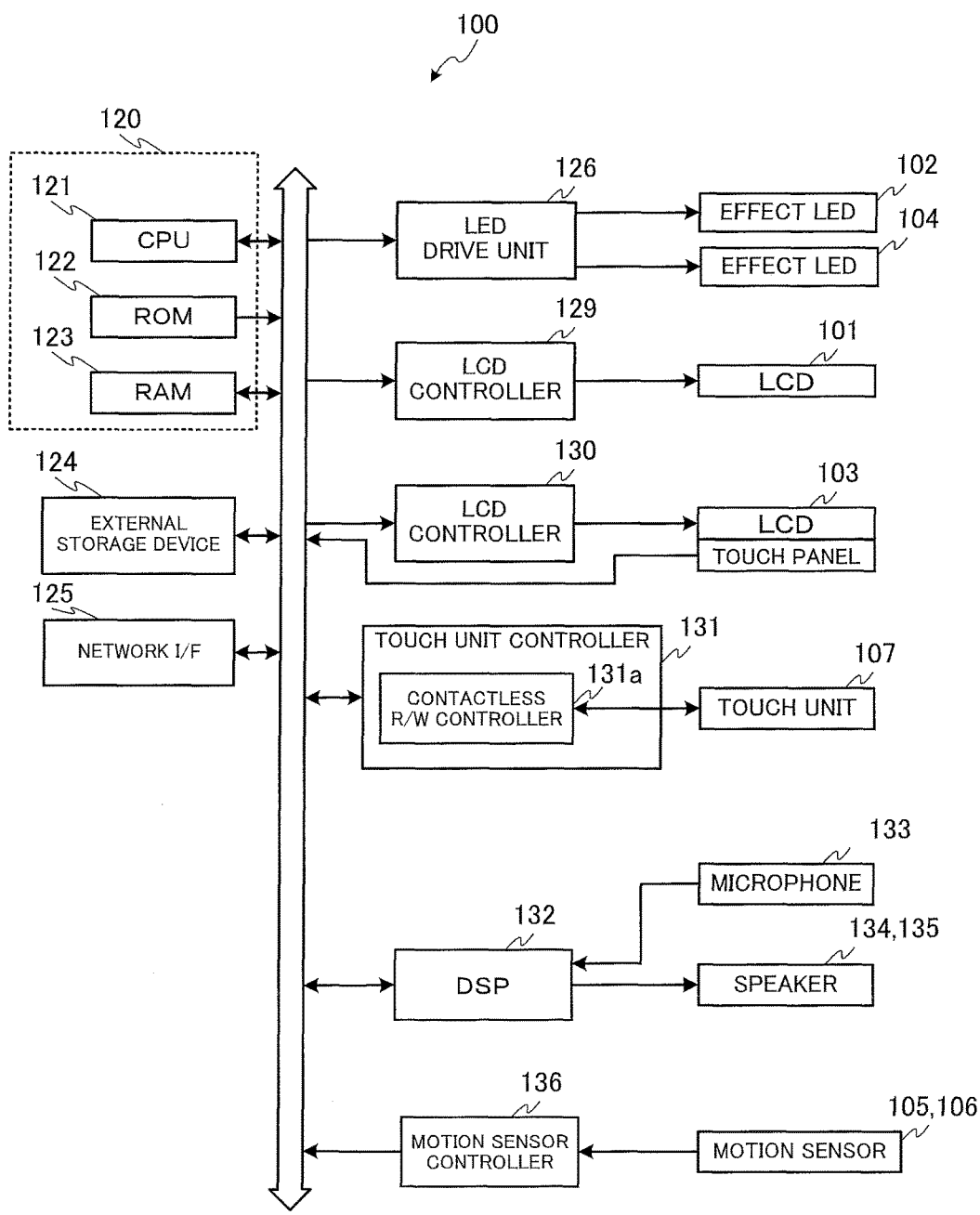
FIG. 18 shows a circuit configuration of the signage.

Next, a configuration of a circuit included in the signage 100 is described with reference to FIG. 18.

A signage controller 120 that controls the signage 100 includes a CPU 121, a ROM 122, and a RAM 123.

The CPU 121 controls operations of respective parts of the signage, executes various programs stored in the ROM 122, and performs calculation.

The ROM 122 includes a memory device such as a flash memory, and stores permanent data to be executed by the CPU 121. For example, the ROM 122 can store an interlocking effect control program to be executed in accordance with a request from the bonus server 11, and the like.

The RAM 123 temporarily stores data necessary for executing the various programs stored in the ROM 122.

An external storage device 124, which is a storage device such as a hard disk device, stores programs to be executed by the CPU 121 and data used for the programs to be executed by the CPU 121.

A network I/F (interface) 125 implements data communication with the PTS terminal 1700 and servers including the bonus server 11, the member management server 13, the imaging control server 14, the recording server 15, and the like.

An LED drive unit 126 controls the effect LEDs 102 and 104 so as to light up them at predetermined timing in accordance with an interlocking effect start request given from the bonus server 11. The LED drive unit 126 may also be operable to make the effect LEDs 102 and 104 emit light in synchronization with displaying the advertisement information, displaying the guidance information, displaying the member information based on a member's operation, and the like.

An LCD controller 129 controls the LCD 101 so as to display information such as the advertisement information mentioned above.

An LCD controller 130 controls the LCD 103 so as to display information such as the advertisement information mentioned above. The LCD 103 has a touch panel function to transmit a user operation to the CPU 121.

A touch unit controller 131 controls transmission and reception of data involved in touch operations on the touch unit 107 with an IC card or a mobile phone. The touch unit controller 131 includes a contactless R/W (reader/writer) controller 131a.

A contactless R/W controller 131a determines whether or not a touch operation with an IC card or a mobile phone is made on the touch unit 107, and if a touch operation is made, obtains a reading result from the touch unit 107, for example. The touch unit 107 includes an antenna for transmitting and receiving data to and from the IC card or the mobile phone by NFC or the like.

Upon receiving an identification code of the member card (IC card) from the touch unit 107, the CPU 121 obtains member information associated with the identification code from the member management server 13, and displays the information on the LCD 101 or the LCD 103. The CPU 121 can also make the LCD 103 display an operation menu for the member, or make the LCD 101 or the LCD 103 display advertisement information appropriate for the member.

A DSP 132 receives voice data obtained from the microphone 133, performs predetermined processing thereon, and then transmits the resultant data to the CPU 121. The DSP 132 transmits the received voice data to the speakers 134 and 135, for outputting.

A motion sensor controller 136 receives an image of a user or the like from the motion sensors (e.g., cameras) 105 and 106, performs predetermined image processing thereon as appropriate, and transmits the resultant data to the CPU 121.

The motion sensor controller 136 is operable to obtain image pickup information from the motion sensors 105 and 106, and transmit the image pickup information to the imaging control server 14 in real-time, at regular intervals, or in response to an acquisition request given from the imaging control server 14. The motion sensor controller 136 is also operable to obtain image pickup information from the motion sensors 105 and 106, and transmit the image pickup information to the recording server 15 in real-time, at regular intervals, or in response to an acquisition request given from the imaging control server 14.

[Configuration of Kiosk Terminal]

Figure 19:
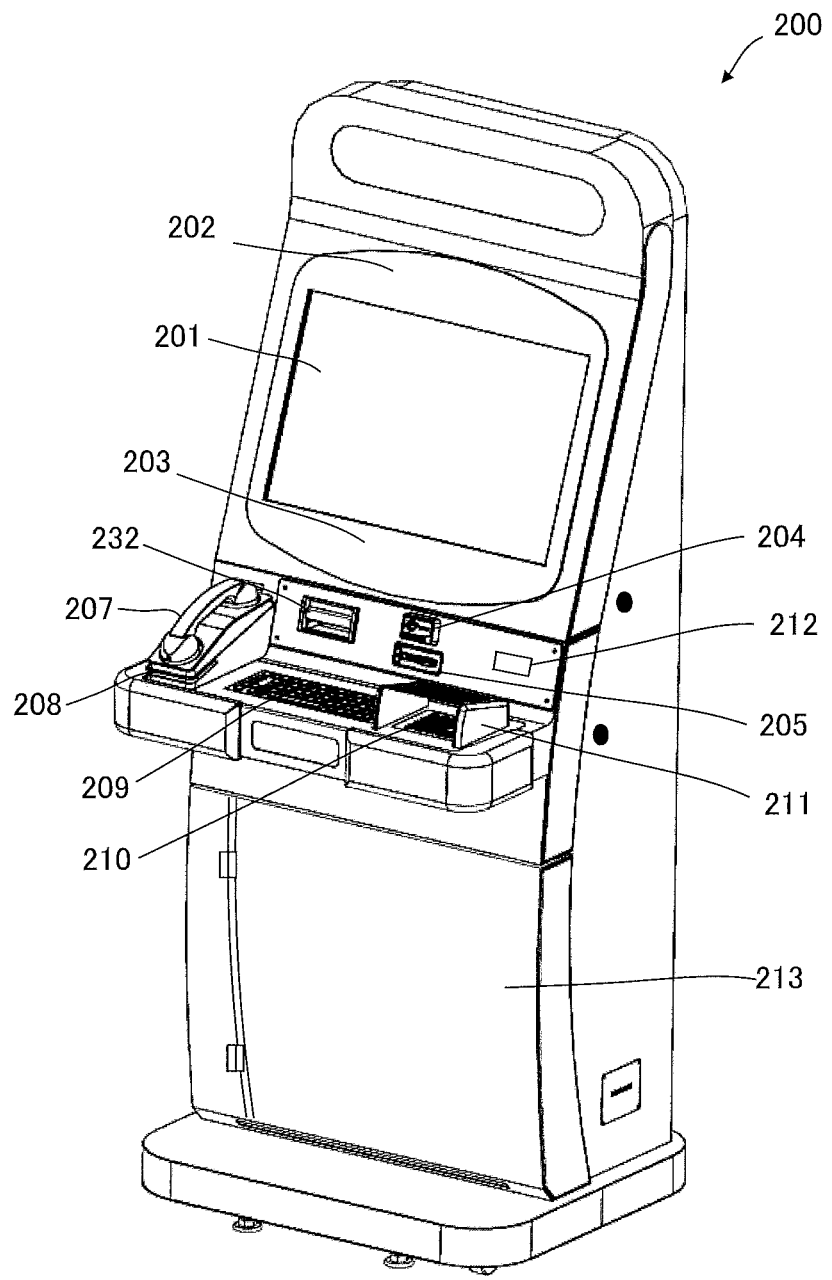
FIG. 19 shows an overall structure of a kiosk terminal.

FIG. 19 shows a kiosk terminal 200 adopted in the game system 1. The kiosk terminal 200 is an information display apparatus used mainly to display information concerning the plays made in the hall, such as start of the bonus game in the bonus server 11, countdown to the start, today's winning ranking, machine popularity ranking, and the like. The kiosk terminal 200 is connectable to the server of the game system 1 (e.g., to the bonus server 11, the member management server 13, or the imaging control server 14) via a network.

The kiosk terminal 200 includes an LCD 201 with a touch panel function. The LCD 201 is a liquid crystal display device of 24 inches (about 60.96 cm), for example. As mentioned above, this LCD displays the information concerning the plays made in the hall, and the like. While the LCD 201 is provided with the touch panel function in this example, another input device such as a keyboard or a mouse may also be used to input instructions.

The kiosk terminal 200 includes motion sensors 202 and 203 provided above and below the LCD 201, respectively. For example, the motion sensors 202 and 203 are cameras. Video images captured by the motion sensors 202 and 203 are used to analyze behaviors of a user using the kiosk terminal 200 or a person passing through a passage. Image pickup information is transmitted to the imaging control server 14 and the recording server 15.

The kiosk terminal 200 is also provided with a touch unit 204 including an RFID module capable of data communication with a mobile phone or a smart phone having a communication function using a contactless IC card or NFC. A member is able to login by placing a member card (IC card) associated with the member over the touch unit 204, so that the LCD 201 displays a member menu screen and information concerning the member. The information concerning the member is, for example, obtained from the member management server 13. In addition to the touch unit 204 or instead of the touch unit 204, an information recording medium reading apparatus may be provided for reading information stored in an information recording medium as exemplified by a magnetic card. In such a configuration, a magnetic card instead of the IC card 1500 can be used as the member card.

A hall staff is able to login by placing a staff IC card, so that the LCD 201 displays a staff menu screen, and the like.

The kiosk terminal 200 is also provided with a card slot 205 through which the IC card 1500 can be inserted or removed. The card slot 205 has an eject button. A card unit 230 is provided within a kiosk housing at a position corresponding to the card slot 205. The card slot 205 is configured as a part of the card unit 230.

Insertion of the member card into the card slot 205 allows the LCD 201 to display the member menu screen or the information concerning the member. The card unit 230 is operable to issue and collect limited cards and reward cards.

The kiosk terminal 200 includes a ticket printer 232. The ticket printer 232 is operable to issue and collect tickets and coupons, and may be provided with a function as a bill discriminator.

The kiosk terminal 200 includes a phone receiver 207 used for a VoIP conversation. A user using the kiosk terminal 200 is able to talk with a user using another kiosk terminal 200 or a player playing on a gaming machine via the phone receiver 207. A control is performed so as to make an incoming alert LED 208 emit light upon arrival of an incoming VoIP call.

The kiosk terminal 200 includes a keyboard 209 and a numeric keypad 210 that the user uses to input data (for making membership registration, and making text chatting), and also includes LED plates 211 for privacy protection arranged at opposite sides of the numeric keypad 210.

The kiosk terminal 200 includes a QR code scanner 212 for reading a QR code (registered trademark), which is operable to read a QR code attached to a mail addressed to a mobile phone or the like.

In addition, the kiosk terminal 200 includes a storage 213 that stores therein a controller for controlling the LCD, the LED, and the like.

[Circuit Configuration of Kiosk Terminal]

Figure 20:
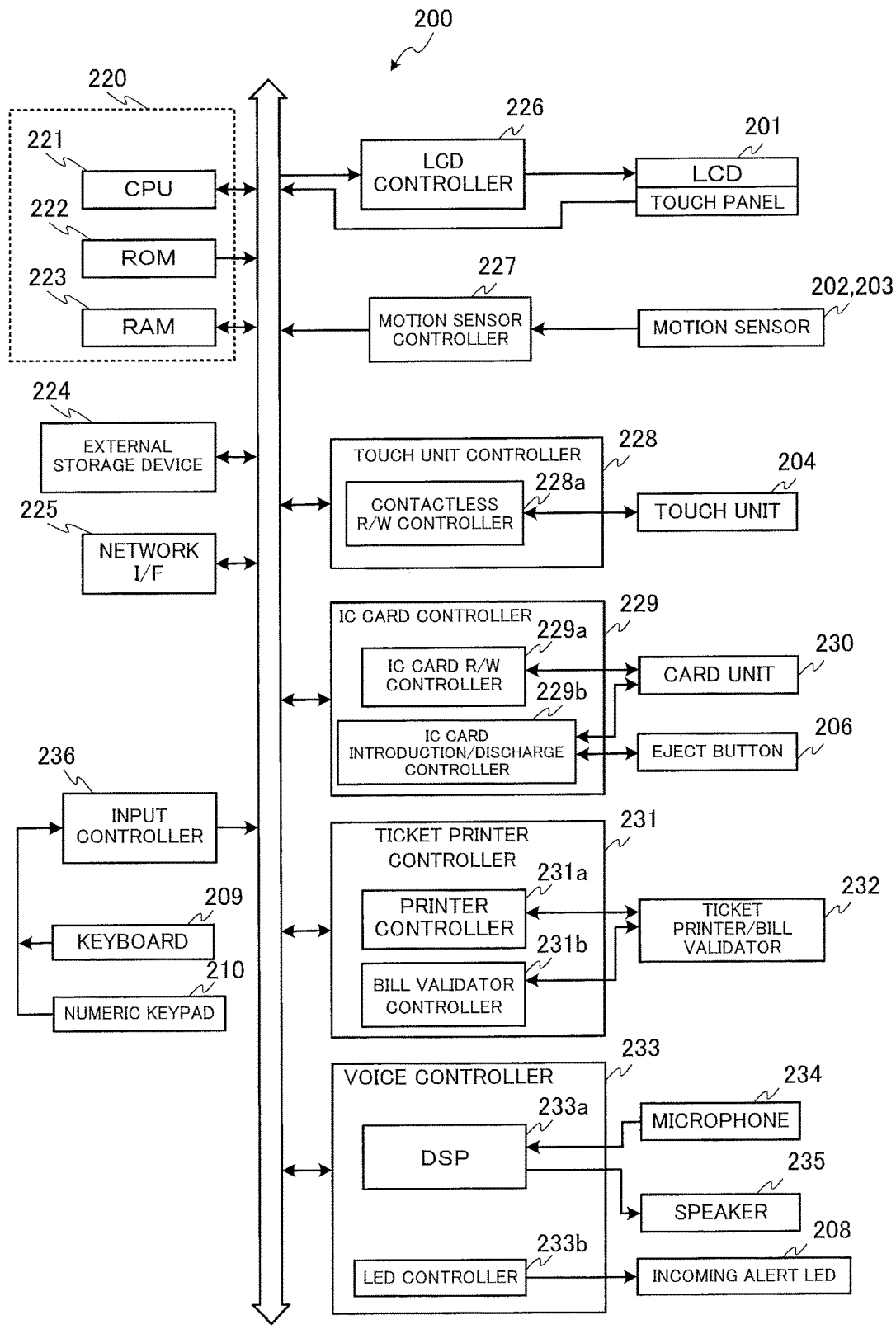
FIG. 20 shows a circuit configuration of a kiosk terminal.

Next, a configuration of a circuit included in the kiosk terminal 200 is described with reference to FIG. 20.

A kiosk terminal controller 220 that controls the kiosk terminal 200 includes a CPU 221, a ROM 222, and a RAM 223.

The CPU 221 controls operations of respective parts of the kiosk terminal, executes various programs stored in the ROM 222, and performs calculation.

The ROM 222 includes a memory device such as a flash memory, and stores permanent data to be executed by the CPU 221. For example, the ROM 222 can store a VoIP conversation control program, and the like.

The RAM 223 temporarily stores data necessary for executing the various programs stored in the ROM 222.

An external storage device 224, which is a storage device such as a hard disk device, stores programs to be executed by the CPU 221 and data used for the programs to be executed by the CPU 221.

A network I/F (interface) 225 implements data communication with the PTS terminal 1700 and servers including the bonus server 11, the member management server 13, the imaging control server 14, the recording server 15, and the like.

The LCD controller 226 controls the LCD 201 so as to display information including play information mentioned above, and the like. The LCD 201 has a touch panel function to transmit a user operation to the CPU 221.

The LCD controller 226 is also operable to control the LCD 201 so as to display a floor map generated by the imaging control server 14.

A motion sensor controller 227 receives an image of a user or the like from the motion sensors (e.g., cameras) 202 and 203, performs predetermined image processing thereon as appropriate, and transmits the resultant data to the CPU 221.

The motion sensor controller 227 is operable to obtain image pickup information from the motion sensors 202 and 203, and transmit the image pickup information to the imaging control server 14 in real-time, at regular intervals, or in response to an acquisition request given from the imaging control server 14. The motion sensor controller 227 is also operable to obtain image pickup information from the motion sensors 202 and 203, and transmit the image pickup information to the recording server 15 in real-time, at regular intervals, or in response to an acquisition request given from the imaging control server 14.

A touch unit controller 228 controls transmission and reception of data involved in touch operations on the touch unit 204 with an IC card or a mobile phone. The touch unit controller 228 includes a contactless R/W (reader/writer) controller 228a.

The contactless R/W controller 228a determines whether or not a touch operation with an IC card or a mobile phone is made on the touch unit 204, and if a touch operation is made, obtains a reading result from the touch unit 204, for example. The touch unit 204 includes an antenna for transmitting and receiving data to and from the IC card or the mobile phone by NFC or the like.

An IC card controller 229 controls insertion and discharge of the IC card 1500, reading of data, and the like. The IC card controller 229 includes an IC card R/W (reader/writer) controller 229a and an IC card introduction/discharge controller 229b.

The IC card R/W controller 229a controls the card unit 230 to read the identification code, etc., stored in the IC card 1500. The card unit 230 includes an antenna for writing data into the IC card 1500 by NFC or the like.

The IC card introduction/discharge controller 229b controls introduction and discharge of the IC card 1500. After the user inserts the IC card 1500 into the card slot 205, the IC card introduction/discharge controller 229b performs a control of keeping the IC card held in the card unit 230 until the user logs off. The IC card introduction/discharge controller 229b also discharges the IC card 1500 in response to the eject button being pressed.

A ticket printer controller 231 controls a ticket-printer/bill-validator 232 to issue and collect tickets and coupons, identify bills, and the like. The ticket printer controller 231 includes a printer controller 231a and a bill validator controller 231b.

A voice controller 233 inputs and outputs voices by using a microphone 234 and a speaker 235 included in the phone receiver 207. The voice controller 233 includes a DSP 233a and an LED controller 233b. The DSP 233a controls a voice input from the microphone 234 and a voice output from the speaker 235 by performing predetermined voice signal processing. The LED controller 233b controls the incoming alert LED 208 so as to emit light based on an incoming signal concerning a VoIP conversation or the like.

An input controller 236 converts user's inputs on the keyboard 209 and the numeric keypad 210 into signals, and transmits the signals to the CPU 221.

[Circuit Configuration of Network Camera]

Figure 21:
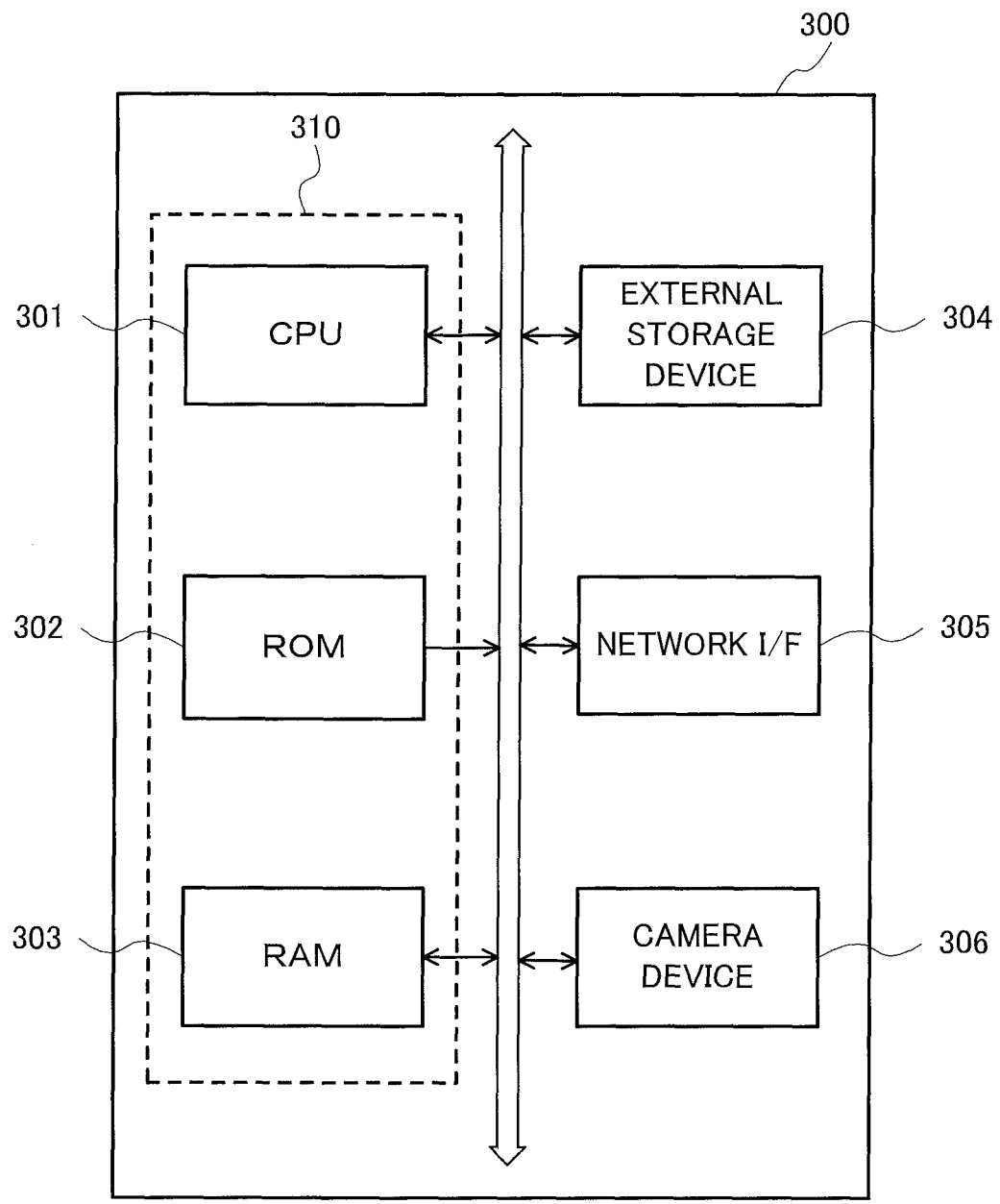
FIG. 21 shows a circuit configuration of a network camera.

A configuration of a circuit included in a network camera 300 is described with reference to FIG. 21. The network camera 300 adopted in this embodiment is attachable to a ceiling of the game arcade, and able to capture an image of a facility space with a wide angle. It is not always necessary that the network camera 300 is attached to a ceiling, but it may be embedded in a wall surface or secured to a stand.

The network camera 300 includes a camera controller 310, an external storage device 304, a network I/F 305, and a camera device 306. The camera controller 310 includes a CPU 301, a ROM 302, and a RAM 303.

The CPU 301 centrally controls the ROM 302, the RAM 303, the external storage device 304, the network I/F 305, and the camera device 306.

The ROM 302 includes a memory device such as a flash memory, and stores permanent data to be executed by the CPU 301. The ROM 302 stores various programs such as a boot loader program, a control program for the network camera 300, and the like.

The RAM 303 is a volatile memory, and capable of fast access. The RAM 303 stores the information from the ROM 302, the external storage device 304, and the like, and information that is temporarily used.

At a time of power-on of the network camera 300, the CPU 301 reads the boot loader program stored in the ROM 302 and executes it, and retrieves the control program stored in the ROM 302 and stores it in the RAM 303. The CPU 301 executing the control program stored in the RAM 303 implements the respective functions of the network camera 300.

The external storage device 304 is a storage device such as a hard disk device. The external storage device 304 stores data (e.g., tables) used for the programs to be executed by the CPU 301, image pickup information of an image captured by the camera device 306, and the like. The external storage device 304 may be configured such that the image pickup information is stored therein in the event of a network fault.

The network I/F 305 is communicable with servers including the imaging control server 14, the recording server 15, and the like, via a network. Through the network I/F 305, the image pickup information stored in the external storage device 304 is transmitted to servers such as the imaging control server 14, the recording server 15, and the like.

The camera device 306 captures an image of an object. For example, the camera device 306 performs a photoelectric conversion on light transmitted through a lens directed to an imaging object, by using an image sensor such as a CCD (Charge Coupled Devices), a CMOS (Complementary Metal Oxide Semiconductor), or the like. Then, the camera device 306 encodes (digitizes) signals, to generate video image data (an example of the image pickup information).

More specifically, the camera device 306 forms an optical image of light incident through a lens (such as an objective lens, a zoom lens, and a focus lens), converts the optical image into an electrical signal (analog signal), and converts the electrical signal into a digital signal. The camera device 306 generates image data from the digital signal, and performs various kinds of image processing. For example, the camera device 306 performs white balance processing, contour correction processing, gamma correction processing, YC conversion processing, and the like, on an image of the input image data. The camera device 306 is operable to compress image data in a compression format such as JPEG (Joint Photographic Expert Group) and expand compressed image data.

The camera device 306 performs a pan control in which the direction of the camera lens is moved horizontally, a tilt control in which the direction of the camera lens is moved vertically, and a zoom control in which the angle is set to a telephoto angle or a wide angle.

The camera device 306 has a dust-proof structure, and the camera device 306 is provided with no covering. Since no covering is provided, an image with a higher quality can be captured. It may be also acceptable that the camera device 306 is provided with a covering.

The configuration of the network camera 300 is not limited to the one illustrated above. For example, an output device such as a speaker or a microphone may be provided.

In this embodiment, the network camera 300 is illustrated as an example of the imaging device. Here, other known cameras may be adopted as appropriate. For example, the imaging device may be a digital camera or an analog camera. For example, the plurality of imaging devices may include both a fixed camera and a pan-tilt-zoom type camera, or may include only a pan-tilt-zoom type camera.

[Circuit Configuration of Imaging Control Server]

Next, a configuration of a circuit included in the imaging control server 14 is described with reference to FIG. 22.

An imaging control server controller 1400 that controls the imaging control server 14 includes a CPU 1401, a ROM 1402, and a RAM 1403.

The CPU 1401 controls operations of respective parts of the imaging control server 14, executes various programs stored in the ROM 1402, and performs calculation.

The ROM 1402 includes a memory device such as a flash memory, and stores permanent data to be executed by the CPU 1401. For example, the ROM 1402 can store a program for controlling the imaging system, an information control program for controlling information on the floor map, and the like.

The RAM 1403 temporarily stores data necessary for executing the various programs stored in the ROM 1402.

An external storage device 1404, which is a storage device such as a hard disk device, stores programs to be executed by the CPU 1401 and data (e.g., tables) used for the programs to be executed by the CPU 1401.

A graphic board 1405 controls the LCD 1408 so as to display floor information, a floor map, and the like.

The input controller 1406 converts inputs received from a keyboard 1409 and a mouse 1410 into signals, and transmits the signals to the CPU 1401.

A network I/F (interface) 1407 implements data communication with servers including the member management server 13, the PTS terminal 1700 (the slot machine 1010), the signage 100, the kiosk terminal 200, and the network camera 300.

The recording server 15 includes parts similar to the CPU 1401, the ROM 1402, the RAM 1403, the external storage device 1404, and the network I/F (interface) 1407.

[Various Tables]

FIG. 23 exemplifies a player management table. The player management table is stored in the member management server 13 and the imaging control server 14, with synchronization ensured. A configuration may also be acceptable in which the player management table is provided in the member management server 13, the imaging control server 14, or another server; and a server including no table obtains data when needed.

In the player management table, information including a member name indicating the name of a player, icon data indicating the face of the player, a player class indicating a class to which the player belongs, an image (face image data) of a face area of the player, a suspicious person identifier by which whether or not the player is a suspicious person can be identified, and the like, is stored in association with the player identification code by which the player can be identified.

The player management table is basically updated at a time of membership registration. The player class is, however, updated by the arcade side. For example, the player management table may be automatically update based on a visiting frequency, a behavior pattern, or the like, or may be updated by a store manager or the like. The suspicious person identifier is updated upon detection of a suspicious person.

FIG. 24 exemplifies an address management table. The address management table is stored in the hall management server 10 and the imaging control server 14, with synchronization ensured. A configuration may also be acceptable in which the address management table is provided in the hall management server 10, the imaging control server 14, or another server; and a server including no table obtains data when needed.

In the address management table, an IP address indicating the address of an apparatus on the network, an apparatus identifier indicating the name of an apparatus, object data indicating a thumbnail sample of an apparatus, coordinate data indicating the position of an apparatus on a floor map, and apparatus status information indicating the status of an apparatus, are stored in association with an apparatus identification code by which the apparatus such as a gaming machine can be identified. The stored information is not limited thereto. For example, position data indicating the position of an apparatus on a floor can be adopted instead of the coordinate data.

The address management table is basically updated by the administrator at a time of installation of the apparatus, change of arrangement of the apparatus, removal of the apparatus, or the like. The apparatus status information is updated at appropriate timing based on apparatus status data that is transmitted from each apparatus. Basically, information about the apparatus identification code, the IP address, the apparatus identifier, the object data, and the coordinate data has been initially registered at a time of generation and update of a floor map (e.g., a template in which the apparatus is mapped on a floor layout).

FIG. 25 exemplifies a monitor camera management table that specifies information about cameras (monitor cameras of the signage 100, the kiosk terminal 200, the network camera 300, the slot machine 1010, and the like) used for imaging. The monitor camera management table is stored in the hall management server 10 and the imaging control server 14, with synchronization ensured. A configuration may also be acceptable in which the monitor camera management table is provided in the hall management server 10, the imaging control server 14, or another server; and a server including no table obtains data when needed.

The monitor camera management table stores information about a monitor camera that is associated with each gaming machine such as the slot machine 1010. In other words, a monitor camera of each gaming machine and an imaging condition of the monitor camera are specified in advance.

For example, a gaming machine whose apparatus identification code is "0010" is associated with a monitor camera whose apparatus identification code is "6008" and a monitor camera whose apparatus identification code is "6009". A gaming machine whose apparatus identification code is "0010" is also associated with a setting file that designates an imaging condition of each of the monitor cameras. Setting items of the setting file are described with reference to FIG. 26.

FIG. 26 shows an exemplary setting file that designates (specifies) an imaging condition of a monitor camera used for imaging. The setting file is stored in the imaging control server 14. A configuration may also be acceptable in which the setting file is provided in a server different from the imaging control server 14, and the imaging control server 14 obtains data from the different server when needed.

The setting file is able to designate, in its setting items, information including the resolution, the video image format, the maximum frame rate, whether or not to perform audio recording, the camera position at a time of starting video recording, the image quality, the focus, presence or absence of an external device output, and the video recording time before and after an event. Here, a setting value for setting the camera position or the like is adjustable through displaying of a preview.

FIG. 27 exemplifies a used monitor camera management table that specifies information about a monitor camera (used monitor camera) performing imaging. The used monitor camera management table is stored in the hall management server 10 and the imaging control server 14, with synchronization ensured. A configuration may also be acceptable in which the used monitor camera management table is provided in the hall management server 10, the imaging control server 14, or another server; and a server including no table obtains data when needed.

The used monitor camera management table stores the apparatus identification code of a used monitor camera, the apparatus identification code of a gaming machine to be monitored, and a hand area imaging identifier by which whether or not an imaging condition for imaging a hand area on an enlarged scale is set is identified.

The used monitor camera management table is updated at timing when an imaging instruction, a normal imaging instruction, or the like, to the monitor camera is set.

FIG. 28 exemplifies a tracking/monitoring camera management table that specifies information about a monitor camera used for tracking a fraud person or the like. The tracking/monitoring camera management table is stored in the hall management server 10 and the imaging control server 14, with synchronization ensured. A configuration may also be acceptable in which the tracking/monitoring camera management table is provided in the hall management server 10, the imaging control server 14, or another server; and a server including no table obtains data when needed.

The tracking/monitoring camera management table stores information about a monitor camera that is associated with each imaging area classification that is classified in advance. In other words, a monitor camera used for tracking a fraud person and an imaging condition of the monitor camera are specified in advance.

For example, a gaming machine whose imaging area classification is "AREA0003" is associated with a monitor camera whose apparatus identification code is "6025" and a monitor camera whose apparatus identification code is "6026". A gaming machine whose imaging area classification is "AREA0003" is also associated with a setting file that designates an imaging condition of each of the cameras. Setting items of the setting file are the same as those shown in FIG. 26.

The imaging area classifications are set such that imaging areas corresponding thereto cover entrances and exits, passages, open spaces, and the like, in the game arcade. One imaging area is set to border or overlap at least one another imaging area so as to obtain uninterrupted tracking. To avoid complicating a tracking process, it is preferable to set imaging areas such that three or more imaging areas do not overlap one another.

[Configuration of Monitoring System]

Figure 29:
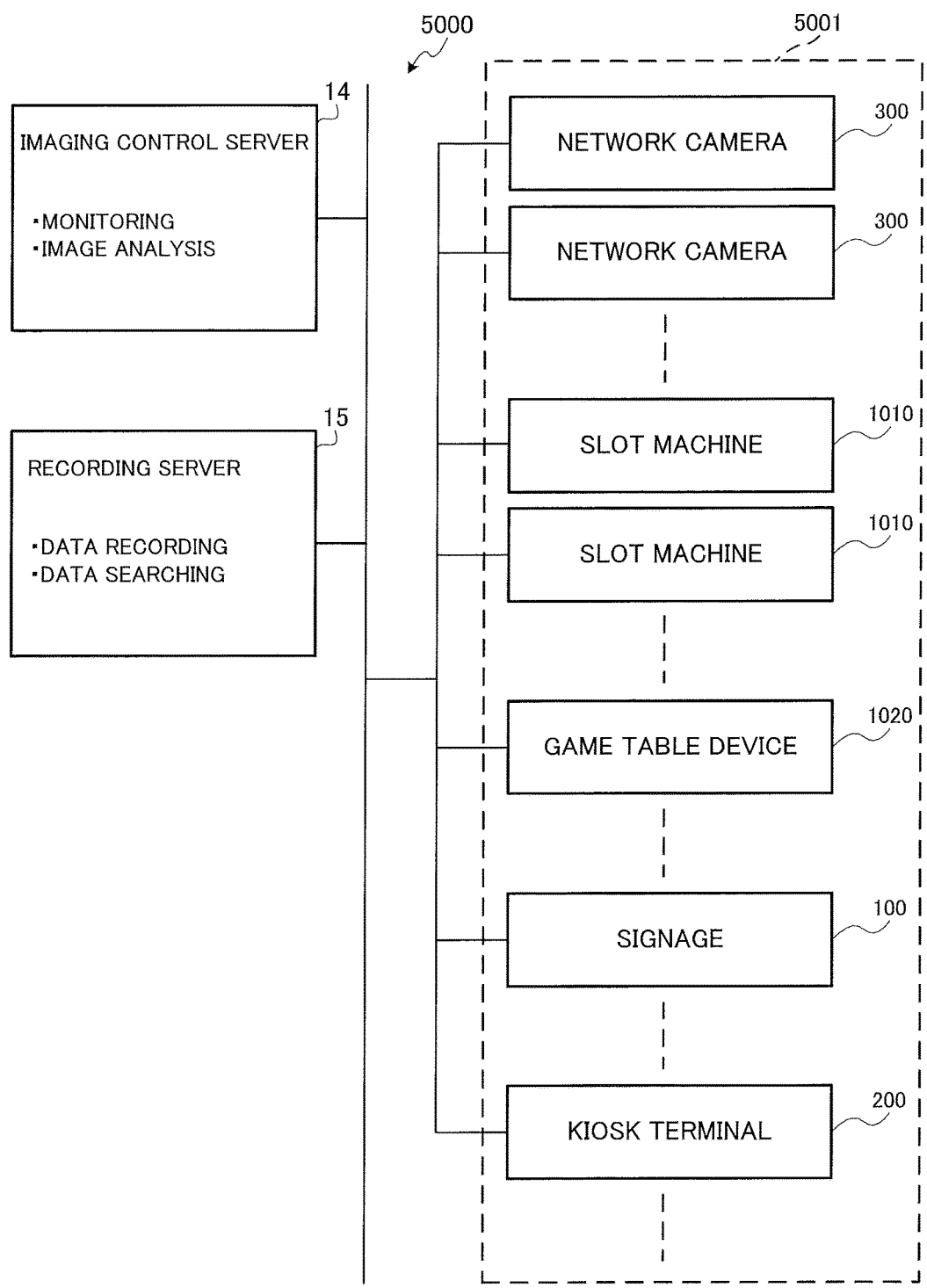
FIG. 29 shows an exemplary configuration of a monitoring system.

A monitoring system is described with reference to FIG. 29. FIG. 29 shows an example (monitoring system 5000) of the monitoring system.

The monitoring system 5000 includes the imaging control server 14, the recording server 15, a plurality of the network cameras 300, a plurality of the slot machines 1010, a plurality of game table devices 1020, a plurality of the signages 100, and a plurality of the kiosk terminals 200. A switching hub capable of power supply (PoE-enabled) is provided as appropriated, though not shown.

Although this embodiment illustrates a plurality of the network cameras 300, a plurality of the slot machines 1010, a plurality of the game table devices 1020, a plurality of the signages 100, and a plurality of the kiosk terminals 200; the numbers thereof are not limited to more than one. For example, the numbers thereof may be one. Either one of the slot machine 1010 and the game table device 1020 may be provided. Appropriate numbers of respective apparatuses may be provided.

The imaging control server 14 receives image pickup information in the form of continuous still images (Motion JPEG etc.), differential compression (MPEG4, H.264, etc.), and the like, transmitted from the network cameras 300, the slot machines 1010, the game table devices 1020, the signages 100, the kiosk terminals 200, and the like (monitor cameras 5001); and displays the received image pickup information on an LCD.

The imaging control server 14 and the recording server 15 stores the received image pickup information into an external storage device such as a DVD (Digital Video Disk) or a hard disk. In a case of shortage of a storage capacity, the imaging control server 14 and the recording server 15 delete the oldest record.

It may not always be necessary that the imaging control server 14 and the recording server 15 constantly store the image pickup information.

In a possible configuration, for example, only when detecting an object moving within an imaging range of the monitor camera 5001 by moving object detection (background subtraction, a human detection sensor, etc.), the imaging control server 14 and the recording server 15 start recording several seconds before.

This configuration can save the storage capacity. In a large floor of a casino or the like, hundreds or thousands of monitor cameras 5001 may be installed. In addition, the casino is sometimes open round-the-clock. Saving the storage capacity in the above-described manner can reduce the number of external storage devices that need to be installed, which gives a low facility cost to the store side, to make operation and maintenance easy.

The imaging control server 14 has a monitoring function such as: a function of selecting image pickup information of the monitor camera 5001 by time division (switching image pickup information of the monitor camera 5001 to be transmitted in each predetermined time period), and displaying the selected image pickup information on the LCD 1408; and a function of adapting image pickup information of the monitor camera 5001 to a single screen or multi-screens, and displaying the adapted image pickup information on the LCD 1408.

The number of the LCDs 1408 provided may or may not be equivalent to the number of monitor cameras 5001. For example, when the number of LCDs is smaller than the number of monitor cameras 5001, a screen display of the LCD is divided (into two, four, nine, or the like), so that video images of a plurality of monitor cameras 5001 can be displayed thereon.

The imaging control server 14 transmits an instruction to obtain image pickup information of a monitor camera 5001 designated by a user operation (an operation on the keyboard 1409 and the mouse 1410) among the monitor cameras 5001, to the monitor camera 5001.

The imaging control server 14 obtains, from the recording server 15, past image pickup information designated (searched for) by a user operation (an operation on the keyboard 1409 and the mouse 1410), image pickup information at a clock time when a fraud is committed, and the like.

The imaging control server 14 also controls the monitor camera 5001. More specifically, the imaging control server 14 instructs the monitor camera 5001 to control zoom, focus, shutter, pan, tilt, etc., of the monitor camera 5001, based on a user operation, an image analysis result, and the like.

The monitor camera 5001 transmits image pickup information of an imaged object to the imaging control server 14 and the recording server 15. The monitor camera 5001 may be configured to compress (encode) an image by increasing the image quality of only a designated area (e.g., a person, a person's hand area, an area including a predetermined range) in a movie frame while decreasing the image quality of the other areas.

The monitor camera 5001 is provided with a sound collecting microphone and capable of recording a voice, though not shown.

[Monitoring Service]

Figure 30A:
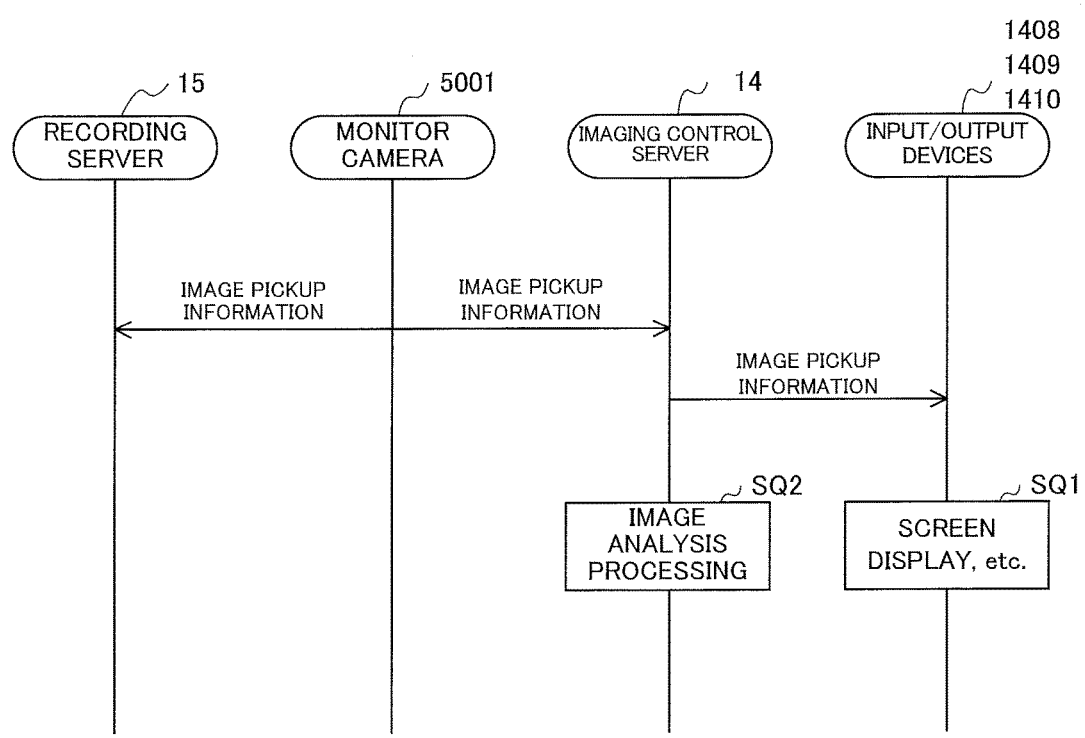
FIG. 30A shows a series of processes concerning a monitoring service.

FIG. 30A exemplifies a constant flow sequence of a monitoring service. With this sequence, a general flow of the monitoring service is described.

In the monitoring service, each monitor camera 5001 transmits image pickup information to the imaging control server 14 and the recording server 15.

Timing when each monitor camera 5001 transmits the image pickup information may be appropriate timing (in real-time, at regular intervals, upon detection of an event, in response to an instruction given from the imaging control server 14, etc.). In an exemplary configuration adoptable, the network cameras 300 transmit image pickup information in real-time, the signages 100 and the kiosk terminals 200 transmit image pickup information at regular intervals, and the slot machines 1010 and the game table devices 1020 (the slot machines 1010 and the like) transmit image pickup information in a case where a person is detected.

In the communication of various information (such as the image pickup information), identification information (such as the apparatus identification code or a source IP address) by which the source can be identified is included, or the identification information is transmitted together with the various information.

Upon receiving image pickup information, the imaging control server 14 stores the image pickup information in the external storage device 1404, and displays the image pickup information on the LCD 1408 (SQ1).

Upon receiving image pickup information, the recording server 15 stores the image pickup information in an external storage device (not shown).

Upon receiving image pickup information, the imaging control server 14 performs various kinds of image analysis processing (SQ2).

Figure 30B:
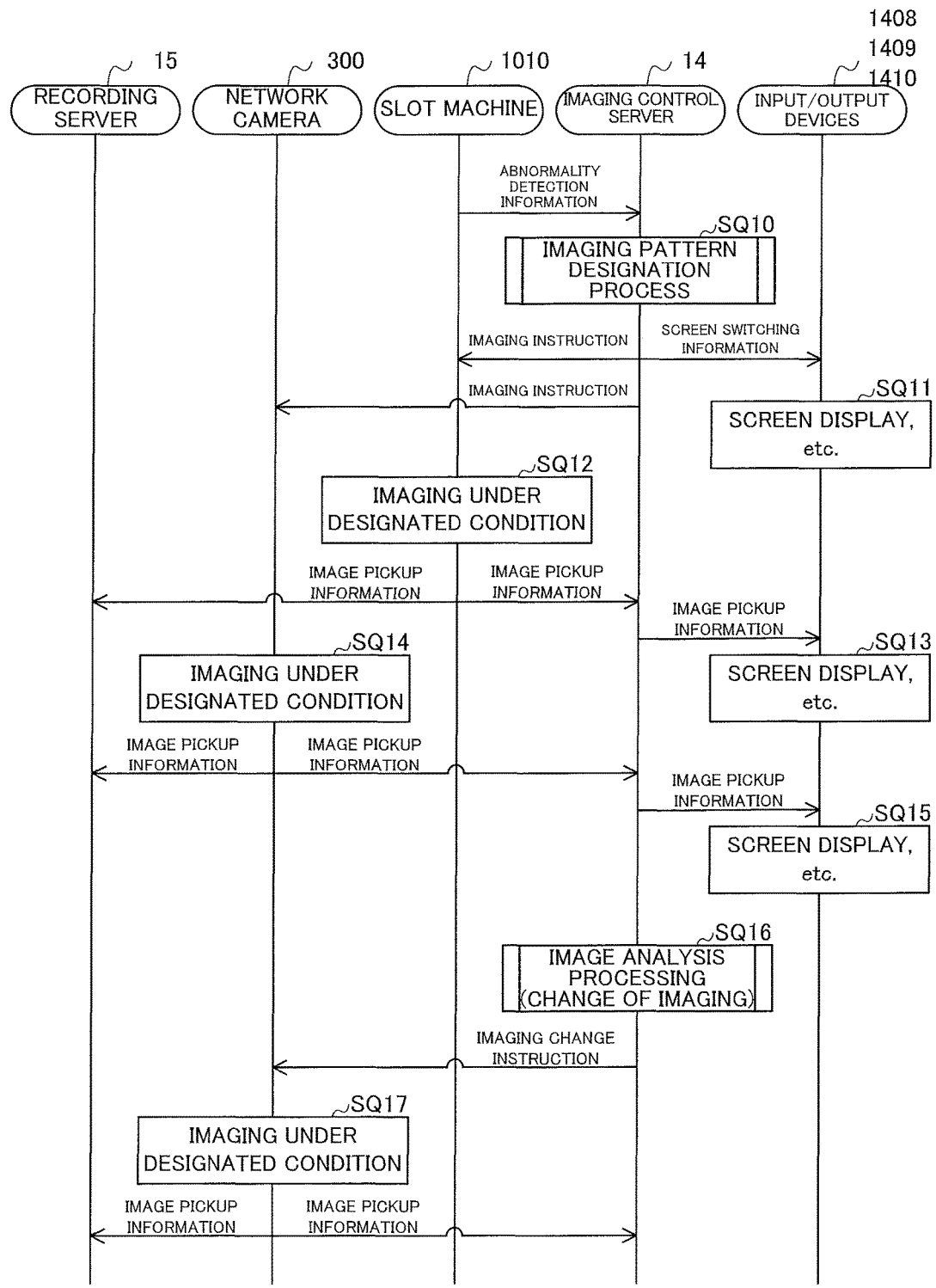
FIG. 30B shows a series of processes concerning the monitoring service.

FIG. 30B exemplifies a serial flow sequence of the monitoring services. With this sequence, a general flow of the monitoring service is described.

Upon detecting an action (cheat) trying to obtain a benefit in an unauthorized manner, such as detecting a radio wave, detecting a magnetic force, or detecting that the main door 1013 is opened, the slot machine 1010 transmits abnormality detection information to the imaging control server 14. The abnormality detection information includes the apparatus identification code. It is not indispensable that the abnormality detection information includes the apparatus identification code. In a possible configuration, the apparatus identification code may be transmitted together with the abnormality detection information, or identification information by which the slot machine 1010 can be identified may be adopted instead of the apparatus identification code.

Although the following example illustrates a case where the slot machine 1010 detects a fraud, the same applies to a case where the game table device 1020 detects a fraud.

Upon receiving the abnormality detection information, the imaging control server 14 determines that a fraud is committed, and performs an imaging pattern designation process (SQ10). In the imaging pattern designation process, monitor cameras 5001 to be used for imaging are designated, and an imaging condition of each of the monitor cameras 5001 is determined, though details will be given later. This example illustrates a case where the network camera 300 is designated.

After completing the imaging pattern designation process, the imaging control server 14 transmits screen switching information to the LCD 1408. For example, the LCD 1408 displays the screen switching information (for example, updates a floor map on which a site of occurrence of an abnormality is mapped) (SQ11).

After completing the imaging pattern designation process, the imaging control server 14 also transmits an imaging instruction to the slot machine 1010 that has detected the fraud. The imaging instruction includes an imaging condition (contents of the setting file). A configuration may also be acceptable in which the imaging condition is preliminarily stored in each monitor camera 5001 and the imaging instruction includes information by which the imaging condition can be identified.

Upon receiving the imaging instruction, the slot machine 1010 starts imaging under the designated imaging condition (designated condition) (SQ12). If the slot machine 1010 (more specifically, the PTS terminal 1700) has already performed imaging, the imaging is switched into imaging under the designated condition. The slot machine 1010 transmits image pickup information captured under the designated condition to the imaging control server 14 and the recording server 15.

Upon receiving the imaging information, the imaging control server 14 stores the image pickup information in the external storage device 1404, and displays the image pickup information on the LCD 1408 (SQ13). Upon receiving the image pickup information, the recording server 15 stores the image pickup information in the external storage device (not shown).

Upon receiving the imaging instruction, the network camera 300 starts imaging under the designated imaging condition (designated condition) (SQ14). If the network camera 300 has already performed imaging, the imaging is switched into imaging under the designated condition. The network camera 300 transmits image pickup information captured under the designated condition to the imaging control server 14 and the recording server 15. The same applies also when another monitor camera 5001 such as the signage 100 is designated in SQ10.

Upon receiving the imaging information, the imaging control server 14 stores the image pickup information in the external storage device 1404, and displays the image pickup information on the LCD 1408 (SQ15). Upon receiving the image pickup information, the recording server 15 stores the image pickup information in the external storage device (not shown).

Here, the imaging control server 14 performs the image analysis processing at appropriate timing while performing various kinds of processing. In this example, the imaging control server 14 performs the image analysis processing (change of imaging) upon receiving the imaging information (SQ16). In the image analysis processing (change of imaging), a monitor camera 5001 that is imaging a hand area of a fraud person is selected based on an image analysis result, and an imaging instruction to the selected monitor camera 5001 is set, though details will be given later. The imaging control server 14 transmits the imaging instruction to the selected monitor camera 5001. This example illustrates a case where the network camera 300 is selected.

Upon receiving the imaging instruction, the network camera 300 starts imaging under the designated imaging condition (designated condition) (SQ17). If the network camera 300 has already performed imaging, the imaging is switched into imaging under the designated condition. The network camera 300 transmits image pickup information captured under the designated condition to the imaging control server 14 and the recording server 15.

In this manner, if an abnormality such as a fraud is detected in the slot machine 1010 or the like, imaging is performed by a monitor camera 5001 suitable for imaging under an imaging condition suitable for imaging. Concurrently, displaying and recording associated with the imaging are performed, which enables a floor staff, an administrator, and the like, to quickly recognize a place where the fraud is occurring and circumstances, so that the fraud can be dealt with appropriately.

Figure 30C:
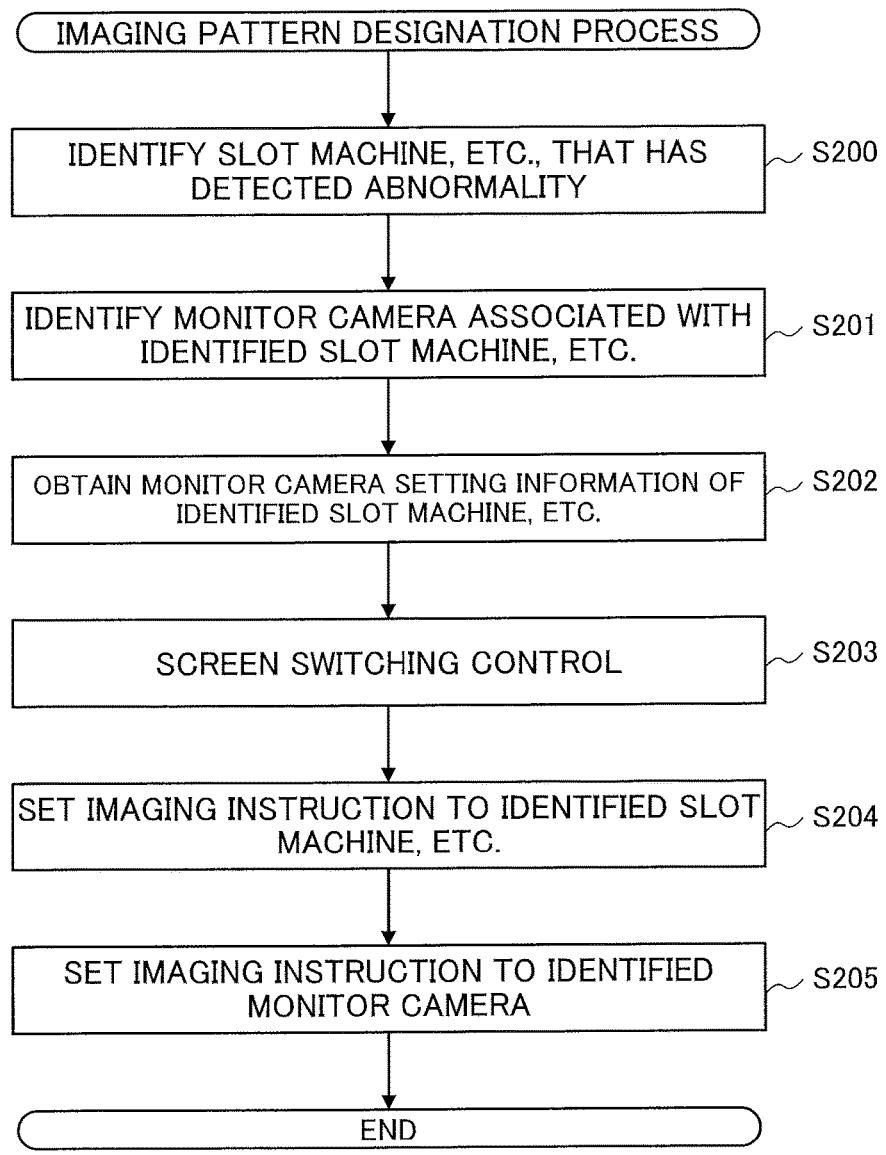
FIG. 30C exemplifies a flowchart of an imaging pattern designation process.

FIG. 30C exemplifies a flowchart of the imaging pattern designation process.

In S200, the CPU 1401 identifies the slot machine 1010 that has detected the abnormality. To be more specific, the CPU 1401 obtains the apparatus identification code included in the abnormality detection information, refers to the address management table, and obtains an IP address associated with the apparatus identification code.

In S201, the CPU 1401 identifies the monitor camera 5001 associated with the identified slot machine 1010. To be more specific, the CPU 1401 refers to the monitor camera management table, to identify the apparatus identification code of the monitor camera 5001 associated with the obtained apparatus identification code of the slot machine 1010 or the like. Then, the CPU 1401 refers to the address management table, to obtain an IP address associated with the identified apparatus identification code.

In S202, the CPU 1401 obtains monitor camera setting information (setting file) of the identified slot machine 1010 or the like. To be more specific, the CPU 1401 refers to the monitor camera management table, to obtain a setting file of the identified slot machine 1010 or the like. The CPU 1401 also refers to the monitor camera management table, to obtain a setting file of the monitor camera 5001 associated with the apparatus identification code of the identified slot machine 1010 or the like.

The imaging condition (setting file) of the slot machine 1010 or the like, which is obtained in S202, specifies each setting item such that a fraud person existing in front of the slot machine 1010 or the like can be imaged by the human body detection camera 1713. In more detail, each setting item is specified such that a hand area of the fraud person can be imaged, that is, such that an area where a fraud is likely to occur is assumed and can be imaged.

In the slot machine 1010 or the like, it may be possible to provide one or more monitor cameras at appropriate positions that allow a fraud which is a monitoring object to be imaged. For example, a wide range of imaging is enabled by arranging the human body detection camera 1713 at a position protruding frontward.

In the imaging condition (setting file) of the monitor camera 5001 associated with the identified slot machine 1010 or the like, each setting item is specified such that this slot machine 1010 and surroundings thereof are imaged by the monitor camera 5001. That is, the setting file specifies each setting item such that a series of fraud-related behaviors, such as a fraud, leaving of a fraud person, and a movement (direction of escape) of a fraud person, is imaged.

For example, each setting item is specified such that an index (a marker, predetermined installation object, etc.) associated with the identified slot machine 1010 is imaged. Examples of the predetermined installation object include the identified slot machine 1010, one or more slot machines 1010 adjacent to the identified slot machine 1010, and the like. For example, each setting item may be specified such that imaging is performed with the percentage of an imaging range occupied by a fraud person being lower than a predetermined percentage, that is, with the percentage of an imaging range occupied by the index being lower than the predetermined percentage.

In the above-described imaging condition, not only a fraud person but also surroundings thereof can be imaged appropriately, and therefore a series of fraud-related behaviors such as a fraud, leaving of a fraud person, and a movement (direction of escape) of a fraud person can be imaged.

In S203, the CPU 1401 performs a screen switching control on the LCD 1408. For example, the CPU 1401 refers to the address management table, identifies coordinate data corresponding to the obtained apparatus identification code of the slot machine 1010 or the like, and generates a floor map on which a pin mark indicating occurrence of a fraud is arranged at a position of the coordinate data. After generating the floor map, the CPU 1401 sets a display instruction in a predetermined storage area (a cache memory of the CPU 1401, the RAM 1402, etc.).

In S204, the CPU 1401 sets an imaging instruction to the identified slot machine 1010 or the like. More specifically, the CPU 1401 generates an imaging instruction including the contents of the obtained setting file, and sets the imaging instruction in a predetermined storage area. The set imaging instruction is transmitted to the identified slot machine 1010 or the like at appropriate timing.

In S205, the CPU 1401 sets an imaging instruction to the identified monitor camera 5001. To be more specific, the CPU 1401 generates an imaging instruction including the contents of the obtained setting file with respect to each monitor camera 5001, and sets the imaging instruction in a predetermined storage area. The set imaging instruction is transmitted to the identified monitor camera 5001 at appropriate timing.

In the above-described process, a fraud person is imaged by a plurality of monitor cameras 5001 under various imaging conditions, which enables more appropriate imaging of the fraud person.

Figure 30D:
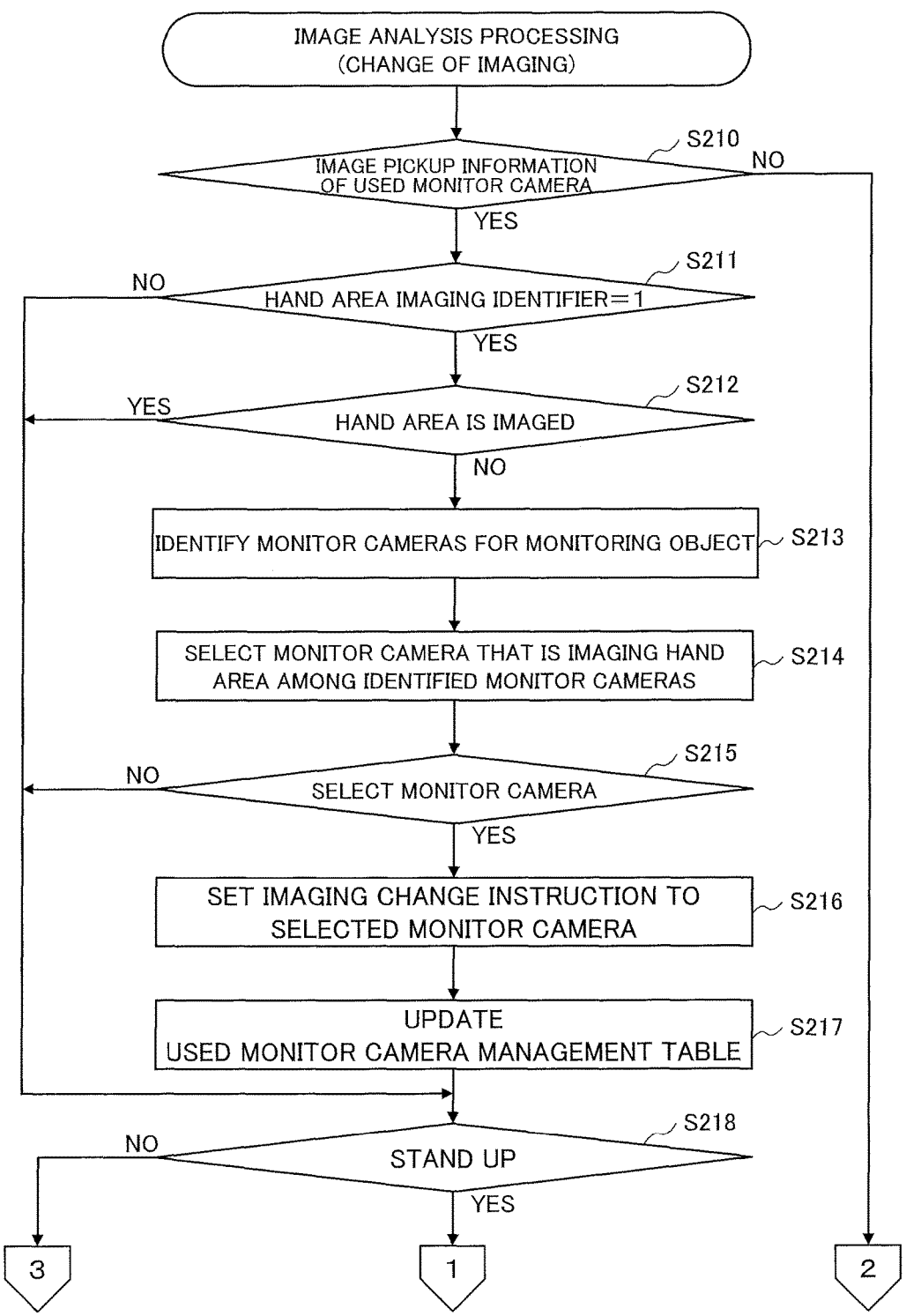
FIG. 30D exemplifies a flowchart of image analysis processing (change of imaging)
Figure 30E:
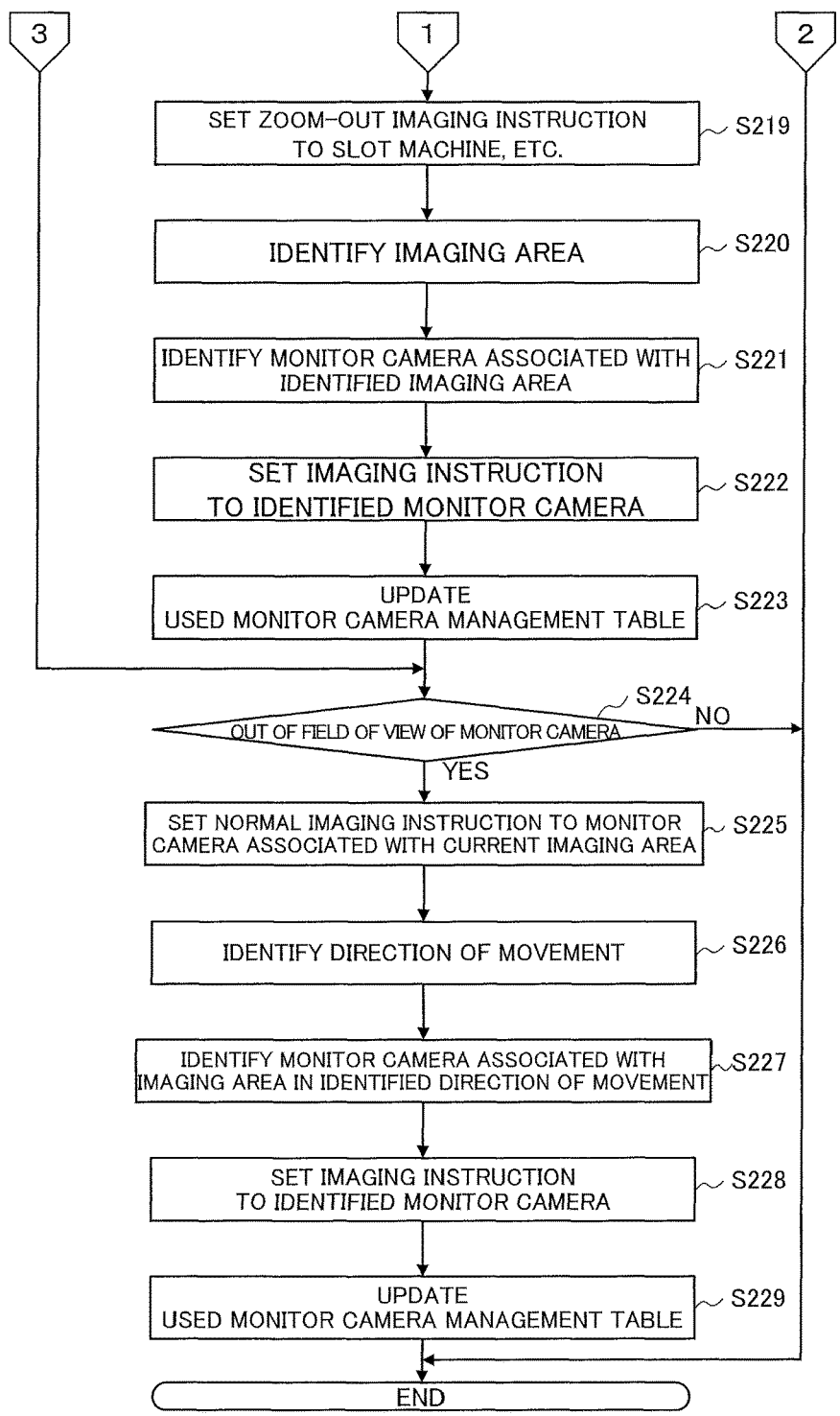
FIG. 30E exemplifies a flowchart of the image analysis processing (change of imaging)

FIGS. 30D and 30E exemplify a flowchart of the image analysis processing (change of imaging).

In S210, the CPU 1401 determines whether or not the received image pickup information is image pickup information transmitted from the used monitor camera 5001. Upon determining that the received image pickup information is image pickup information transmitted from the used monitor camera 5001, the CPU 1401 proceeds to the processing of S211, while upon determining that the received image pickup information is not image pickup information transmitted from the used monitor camera 5001, the CPU 1401 terminates the image analysis processing (change of imaging). The CPU 1401 identifies the used monitor camera 5001 by referring to the used monitor camera management table.

In S211, the CPU 1401 refers to the used monitor camera management table, to determine whether or not the hand area imaging identifier of the used monitor camera 5001 that has transmitted the image pickup information is "1". Upon determining that the hand area imaging identifier is "1", the CPU 1401 proceeds to the processing of S212, while upon determining that the hand area imaging identifier is not "1", the CPU 1401 proceeds to the processing of S218.

In S212, the CPU 1401 performs an image analysis on the image pickup information, to determine whether or not a hand area of the fraud person is imaged. Upon determining that the hand area of the fraud person is imaged, the CPU 1401 proceeds to the processing of S218, while upon determining that the hand area of the fraud person is not imaged, the CPU 1401 proceeds to the processing of S213. For example, the CPU 1401 determines that the hand area is imaged, if a hand is detected as a result of template matching based on a plurality of templates related to a hand. Alternatively, the CPU 1401 may determine that the hand area is imaged, if a moving object is identified in a moving image within a set image pickup range.

In S213, the CPU 1401 identifies a monitor camera 5001 for a monitoring object. More specifically, the CPU 1401 refers to the used monitor camera management table, to identify the apparatus identification code of a monitor camera 5001 assigned the same apparatus identification code as that of the monitoring object associated with the used monitor camera 5001 that has transmitted the image pickup information. For example, in a case where the used monitor camera 5001 that has transmitted the image pickup information is "6008", the codes "0010" and "6009" are identified as the apparatus identification codes of monitor cameras 5001 associated with the apparatus identification code "0010" which is the same as the apparatus identification code "0010" of the monitoring object assigned "6008".

In S214, the CPU 1401 selects a monitor camera 5001 that is imaging the hand area, among the designated monitor cameras 5001. More specifically, the CPU 1401 obtains from the external storage device 1404 image pickup information captured by each of the designated monitor cameras 5001, performs an image analysis thereon, and selects a monitor camera 5001 that is imaging the hand area.

In S215, the CPU 1401 determines whether or not there is a monitor camera 5001 that is imaging the hand area. Upon determining that there is a monitor camera 5001 that is imaging the hand area, the CPU 1401 proceeds to the processing of S216, while upon determining that there is no monitor camera 5001 that is imaging the hand area, the CPU 1401 proceeds to the processing of S218.

In S216, the CPU 1401 sets an imaging instruction to the selected monitor camera 5001. More specifically, the CPU 1401 generates an imaging instruction to zoom in the hand area of the fraud person so as to show the hand area on an enlarged scale, and sets the imaging instruction in a predetermined storage area. The imaging instruction is transmitted to the selected monitor camera 5001 at appropriate timing.

In S217, the CPU 1401 updates the used monitor camera management table. More specifically, the CPU 1401 changes the hand area imaging identifier of the used monitor camera 5001 that has transmitted the image pickup information into "0", and changes the hand area imaging identifier of the selected used monitor camera 5001 into "1".

In the above-described process, even when the hand area of the fraud person exists on a side of the slot machine 1010 or the like so that it cannot be imaged by the human body detection camera 1713, one monitor camera 5001 images the hand area, thus enabling appropriate imaging of the fraud person.

In the above-described process, even when a field of view of one monitor camera 5001 is obstructed so that the one monitor camera 5001 is not able to perform imaging, the imaging is switched to imaging by another monitor camera 5001 if another monitor camera 5001 is capable of imaging. This enables appropriate imaging of the fraud person.

In the above-described process, therefore, imaging is performed so as to enlarge and track the hand area of the fraud person until the fraud person moves, which enables appropriate imaging of the fraud.

In S218, the CPU 1401 determines whether or not the fraud person stands up (whether or not the fraud person is leaving). Upon determining that the fraud person stands up, the CPU 1401 proceeds to the processing of S219 shown in FIG. 30E, while upon determining that the fraud person does not standup, the CPU 1401 proceeds to the processing of S224 shown in FIG. 30E.

For example, the CPU 1401 determines that the fraud person stands up if the CPU 1401 detects a face area of the fraud person that is located above a predetermined position or if the CPU 1401 detects that a face area of the fraud person has moved through a predetermined distance or longer, during appropriate image analysis processing.

In S219, the CPU 1401 generates a zoom-out imaging instruction to the slot machine 1010 or the like which is the monitoring object, and sets the imaging instruction in a predetermined storage area. The imaging instruction is transmitted to the slot machine 1010 or the like which is the monitoring object at appropriate timing.

In the above-described process, even in a situation where the field of view of the network camera 300 or the like is obstructed by an accomplice of the fraud person, the slot machine 1010 or the like is zoomed out so that surroundings are imaged, which allows the direction of escape of the fraud person to be recognized, thus enabling appropriate imaging of the fraud person.

In S220, the CPU 1401 identifies an imaging area. More specifically, the CPU 1401 refers to the address management table, obtains coordinate information (the current position of the fraud person) of the slot machine 1010 or the like which is the monitoring object, and identifies an imaging area. The coordinate information (which may be position information) of each imaging area is preliminarily stored in the external storage device 1404. It may be possible that the CPU 1401 performs an image analysis on the image pickup information of the slot machine 1010 or the like which is the monitoring object, obtains the current position of the fraud person, and identifies an imaging area.

In S221, the CPU 1401 identifies a monitor camera 5001 associated with the imaging area. More specifically, the CPU 1401 refers to the tracking/monitoring camera management table, to obtain apparatus identification code associated with an imaging area classification of the identified imaging area.

In S222, the CPU 1401 sets an imaging instruction to the designated monitor camera 5001. More specifically, the CPU 1401 obtains a setting file for each monitor camera 5001, generates an imaging instruction including the contents of the obtained setting file, and sets the imaging instruction in a predetermined storage area. The imaging instruction is transmitted to the designated monitor camera 5001 at appropriate timing.

In the imaging condition (setting file) obtained in S222, each setting item is specified such that imaging is performed with the percentage of an imaging range occupied by the slot machine 1010 or the like which is the monitoring object being lower than a predetermined percentage.

The imaging instruction may include an instruction to detect a fraud person and track the fraud person such that the fraud person can be included in the imaging range.

In S223, the CPU 1401 updates the used monitor camera management table based on information of the designated monitor camera 5001.

In S224, the CPU 1401 determines whether or not a part of the fraud person goes out of the field of view of the monitor camera 5001. Upon determining that a part of the fraud person goes out of the field of view of the monitor camera 5001, the CPU 1401 proceeds to the processing of S225, while upon determining that a part of the fraud person does not go out of the field of view of the monitor camera 5001, the CPU 1401 terminates the image analysis processing (change of imaging).

For example, the CPU 1401 performs an image analysis on image pickup information of a predefined one monitor camera 5001 among the monitor cameras 5001 associated with the current imaging area, and determines whether or not a part of the fraud person is out of the imaging range.

A configuration may also be adoptable in which: the speed of movement of the fraud person is calculated; whether or not a part of the fraud person will go out of the imaging range in a predetermined time is predicted; and upon predicting that it will go out of the range, it is determined that a part of the fraud person will go out of the field of view of the monitor camera 5001.

In S225, the CPU 1401 sets a normal imaging instruction to the monitor camera 5001 associated with the current imaging area. The normal imaging instruction is transmitted to the monitor camera 5001 associated with the current imaging area at appropriate timing.

In S226, the CPU 1401 identifies the direction of movement of the fraud person. For example, the CPU 1401 uses difference of images to identify the direction of movement of the fraud person, in performing the image analysis on the image pickup information of the monitor camera 5001 associated with the current imaging area.

In S227, the CPU 1401 designates an imaging area in the identified direction of movement, and designates a monitor camera 5001 associated with the imaging area. For example, the CPU 1401 performs an image analysis, obtains the current position of the fraud person, identifies the current imaging area, and designates an imaging area that is located ahead in the direction of movement of the fraud person. Then, the CPU 1401 refers to the tracking/monitoring camera management table, to obtain the apparatus identification code associated with an imaging area classification of the designated imaging area.

In S228, the CPU 1401 sets an imaging instruction to the designated monitor camera 5001. More specifically, the CPU 1401 refers to the tracking/monitoring camera management table, obtains a setting file for each monitor camera 5001, generates an imaging instruction including the obtained setting file, and sets the imaging instruction in a predetermined storage area. The imaging instruction is transmitted to the designated monitor camera 5001 at appropriate timing.

In the imaging condition (setting file) obtained in S228, each setting item is specified such that an area where the current imaging area borders or overlaps an imaging area that is located ahead in the direction of movement is imaged. For example, each setting item is specified such that an index (a marker, predetermined installation object, etc.) in the area is imaged, or such that imaging is performed with the percentage of an imaging range occupied by the index being lower than a predetermined percentage.

In S229, the CPU 1401 updates the used monitor camera management table based on information of the designated monitor camera 5001.

In the above-described process, for example, if a fraud person turns the passage and goes out of the field of view of the monitor camera 5001 associated with the current imaging area, surrounding monitor cameras 5001 (in a more limited sense, a monitor camera 5001 associated with an imaging area located in the direction of movement) perform imaging.

In the above-described process, a monitor camera 5001 that performs imaging is changed in accordance with movement of the fraud person, which allows the fraud person to be tracked, thus enabling appropriate imaging of the fraud person.

The image analysis processing (change of imaging) is not limited to the one illustrated above. For example, the processing of S218 and S219 may be performed in the slot machine 1010 or the like.

Figure 31:
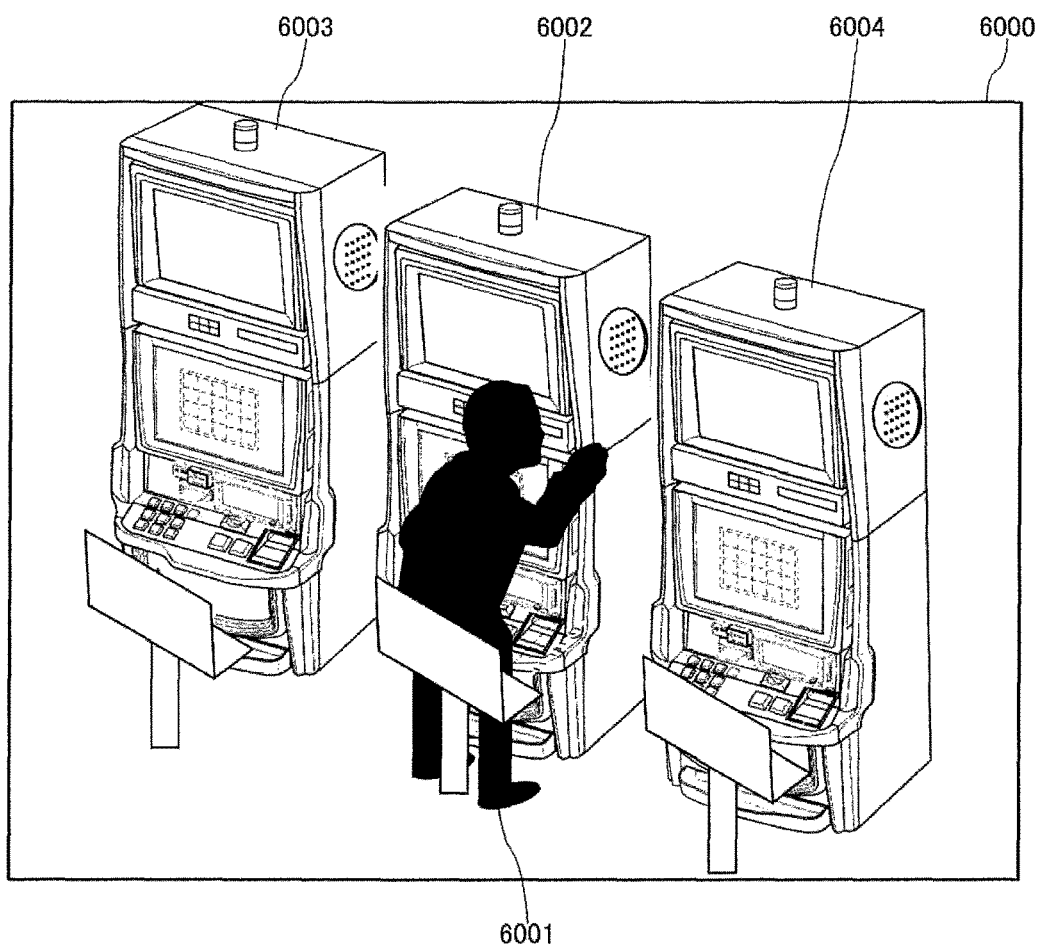
FIG. 31 shows an example of imaging contents.

FIG. 31 shows exemplary imaging contents (imaging contents 6000) displayed in the screen display of SQ15, or the like.

Upon detection of an abnormality in the slot machine 1010, the network camera 300 associated with the slot machine 1010 performs imaging so as to cover a fraud person 6001, a slot machine 6002 on which a fraud is committed, and surroundings (the slot machine 6003, the slot machine 6004, etc.) of the slot machine 6002, as shown in the imaging contents 6000.

In this example, a range that allows adjacent two slot machines 1010 to be imaged is set as the surroundings of the slot machine 1010, such that the direction of movement of a fraud person in the passage can fall within a recognizable size (first range). This, however, is not limiting.

For example, in a case where the slot machines 1010 are arranged in a circular island pattern on a floor, a range that allows a predefined installation object (the slot machine 1010, the kiosk terminal 200, lighting equipment, a pillar, etc.) to be imaged may be set as the surroundings of the slot machine 1010, such that the direction of movement of a fraud person on the floor can fall within a recognizable size (second range wider than the first range).

This embodiment illustrates the configuration in which imaging conditions (setting files) that are specified in advance are provided such that imaging can cover surroundings, but this configuration is not limiting. For example, a configuration may also be adoptable in which: an index (an installation object, a marker, etc.) is provided on a floor; and the monitor camera 5001 performs imaging by identifying surroundings based on one or more indexes associated with the slot machine 1010.

<Variation A>

Figure 32A:
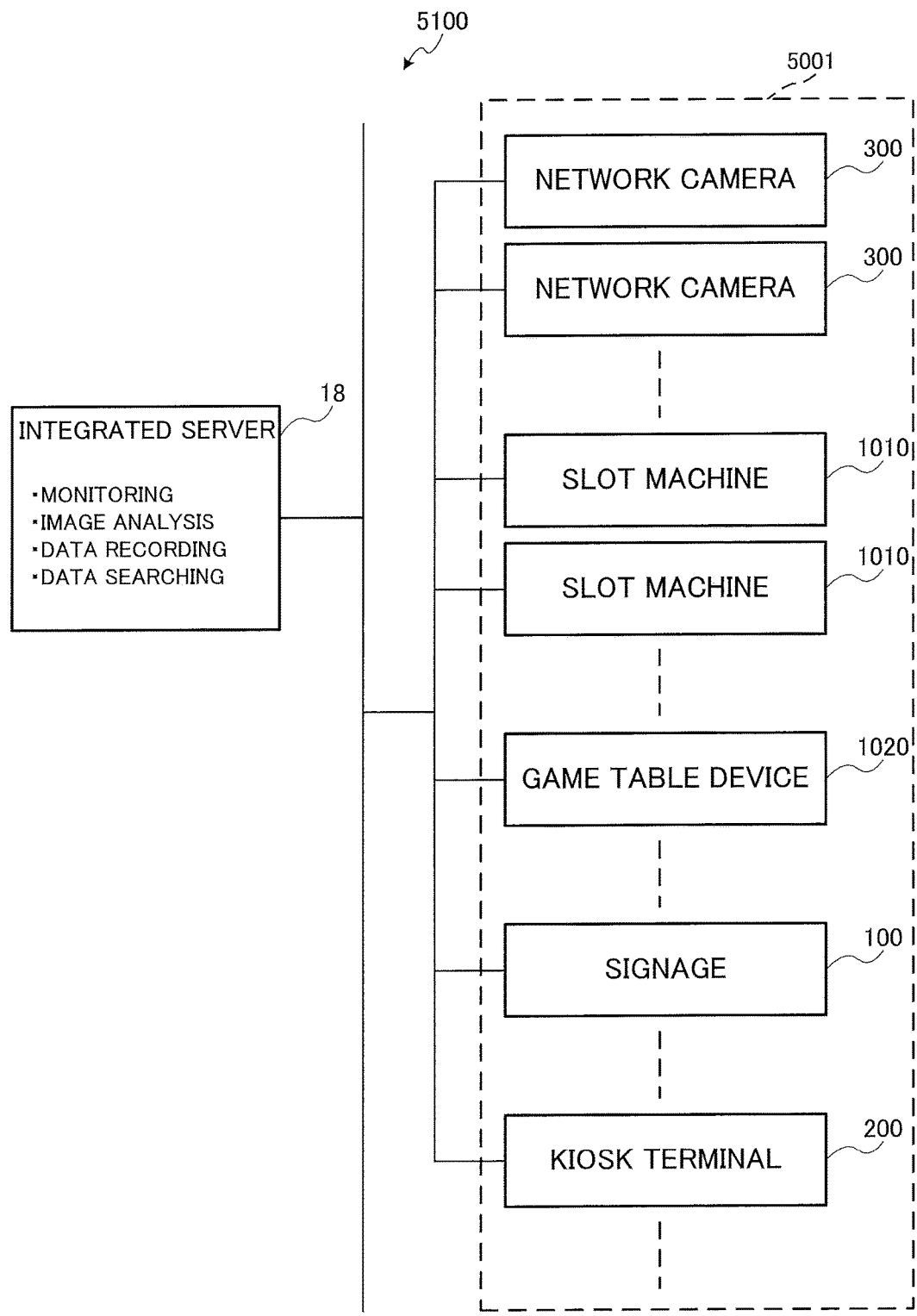
FIG. 32A shows an exemplary configuration of the monitoring system.

FIG. 32A shows an exemplary monitoring system (monitoring system 5100). It differs from the monitoring system 5000 shown in FIG. 29, in that an integrated server 18 is provided instead of the imaging control server 14 and the recording server 15.

Figure 22:
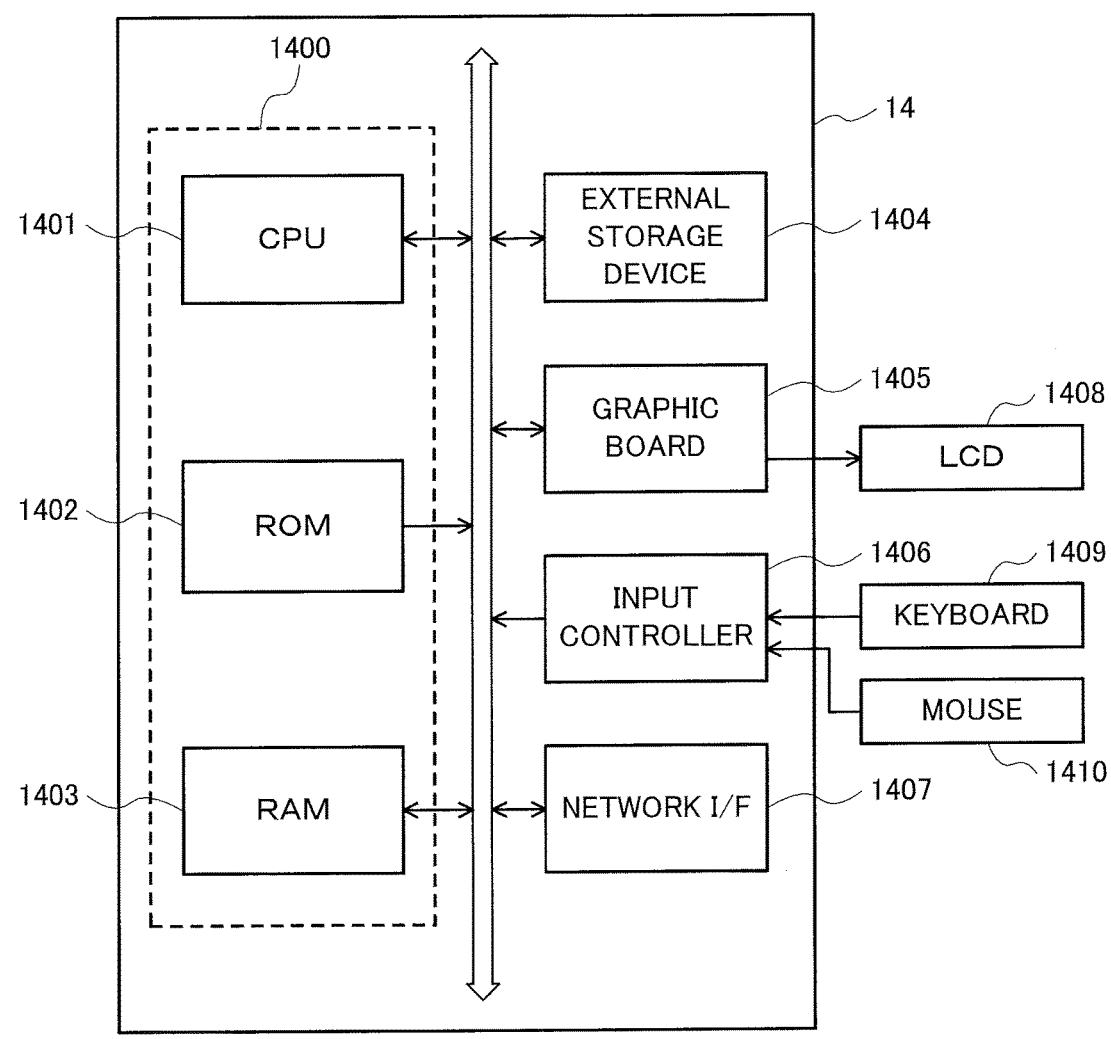
FIG. 22 shows a circuit configuration of an imaging control server.

The integrated server 18, whose circuit configuration is identical to that of the imaging control server 14 shown in FIG. 22, is able to implement the functions of the imaging control server 14 and the functions of the recording server 15.

This configuration, in which image pickup information of the monitor camera 5001 is transmitted to the integrated server 18, can reduce the burden (traffic) on the network, as compared with the configuration in which the image pickup information is transmitted to the imaging control server 14 and the recording server 15. In addition, this configuration does not need to communicate the past image pickup information, which is transmitted from the recording server 15 in response to a request given from the imaging control server 14. The burden on the network can therefore be reduced.

Figure 32B:
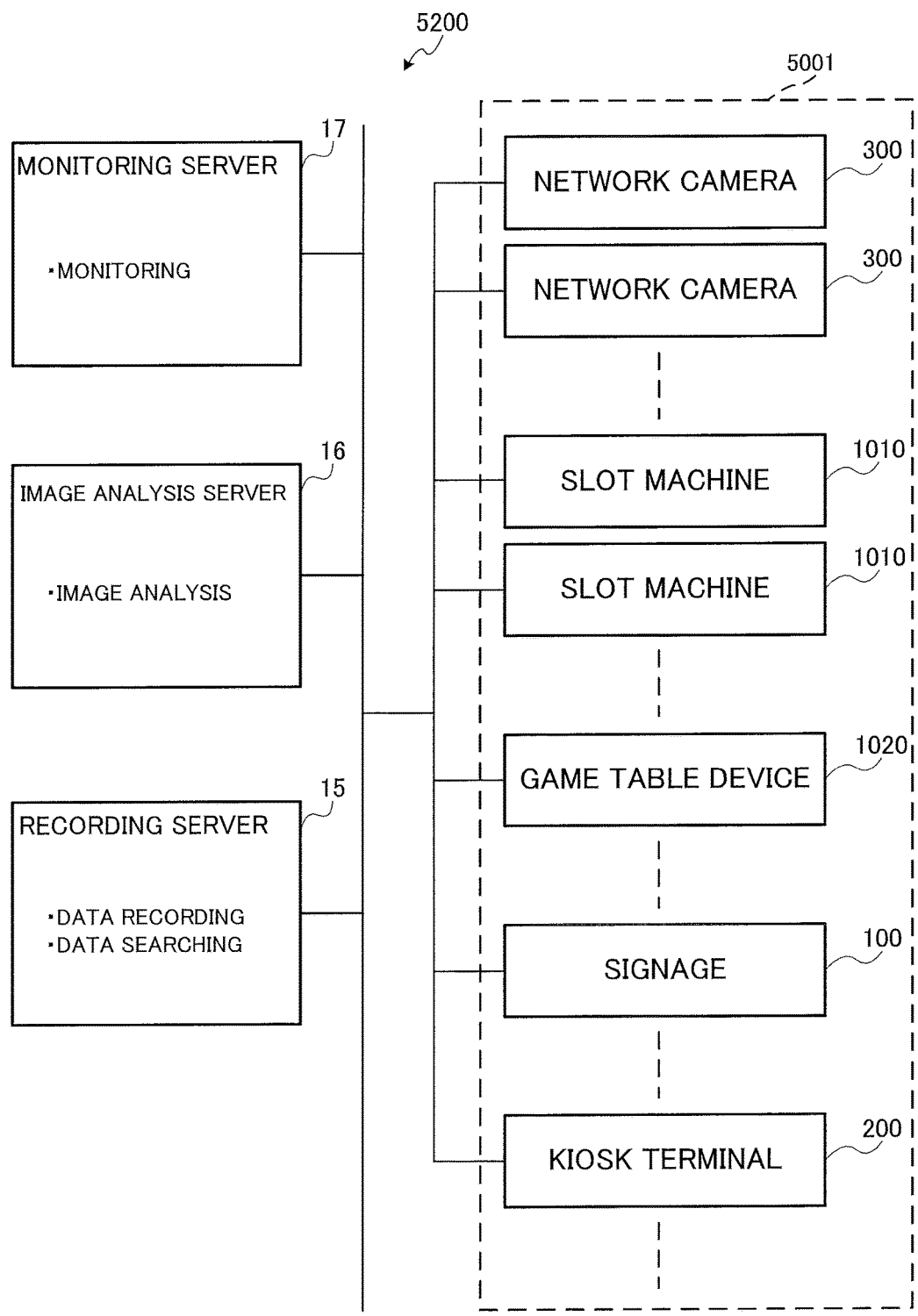
FIG. 32B shows an exemplary configuration of the monitoring system.

FIG. 32B shows an exemplary monitoring system (monitoring system 5200). It differs from the monitoring system 5000 shown in FIG. 29, in that an image analysis server 16 and a monitoring server 17 are provided instead of the imaging control server 14. The numbers of the recording servers 15, the image analysis servers 16, and the monitoring servers 17 may be two or more.

The image analysis server 16, whose circuit configuration is identical to that of the imaging control server 14 shown in FIG. 22, is operable to execute the image analysis processing of the imaging control server 14 and transmit an imaging instruction to the monitor camera 5001.

The monitoring server 17, whose circuit configuration is identical to that of the imaging control server 14 shown in FIG. 22, is operable to receive image pickup information from the monitor camera 5001 and display it on a display. Like the imaging control server 14, the monitoring server 17 is operable to switch video images or obtain a video image of a designated period from the recording server 15 and display it, based on a user operation.

This configuration, in which the image analysis server 16 and the monitoring server 17 are located at separate places, is able to limit physical access in accordance with the degree of authority of a staff. Since this configuration is able to distribute a processing load of the server, this configuration is suitably adoptable for building a large-scale system that requiring a number of monitor cameras 5001 to be arranged on a wide floor of a casino, for example.

Second Embodiment

In this embodiment, an example in which a suspicious person is detected and imaged is described with reference to FIGS. 33 to 38. Configurations of this embodiment different from those of the first embodiment are mainly described. Configurations identical to those of the first embodiment are given reference signs identical thereto, and descriptions thereof are omitted as appropriate.

[Tables]

FIG. 33 exemplifies an entering/exiting person management table that stores information about a person entering and exiting the game arcade. The entering/exiting person management table is stored in the hall management server 10 and the imaging control server 14, with synchronization ensured. A configuration may also be acceptable in which the entering/exiting person management table is provided in the hall management server 10, the imaging control server 14, or another server; and a server including no table obtains data when needed.

In the entering/exiting person management table, information about registered images, the apparatus identification code of a slot machine where the person is seated, suspicious person information, entry time, and exit time are stored in association of an entering/exiting person identification number by which an entering/exiting person can be identified.

The registered images include a face image, a clothes (bottom clothes) image, and a shoes image. The registered images are images that are captured under a predefined imaging condition by the monitor camera 5001 located near the entrance of the game arcade at a time when a person is entering, and then registered. In consideration of protection of personal information, data size, and the like, it may also be possible to store the amount of features of the face image (such as feature point positions) instead of a face image, because an individual person can be identified by the face image.

The apparatus identification code of the slot machine where the person is seated is an apparatus identification code by which the slot machine 1010 or the like where an entering person is seated can be identified.

The suspicious person information includes the number of times of suspicious person detection and information about a tracking identifier. The number of times of suspicious person detection indicates the number of times a person corresponding to the registered images was detected as a suspicious person. The tracking identifier indicates whether or not a person corresponding to the registered images is being tracked (whether or not the person is a tracking object). The tracking identifier "1" indicates that the person is being tracked, and "0" indicates that the person is not being tracked.

The entry time is the latest time when the person corresponding to the registered images entered the game arcade. The exit time is the latest time when the person corresponding to the registered images exited the game arcade.

FIG. 34 exemplifies a tracking management table that stores information about a tracking object. The tracking management table is stored in the imaging control server 14. A configuration may also be acceptable in which the tracking management table is provided in a server different from the imaging control server 14, and the imaging control server 14 obtains data from the different server when needed.

The tracking management table stores the entering/exiting person identification number, the imaging area classification, the imaging time/date, the apparatus identification code for monitoring, and information (tracking information) about the obtained image.

The imaging control server 14 performs an image analysis on image pickup information that is transmitted from a pre-designated monitor camera 5001 every predetermined time period (e.g., five seconds), and upon identifying a suspicious person, updates the tracking management table.

For example, the table shown in FIG. 34, it can be seen that a person whose entering/exiting person identification number is "USR0000000001" moved from an area whose imaging area classification is "AREA0001" to an area whose imaging area classification is "AREA0005" at a time from 17:43:01 to 17:43:06.

Figure 35A:
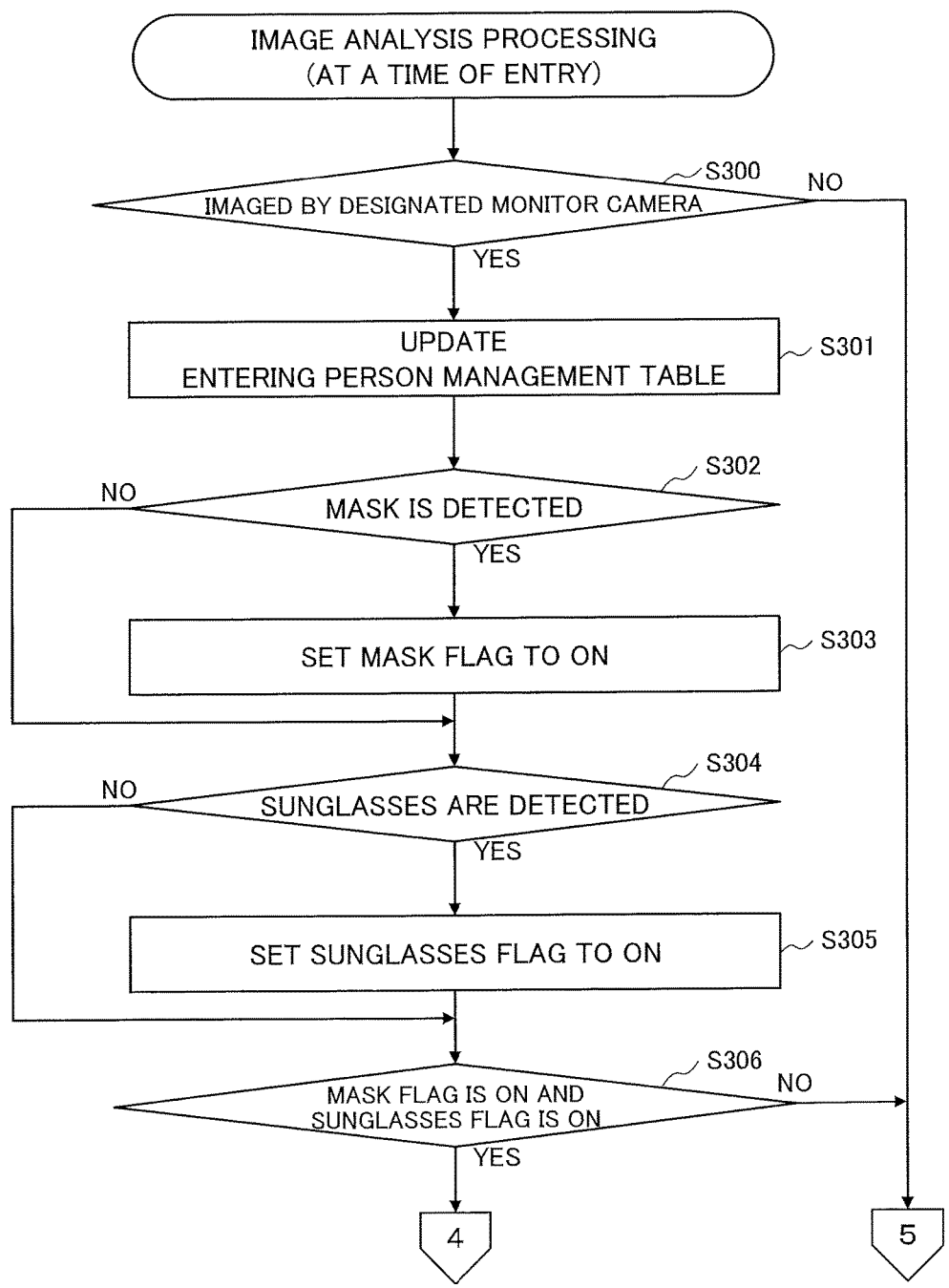
FIG. 35A exemplifies a flowchart of image analysis processing (at a time of entry)
Figure 35B:
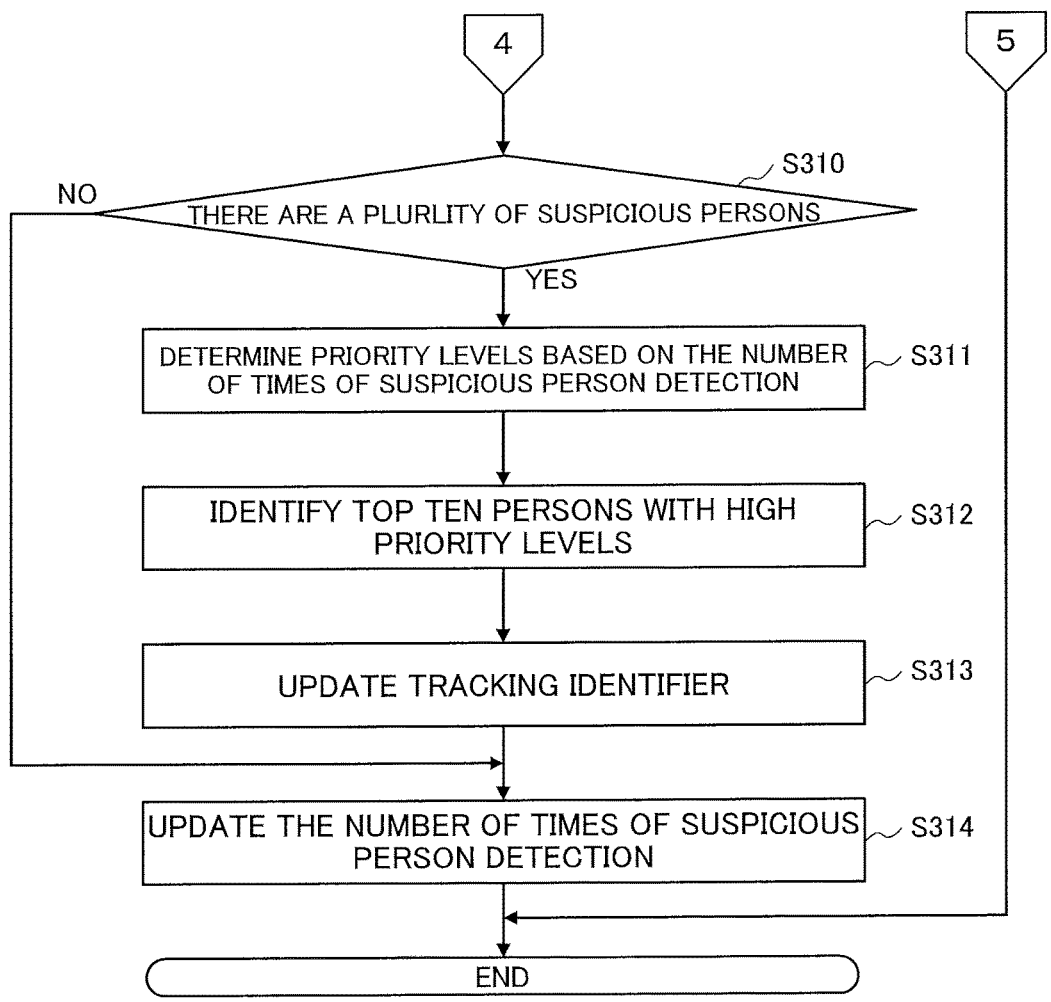
FIG. 35B exemplifies a flowchart of the image analysis processing (at a time of entry)

FIG. 35A exemplifies a flowchart of the image analysis processing (at a time of entry).

In S300, the CPU 1401 determines whether or not the received image pickup information has been captured by a pre-designated monitor camera 5001. Upon determining that the received image pickup information has been captured by the designated monitor camera 5001, the CPU 1401 proceeds to the processing of S301, while upon determining that the received image pickup information has not been captured by the designated monitor camera 5001, the CPU 1401 terminates the image analysis processing (at a time of entry).

In this embodiment, a monitor camera 5001 capable of imaging the entrance and exit of the game arcade is pre-designate (set).

In S301, the CPU 1401 updates the entering person management table based on the received image pickup information. More specifically, the CPU 1401 uses GLVQ (generalized learning vector quantization), SVM (support vector machine), or the like, to detect a face area and extract a face image, to detect a bottom clothes area and extract a bottom clothes image, and to detect a shoes area and extract a shoes image, from the image pickup information. The CPU 1401 stores the images in a predetermined storage area.

At this time, for example, the CPU 1401 performs a face feature point detection process, to calculate the positions of feature points of the face, such as eyes, nose, and mouth. The CPU 1401 stores the positions in a predetermined storage area. As for the bottom clothes and shoes, the image is divided into segments, and each segment is labelled with color, pattern, or the like. In a case where a face image matching the extracted face image is already registered, only the bottom clothes image and the shoes image may be updated, or alternatively all of the face image, the bottom clothes image, and the shoes image may be updated.

In this monitoring service, as thus far described, information about an entering person is automatically registered. Instead, the above-described imaging of the entering person may be manually performed by a staff or the like.

In S302, the CPU 1401 determines whether or not the person of the received image pickup information wears a mask (whether or not a mask is detected in the face area). Upon determining that a mask is detected, the CPU 1401 proceeds to the processing of S303, while upon determining that no mask is detected, the CPU 1401 proceeds to the processing of S304.

In S303, the CPU 1401 sets a mask flag to ON. The mask flag being ON represents that a mask is detected, and the mask flag being OFF represents that no mask is detected.

In S304, the CPU 1401 determines whether or not the person of the received image pickup information wears sunglasses (whether or not sunglasses are detected in the face area). Upon determining that sunglasses are detected, the CPU 1401 proceeds to the processing of S305, while upon determining that no sunglasses is detected, the CPU 1401 proceeds to the processing of S306.

In S305, the CPU 1401 sets a sunglasses flag to ON. The sunglasses flag being ON represents that sunglasses are detected, and the sunglasses flag being OFF represents that no sunglasses is detected.

In S306, the CPU 1401 determines whether or not both the mask flag and the sunglasses flag are ON. Upon determining that both flags are ON, the CPU 1401 proceeds to the processing of S310 shown in FIG. 35B, while upon determining that not both flags are ON, the CPU 1401 terminates the image analysis processing (at a time of entry).

In S310, the CPU 1401 determines whether or not a plurality of suspicious persons are detected in the game arcade. More specifically, the CPU 1401 refers to the entering/exiting person management table, to designate and count the number of suspicious persons existing in the game arcade based on the entry time and exit time of each person for which the number of times of suspicious person detection is "1" or more. Upon determining that a plurality of suspicious persons are detected, the CPU 1401 proceeds to the processing of S311, while upon determining that a plurality of suspicious persons are not detected in the game arcade, the CPU 1401 proceeds to the processing of S314.

In S311, the CPU 1401 determines priority levels of the respective suspicious persons based on the number of times of suspicious person detection of each designated suspicious person. The CPU 1401 puts a higher priority level to a suspicious person with a larger number of times of suspicious person detection.

In S312, the CPU 1401 designates top ten persons (entering/exiting person identification numbers) with high priority levels.

In S313, the CPU 1401 sets the tracking identifier corresponding to each of the designated top ten persons to "1", and sets the other tracking identifiers to "0".

In S314, the CPU 1401 updates (for example, adds "1" to) the number of times of suspicious person detection corresponding to each suspicious person currently designated, and terminates the image analysis processing (at a time of entry).

The detection of a suspicious person is not limited to the one illustrated above. It may be conceivable that a person is designated as a suspicious person upon determination that a face area of the person is partially or fully covered with something.

For example, it may be conceivable that a person is designated as a suspicious person if the mask flag is ON. For example, it may be conceivable that a person is designated as a suspicious person if the sunglasses flag is ON. For example, it may be conceivable that a hat flag is set to ON upon detection of a hat in a face area, and a person is designated as a suspicious person if all of the mask flag, the sunglasses flag, and the hat flag are ON.

For example, the degree of suspiciousness may be adopted instead of the number of times of suspicious person detection. In such a configuration, first weighting (for example, "1") is put to the degree of suspiciousness when a mask is detected, second weighting (for example, "2") is put to the degree of suspiciousness when sunglasses are detected, and third weighting (for example, "5") is put to the degree of suspiciousness when a mask and sunglasses are detected. The greater the degree of suspiciousness is, the higher the priority level of the suspicious person is set.

In the above-described process, a suspicious person is detected based on image pickup information, and a predetermined number of (in this example, ten) persons can be tracked and monitored.

Figure 36A:
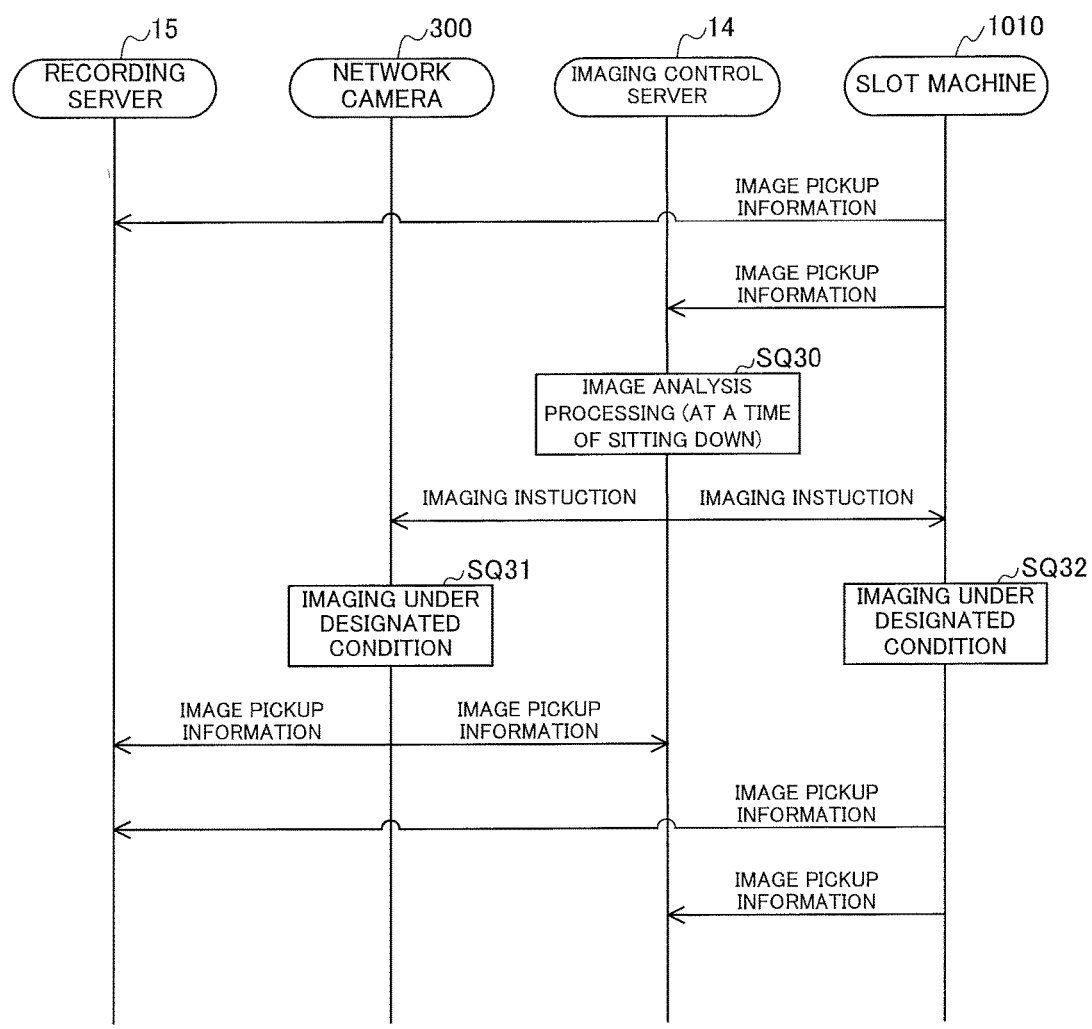
FIG. 36A shows a series of processes concerning the monitoring service.

FIG. 36A exemplifies a serial flow sequence of the monitoring service. With this sequence, a general flow of the monitoring service at a time when a person sits down on the slot machine 1010 or the like is described. In the monitoring service, the slot machine 1010 or the like transmits image pickup information to the imaging control server 14 and the recording server 15 at regular intervals.

Upon receiving image pickup information, the imaging control server 14 performs an image analysis processing (at a time of sitting down) (SQ30). In the image analysis processing (at a time of sitting down), a person sitting down on the slot machine 1010 or the like is imaged, the entering/exiting person management table is updated, and a monitor camera 5001 for imaging a suspicious person which is a monitoring object is optimized, though details will be given later. The imaging control server 14 transmits an imaging instruction to a monitor camera 5001 (a network camera 300, a slot machine 1010, or the like) that is designated after the optimization. In this example, a case where a network camera 300 and a slot machine 1010 are designated based on a captured image transmitted from the slot machine 1010 is illustrated as an example.

Upon receiving the imaging instruction, the network camera 300 performs imaging under a designated imaging condition (SQ31), and transmits image pickup information to the imaging control server 14 and the recording server 15.

Upon receiving the imaging instruction, the slot machine 1010 performs imaging under a designated imaging condition (SQ32), and transmits image pickup information to the imaging control server 14 and the recording server 15.

Figure 36B:
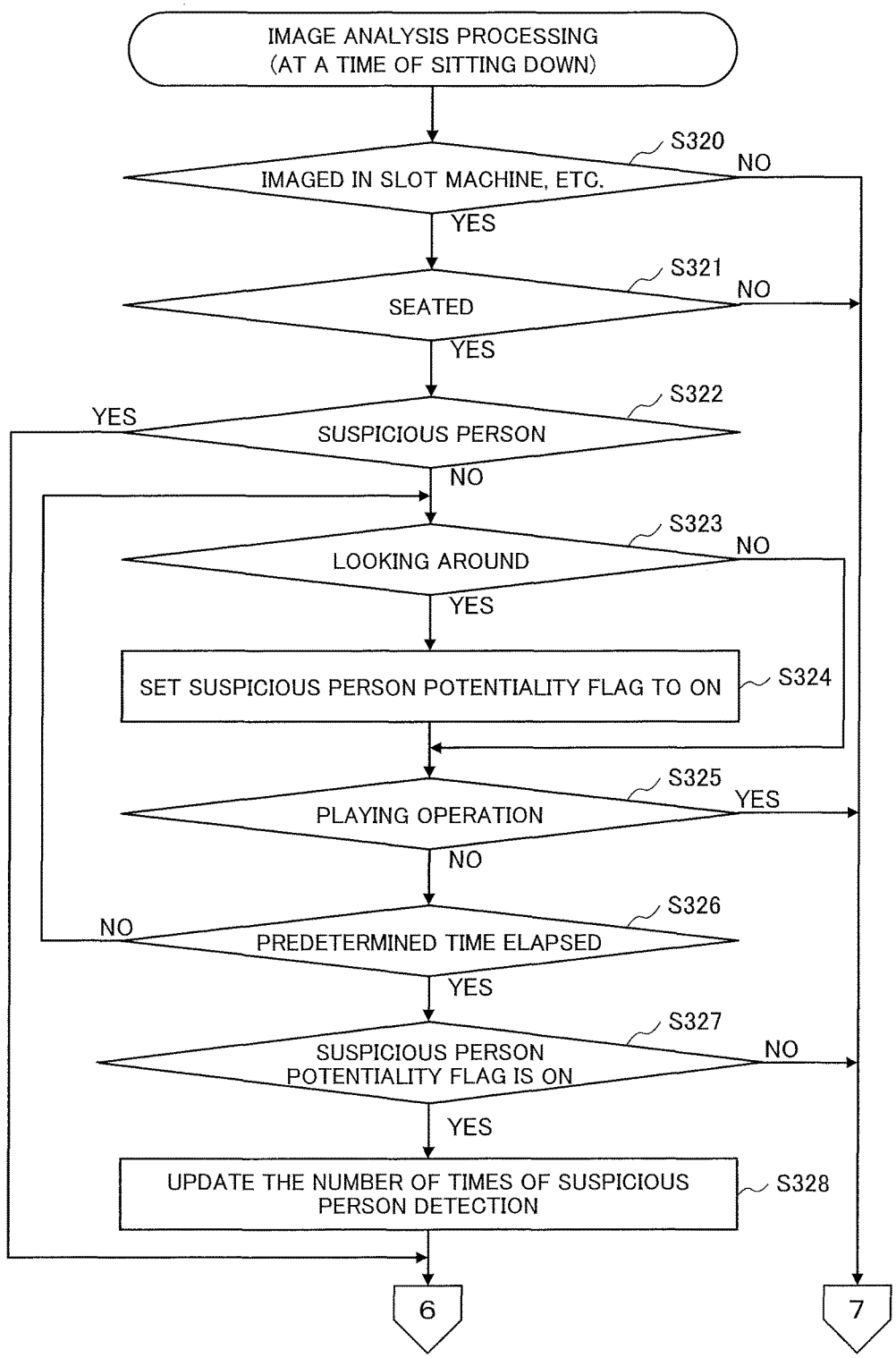
FIG. 36B exemplifies a flowchart of image analysis processing (at a time of sitting down)
Figure 36C:
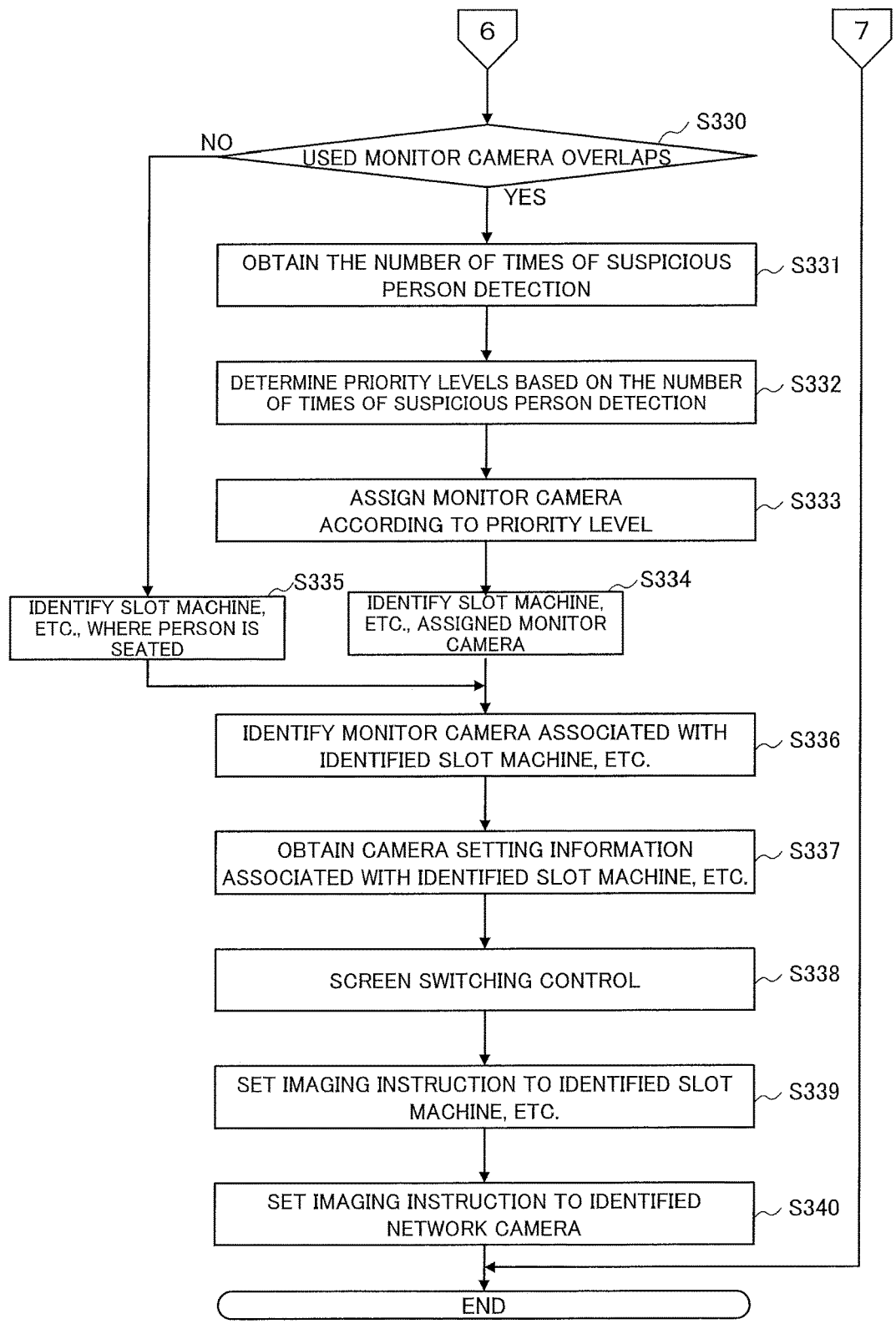
FIG. 36C exemplifies a flowchart of the image analysis processing (at a time of sitting down)

FIGS. 36B and 36C exemplify a flowchart of the image analysis processing (at a time of sitting down).

In S320, the CPU 1401 determines whether or not the received image pickup information has been captured by a slot machine 1010 or the like. Upon determining that the received image pickup information has been captured by a slot machine 1010 or the like, the CPU 1401 proceeds to the processing of S321, while upon determining that the received image pickup information has not been captured by the slot machine 1010 or the like, the CPU 1401 terminates the image analysis processing (at a time of sitting down).

In S321, the CPU 1401 determines whether or not a person is in a chair (whether or not a person is seated). For example, the CPU 1401 checks an image of the image pickup information against a pre-registered image of no person being in a chair, and determines whether or not the chair is detected for a predetermined period or longer (whether or not a person is seated). It may be also acceptable to provide a pressure sensor in a chair and make the determination based on presence or absence of an input signal from the pressure sensor. It may be also acceptable to provide a distance sensor in a slot machine 1010 or the like and make the determination based on presence or absence of an input signal from the distance sensor.

In S322, the CPU 1401 determines whether or not a seated person is a suspicious person. To be more specific, the CPU 1401 detects a face area in the image pickup information, calculates the positions of feature points of the face, normalizes the position, size, etc. of the face area by using the positions of the feature points, performs a matching process for matching against registered images, and identifies the entering/exiting person identification number of a matching image. Then, the CPU 1401 determines that the seated person is a suspicious person, if the number of times of suspicious person detection corresponding to the entering/exiting person identification number is equal to or more than a predetermined value (for example, one).

Upon determining that the seated person is a suspicious person, the CPU 1401 proceeds to the processing of S330 of FIG. 36C, while upon determining that the seated person is not a suspicious person, the CPU 1401 proceeds to the processing of S323.

In S323, the CPU 1401 determines whether or not a person sitting on the chair is restless and constantly looking around (whether or not the person is staring around) based on the image pickup information. Upon determining that the person is staring around, the CPU 1401 proceeds to the processing of S324, while upon determining that the person is not staring around, the CPU 1401 proceeds to the processing of S325.

In S324, the CPU 1401 sets a suspicious person potentiality flag to ON.

The determination of a suspicious person potentiality is not limited to the determination made in S323. For example, instead of or in addition to the above-described determination, the CPU 1401 may detect a hand area of a person sitting on a chair based on the image pickup information, and may set the suspicious person potentiality flag to ON upon determining that the hand area is in a predefined position (for example, in an unnatural position where a hand is normally not positioned) or upon determining that the hand area is in a predefined position for a predetermined period.

In S325, the CPU 1401 determines whether or not a playing operation (insertion of the IC card 1500, an operation of the BET button, an operation of the spin button, etc.) is performed. Upon determining that the playing operation is performed, the CPU 1401 terminates the image analysis processing (at a time of sitting down), while upon determining that the playing operation is not performed, the CPU 1401 proceeds to the processing of S326.

In S326, the CPU 1401 determines whether or not a predetermined time (for example, one minute) has elapsed since the person sat down. Upon determining that the predetermined time has elapsed, the CPU 1401 proceeds to the processing of S327, while upon determining that the predetermined time has not elapsed, the CPU 1401 proceeds to the processing of S323.

In S327, the CPU 1401 determines whether or not the suspicious person potentiality flag is ON. Upon determining that the suspicious person potentiality flag is ON, the CPU 1401 proceeds to the processing of S328, while upon determining that the suspicious person potentiality flag is not ON, the CPU 1401 terminates the image analysis processing (at a time of sitting down).

In S328, the CPU 1401 updates (for example, adds "1" to) the number of times of suspicious person detection corresponding to the suspicious person currently designated, and proceeds to the processing of S330 shown in FIG. 36C.

In S330, the CPU 1401 determines whether or not a monitor camera 5001 for imaging the seated suspicious person is in use. More specifically, the CPU 1401 refers to the monitor camera management table, to identify a monitor camera 5001 associated with the slot machine 1010. The CPU 1401 also refers to the used monitor camera management table, to determine whether or not the identified monitor camera 5001 is in use. The number of monitor cameras 5001 identified may be sometimes one, and sometimes two or more.

In S331, the CPU 1401 obtains the number of times of suspicious person detection corresponding to the suspicious person who is imaged by the determined monitor camera 5001. More specifically, the CPU 1401 refers to the entering/exiting person management table, to identify the entering/exiting person identification number based on the apparatus identification code of the slot machine 1010 or the like where the person is seated, and obtains the number of times of suspicious person detection.

In S332, the CPU 1401 determines the priority level of each suspicious person based on the number of times of suspicious person detection corresponding to each identified suspicious person. The CPU 1401 puts a higher priority level to a suspicious person with a larger number of times of suspicious person detection.

In S333, the CPU 1401 assigns monitor cameras 5001 in accordance with the priority levels. While the CPU 1401 assigns a monitor camera 5001 to a suspicious person with a higher priority level, the CPU 1401 stops imaging a suspicious person assigned no monitor camera 5001 (transmits an imaging instruction to all the monitor cameras 5001 that are imaging the suspicious person, the instruction instructing to switch imaging conditions of all the monitor camera 5001 into a normal imaging condition).

In S334, the CPU 1401 identifies a slot machine 1010 or the like where a suspicious person assigned a monitor camera 5001 is seated.

In S335, the CPU 1401 identifies a slot machine 1010 or the like where a suspicious person is seated.

In the above-described process, if a plurality of suspicious persons are detected, a suspicious person with a larger number of times of suspicious person detection (with a higher priority level) is preferentially imaged, which enables efficient imaging of a fraud person.

Since processing of S336 to S340 is similar to processing of S201 to S206, descriptions thereof are omitted.

In the above-described process, imaging is started when a suspicious person is seated. In the above-described process, for example, if a suspicious person commits a fraud, a series of fraud-related operations is imaged before, during, and after the fraud. This enables appropriate imaging of the fraud person.

Figure 37:
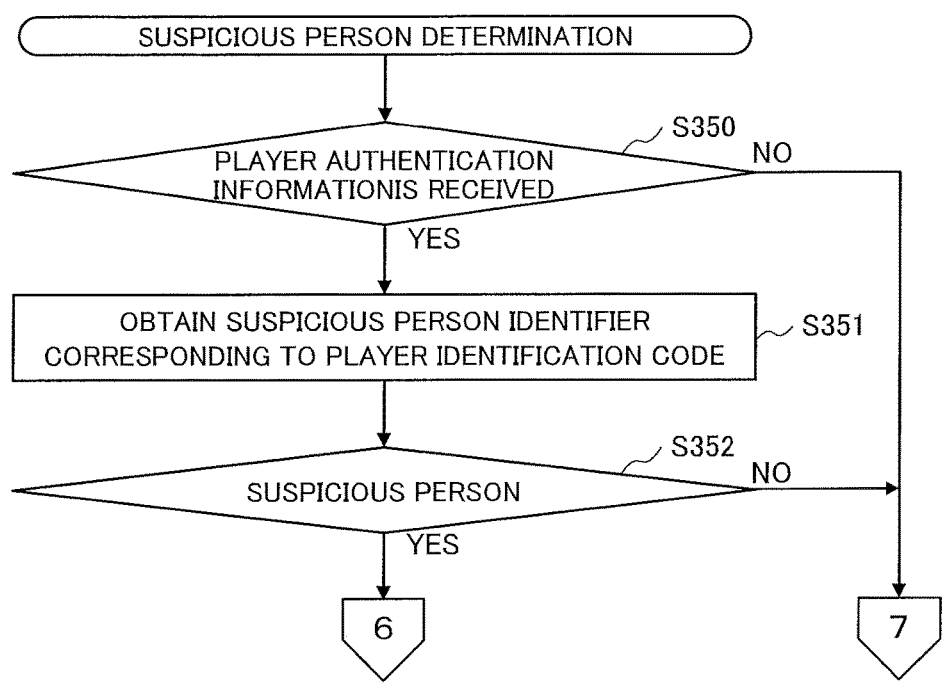
FIG. 37 exemplifies a flowchart of a suspicious person determination.

FIG. 37 exemplifies a flowchart of a suspicious person determination. The suspicious person determination is triggered by a player authentication (IC card authentication, facial authentication, etc.) which is performed when an IC card 1500 is inserted, when a person is seated, or the like.

In this monitoring service, at a time when the number of times of suspicious person detection is updated, the face image is checked to identify the player, and the suspicious person identifier of the player management table is set to "1".

In S350, the CPU 1401 determines whether or not player authentication information is received from the slot machine 1010 or the like or the hall management server 10. Upon determining that player authentication information is received, the CPU 1401 proceeds to the processing of S351, while upon determining that player authentication information is not received, the CPU 1401 terminates the suspicious person determination.

In S351, the CPU 1401 refers to the player management table, to obtain a suspicious person identifier corresponding to a player identification code included in the player authentication information.

In S352, the CPU 1401 determines whether or not a player of the player authentication is a suspicious person (whether or not the suspicious person identifier is "1"). Upon determining that the player is a suspicious person, the CPU 1401 proceeds to the processing of S330 shown in FIG. 36C, while upon determining that the player is not a suspicious person, the CPU 1401 terminates the suspicious person determination.

In the above-described process, when a player is seated, player authentication is performed. At this time, upon determination that the player is a suspicious person, imaging under a predefined imaging condition is started, and if the player commits a fraud, a series of fraud-related operations is imaged before, during, and after the fraud. This enables appropriate imaging of the fraud person.

Figure 38:
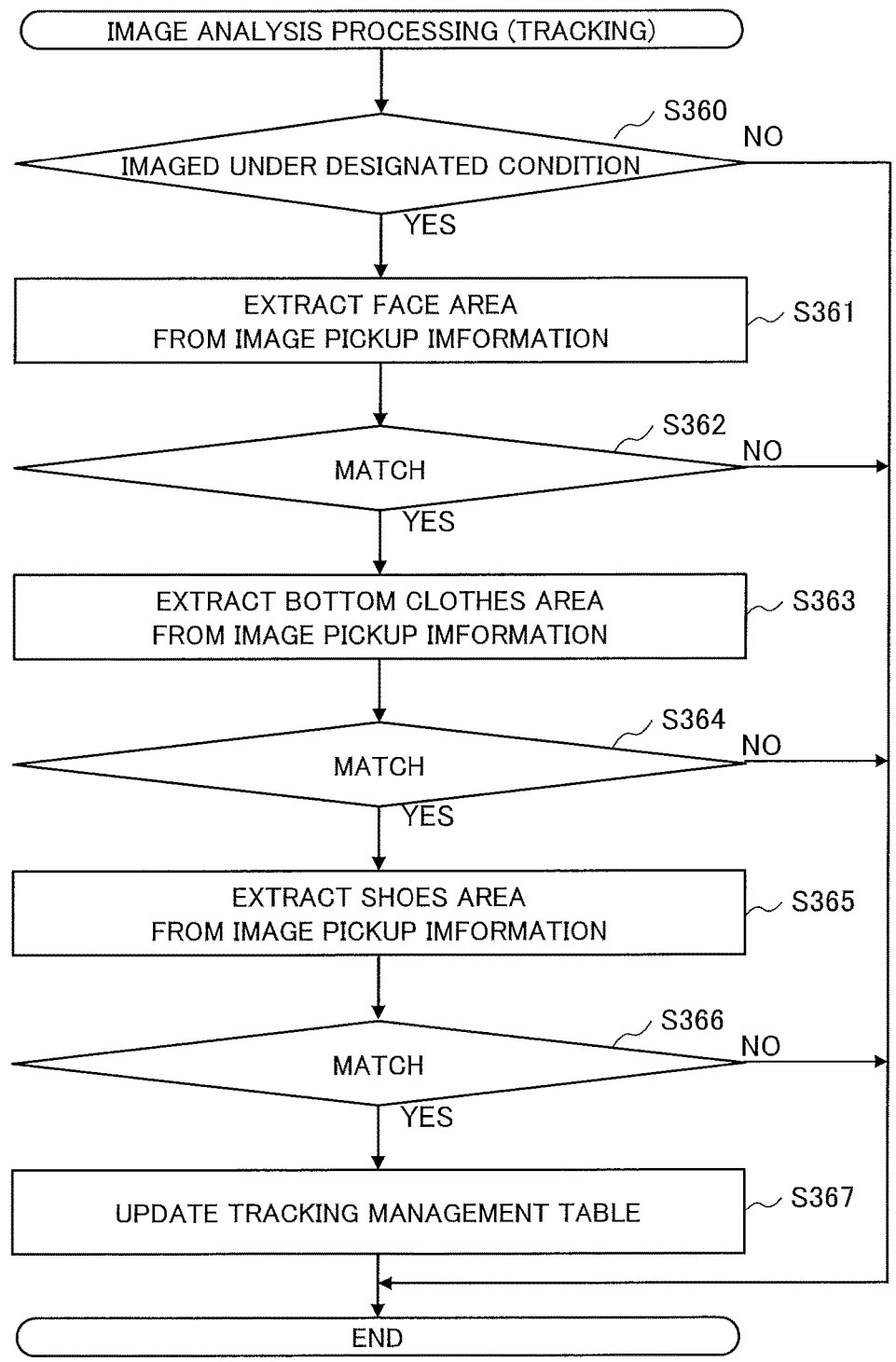
FIG. 38 exemplifies a flowchart of image analysis processing (tracking).

FIG. 38 exemplifies a flowchart of an image analysis processing (tracking).

In S360, the CPU 1401 determines whether or not the image is an image captured under a pre-designated imaging condition. In this monitoring service, a monitor camera 5001 used for tracking a suspicious person (for example, a monitor camera 5001 provided at one end of a passage and capable of taking a frontal photograph of a person moving in the passage) and an imaging condition are pre-designated (set). The monitor camera 5001 used for tracking a suspicious person performs imaging in real-time, at regular intervals, or upon detection of human movement, and transmits image pickup information to the imaging control server 14 and the recording server 15.

Upon determining that the image is an image captured under the pre-designated imaging condition, the CPU 1401 proceeds to the processing of S361, while upon determining that the image is not an image captured under the pre-designated imaging condition, the CPU 1401 terminates the image analysis processing (tracking).

In S361, the CPU 1401 extracts a face area from the image pickup information.

In S362, the CPU 1401 determines whether or not a face image matches. More specifically, the CPU 1401 refers to the entering/exiting person management table, performs a matching process for matching a face image obtained after normalizing the position, size, etc. of the extracted face area against a face image registered with respect to each suspicious person whose tracking identifier is "1", and if the degree of similarity (such as the distance between vectors in a feature space) exceeds a threshold value, determines that the face images of both persons match, and obtains the entering/exiting person identification number.

Upon determining that the face images match, the CPU 1401 proceeds to the processing of S363, while upon determining that the face images do not match, the CPU 1401 terminates the image analysis processing (tracking).

In S363, the CPU 1401 extracts a bottom clothes area from the image pickup information.

In S364, the CPU 1401 determines whether or not a bottom clothes image matches. More specifically, the CPU 1401 refers to the entering/exiting person management table, performs a matching process for matching a bottom clothes image obtained after normalizing the position, size, etc. of the extracted bottom clothes area against a bottom clothes image corresponding to the obtained entering/exiting person identification number, and if the degree of similarity (such as the percentage of color matching of a segmentalized area) exceeds a threshold value, determines that the bottom clothes images of both persons match. Here, weighting may be put in accordance with the area dimensions of the segmentalized area.

Upon determining that the bottom clothes images match, the CPU 1401 proceeds to the processing of S365, while upon determining that the bottom clothes images do not match, the CPU 1401 terminates the image analysis processing (tracking).

In S365, the CPU 1401 extracts a shoes area from the image pickup information.

In S366, the CPU 1401 determines whether or not a shoes image matches. More specifically, the CPU 1401 refers to the entering/exiting person management table, performs a matching process for matching a shoes image obtained after normalizing the position, size, etc. of the extracted shoes area against a shoes image corresponding to the obtained entering/exiting person identification number, and if the degree of similarity (such as the percentage of color matching of a segmentalized area) exceeds a threshold value, determines that the shoes images of both persons match. Here, weighting may be put in accordance with the area dimensions of the segmentalized area.

Upon determining that the shoes images match, the CPU 1401 proceeds to the processing of S367, while upon determining that the shoes images do not match, the CPU 1401 terminates the image analysis processing (tracking).

In S367, the CPU 1401 updates the tracking management table. More specifically, the CPU 1401 adds tracking information corresponding to the obtained entering/exiting person management number.

The above-described example illustrates the configuration in which the tracking management table is updated if matching is obtained in all of the face area, the bottom clothes area, and the shoes area. This, however, is not limiting. For example, a configuration may also be adoptable in which: normalization is performed such that the face area, the bottom clothes area, and the shoes area have the same scale; weighting is put and summed; and if the sum exceeds a threshold value, the tracking management table is updated.

The configurations illustrated in the first and second embodiments may be combined as appropriate.

In the following, the configurations of the above embodiments are described from different aspects.

In a game arcade such as a casino, a fraud in which a fake playing chip is used on a table game, a fraud in which a radio wave transmitter is used to transmit a high-intensity radio wave to a gaming machine to forcibly provoke a jackpot or make medals paid out, and the like, may be committed. To find and prevent a fraud, the game arcade adopts various kinds of monitor devices, monitor systems, and the like, to check whether or not unauthorized behaviors, unauthorized wins and losses, unauthorized cash flows, etc., are occurring.

Recently, a technique is disclosed that enables a fraud to be found by monitoring player's behaviors with a camera provided in a game table device (specification of U.S. Pat. No. 8,506,401).

This however involves a problem that, even though a player's fraud can be imaged by such a technique, a player who has committed a fraud cannot be dealt with or caught if the player leaves the game table device.

The following configurations are accomplished in view of the problem described above, and an object thereof is to provide an imaging system that appropriately images a fraud person.

(Supplemental Notes A)

In a first aspect of the above embodiments, an imaging system (the imaging system 2000, the game system 1, the monitoring system 5000, the monitoring system 5100, the monitoring system 5200, etc.) includes:

a gaming machine (the gaming machine 2050, the slot machine 1010, the game table device 1020, etc.) provided in a facility, the gaming machine including an imager (the information reading device 2040, the camera 2045, the human body detection camera 1713, etc.);

an imaging device (the imaging device 2060, the network camera 300, the camera device 306, etc.) provided in the facility and operable to image the gaming machine; and an information processing device (the information processing device 2030, the imaging control server 14, the integrated server 18, the image analysis server 16, etc.) communicable with the gaming machine and the imaging device, the imager operable to image a person existing in front of the gaming machine, the information processing device operable to, upon obtaining fraud-related information concerning a fraud in the gaming machine (upon receiving abnormality detection information or upon determining that a suspicious person is seated), instruct the imaging device (for example, perform the imaging pattern designation process, perform the image analysis processing (at a time of sitting down), etc.) to perform imaging under a predefined imaging condition that covers surroundings of the gaming machine.

In the above-described configuration, a person existing in front of a slot machine is imaged. In addition, if fraud-related information concerning a fraud in this slot machine is obtained, imaging is performed so as to cover surroundings of the gaming machine.

In the above-described configuration, the imager images operations of the person existing in front of the gaming machine, and the imaging device performs imaging so as to cover the surroundings of the gaming machine. Accordingly, when a fraud is committed, details of the fraud and operations such as hiding a device used in the fraud can be recognized. This enables surroundings (scene) of a person (fraud person) committing the fraud to be recognized. Even if, for example, the fraud person is leaving, the direction of his/her escape can be recognized because the surroundings are imaged.

In the above-described configuration, therefore, local imaging using the imager and global imaging using the imaging device are performed in cooperation, to enable appropriate imaging of the fraud person.

For example, the above-described configuration which enables appropriate imaging of the fraud person is able to reduce the burden on the imaging system.

In the imaging system, further, upon determining that a fraud is committed in the gaming machine, the information processing device instructs the gaming machine to image a hand area of the person (the processing of S204, etc.).

In the above-described configuration, the imager images the hand area of the person.

In general, if a person who is committing a fraud notices a monitor camera, the person tries to hinder the monitor camera from imaging the fraud. For example, when a plurality of persons are committing a fraud, a situation sometimes occurs in which one person commits a fraud while the other persons make a wall by standing between the one person and the monitor camera and spreading their clothes like a bat so as to prevent the fraud from being imaged.

In such a situation, the above-described configuration which is able to image the hand area of the person with the imager provided in the gaming machine enables appropriate imaging of the fraud.

In the imaging system, further, upon determining that the imager is not able to image the hand area of the person, the information processing device instructs the imaging device to image the hand area of the person (the processing of S212 to S217, etc.)

In the above-described configuration, when the imager is not able to image the hand area of the person, the imaging device performs imaging.

In the above-described configuration, even when, for example, the hand area of the person exists on a side of the gaming machine and cannot be imaged by the imager, the imaging device performs imaging. This enables appropriate imaging of the fraud person.

In the imaging system, further, a plurality of gaming machines (the gaming machine 2050, the slot machine 1010, the game table device 1020, etc.) including the gaming machine are provided in the facility, a plurality of imaging devices (the imaging device 2060, the monitor camera 5001, the network camera 300, the signage 100, the kiosk terminal 200, the camera device 306, etc.) including the imaging device are provided in the facility, and upon determining that there is a suspicious person in the facility based on imaging information of an image captured by each of the plurality of imaging devices and that the suspicious person is seated on one of the plurality of gaming machines, the information processing device instructs an imaging device associated with the one gaming machine to perform imaging under a predefined imaging condition (the image analysis processing (at a time of sitting down), etc.).

In the above-described configuration, a suspicious person is detected based on imaging information of the plurality of imaging devices provided in the facility, and if the suspicious person is seated on a gaming machine, an imaging device associated with this gaming machine performs imaging.

Here, there are various tricks of frauds. In one of the tricks, for example, a person (preparing person) who has put a large number of bonus games into a gaming machine by using an instrument leaves the gaming machine immediately, and then a hitter person who is empty handed sits down on the gaming machine and consumes the stock of bonus games. In this trick, there is no evidence unless the moment when the preparing person is committing a fraud is clearly recorded on a video. Moreover, the preparing person leaves immediately after completing the preparation. It is therefore necessary to sense an abnormality fast and image all the ins and outs of a fraud.

In this respect, the above-described configuration, in which imaging is started when a suspicious person is seated and if the suspicious person commits a fraud, a series of fraud-related operations is imaged before, during, and after the fraud, enables appropriate imaging of the fraud person.

In the imaging system, further, a plurality of gaming machines (the gaming machine 2050, the slot machine 1010, the game table device 1020, etc.) including the gaming machine are provided in the facility, a plurality of imaging devices (the imaging device 2060, the monitor camera 5001, the network camera 300, the signage 100, the kiosk terminal 200, the camera device 306, etc.) including the imaging device are provided in the facility, and upon determining that a player is seated on one of the plurality of gaming machines and that the player is a suspicious person based on a predetermined list (the player management table, etc.) at a time of authentication (the facial authentication, authentication using the IC card 1500, etc.) of the player (S350 to S352, etc.), the information processing device instructs an imaging device associated with the one gaming machine to perform imaging under a predefined imaging condition (S330 to S334, etc.).

In the above-described configuration, at a time of authentication of the player, whether or not the player is a suspicious person is determined. If it is determined that the player is a suspicious person, an imaging device associated with the one gaming machine where the player is seated performs imaging.

Here, there are various tricks of frauds. It is important to sense an abnormality fast and image a fraud.

In this respect, the above-described configuration, in which imaging is started when a player who is a suspicious person is seated and if the suspicious person commits a fraud, a series of fraud-related operations is imaged before, during, and after the fraud, enables appropriate imaging of the fraud person.

In the imaging system, further, the information processing device instructs an imaging device associated with the one gaming machine to perform imaging so as to cover surroundings of the one gaming machine (S336 to S340, etc.).

In the above-described configuration, the imager images an operation of a person seated on a gaming machine, and the imaging device associated with the gaming machine performs imaging that covers surroundings of the gaming machine. Accordingly, details of a fraud and operations such as hiding a device used in the fraud can be recognized from many aspects. This enables surroundings (scene) of a person (fraud person) committing the fraud to be recognized in details. Even if, for example, the fraud person is leaving, the direction of his/her escape can be recognized because the surroundings are imaged.

In the above-described configuration, local imaging using the imager and global imaging using the imaging device are performed in cooperation, to enable appropriate imaging of the fraud person.

(Supplemental Notes B)

In a second aspect of the above embodiments, an imaging system (the imaging system 2000, the game system 1, the monitoring system 5000, the monitoring system 5100, the monitoring system 5200, etc.) includes:

a gaming machine (the gaming machine 2050, the slot machine 1010, the game table device 1020, etc.) including an imager (the information reading device 2040, the camera 2045, the human body detection camera 1713, etc.); and an information processing device (the information processing device 2030, the imaging control server 14, the integrated server 18, the image analysis server 16, etc.) communicable with the gaming machine and an imaging device (the imaging device 2060, the network camera 300, the camera device 306, etc.) operable to image the gaming machine, the imager operable to image a person existing in front of the gaming machine, the information processing device operable to, upon determining that a fraud is committed in the gaming machine (for example, upon receiving an abnormality detection information), instruct (perform the imaging pattern designation process on) the imaging device to perform imaging under a predefined imaging condition that covers surroundings of the gaming machine.

In the imaging system, further, the imager images a hand area of the person (for example, performs imaging under an imaging condition (setting file) of a slot machine 1010 or the like obtained in S202).

In the imaging system, upon determining that the person is leaving the gaming machine, the information processing device instructs the imager to perform zoom-out imaging (the processing of S218, S219, etc.).

In the imaging system, further, upon determining that the person is leaving the gaming machine, the imager performs zoom-out imaging (the processing of S218, S219, etc.).

In the above-described configuration, even in a situation where, for example, the field of view of the imaging device is obstructed by an accomplice of the fraud person, the imager zooms out so that surroundings are imaged, which allows the direction of escape of the fraud person to be recognized, thus enabling appropriate imaging of the fraud person.

The imaging system further includes another imaging device operable to image the gaming machine, wherein upon determining that the imaging device is not able to image a hand area of the person, the information processing device instructs said another imaging device to image a hand area of the person (the processing of S212 to S217, etc.).

In the above-described configuration, even in a situation where the field of view of the imaging device is obstructed by an accomplice of the fraud person so that the imaging device is not able to perform imaging, another imaging device performs imaging, thus enabling appropriate imaging of the fraud person.

The imaging system further includes a plurality of imaging devices associated with the imaging device, wherein upon determining that the person is going out of the field of view of the imaging device, the information processing device instructs each of the plurality of imaging devices to perform imaging under a predefined imaging condition (the processing of S224 to S229, etc.).

In the above-described configuration, for example, if a fraud person turns a passage and goes out of the field of view of the imaging device, surrounding imaging devices perform imaging.

In the above-described configuration, an imaging device that performs imaging is changed in accordance with movement of the fraud person, which allows the fraud person to be tracked, thus enabling appropriate imaging of the fraud person.

Another imaging device operable to image the gaming machine is further provided, and upon determining that a fraud is committed in the gaming machine, the information processing device instructs said another imaging device to perform imaging under a predefined imaging condition (the processing of S200 to S205, etc.).

In the above-described configuration, if it is determined that a fraud is committed in the gaming machine, another imaging device performs imaging, too.

In the above-described configuration, the fraud person is imaged under various imaging conditions, which enables more appropriate imaging of the fraud person.

The imaging system further includes a storage device (the storage 2033, the storage 2063, the recording server 15, etc.) that stores imaging information of an image captured by the imager.

The imaging system further includes a storage device (the storage 2033, the storage 2063, the recording server 15, etc.) that stores imaging information of an image captured by the imaging device.

In the above-described configuration, for example, a video image related to a fraud can be reproduced for checking.

In the imaging system, the information processing device identifies an imaging device that is imaging the person among the plurality of imaging devices, and instructs the other imaging devices to terminate imaging under the predefined imaging condition (the processing of S224 to S229, etc.).

In the imaging system, the imaging device performs zoom-out imaging such that the percentage of an imaging range occupied by the person is lower than a predetermined percentage (the processing of S202, S222, S228, etc.).

(Supplemental Notes C)

In a third aspect of the above embodiments, an imaging system (the imaging system 2000, the game system 1, the monitoring system 5000, the monitoring system 5100, the monitoring system 5200, etc.) includes:

a plurality of gaming machines (the gaming machine 2050, the slot machine 1010, the game table device 1020, etc.) provided in a facility; and an information processing device (the information processing device 2030, the imaging control server 14, the integrated server 18, the image analysis server 16, etc.) operable to determine whether or not there is a suspicious person in the facility (for example, whether or not a person wears a mask and sunglasses, whether or not a person is nervous about surroundings, or whether or not a person puts his/her hand on an obviously strange place), based on the imaging information of the image captured by each of the plurality of imaging devices (the imaging device 2060, the monitor camera 5001, the network camera 300, the signage 100, the kiosk terminal 200, the camera device 306, etc.) provided in the facility, upon determining that there is a suspicious person in the facility and that the suspicious person is seated on one of the plurality of gaming machines, the information processing device instructs an imaging device associated with the one gaming machine to perform imaging under a predefined imaging condition (the image analysis processing (at a time of sitting down), etc.).

In the imaging system, further, upon determining that another suspicious person different from the suspicious person is seated on another gaming machine and that said another gaming machine and the gaming machine are associated with the same imaging device, the information processing device instructs the imaging device associated with said another gaming machine to perform imaging under a predefined imaging condition if it is determined that said another suspicious person has a higher priority level based on predefined imaging priority levels (S330 to S334, etc.).

In the above-described configuration, if a plurality of suspicious persons are detected, a suspicious person with a higher priority level is imaged, which enables efficient imaging of a fraud person.

In the imaging system, further, each of the plurality of gaming machines includes an imager (the information reading device 2040, the camera 2045, the human body detection camera 1713, etc.), the information processing device determines whether or not there is a suspicious person in the facility, based on imaging information of images captured by the respective imagers of the plurality of gaming machines (S320 to S322, etc.).

(Supplemental Notes D)

In a fourth aspect of the above embodiments, an imaging system (the imaging system 2000, the game system 1, the monitoring system 5000, the monitoring system 5100, the monitoring system 5200, etc.) includes:

a plurality of gaming machines (the gaming machine 2050, the slot machine 1010, the game table device 1020, etc.) provided in a facility; and an information processing device (the information processing device 2030, the imaging control server 14, the integrated server 18, the image analysis server 16, etc.) communicable with a plurality of imaging devices (the imaging device 2060, the monitor camera 5001, the network camera 300, the signage 100, the kiosk terminal 200, the camera device 306, etc.) provided in the facility, the information processing device operable to determine whether or not a player is included in suspicious persons of a predetermined list (the player management table, etc.), the information processing device operable to, upon determining that a player playing on one of the plurality of gaming machines is a suspicious person at a time of authentication (the facial authentication, authentication using the IC card 1500, etc.) of the player (S350 to S352, etc.), instruct the imaging device associated with the one gaming machine to perform imaging under a predefined imaging condition (S330 to S334, etc.).

In the imaging system, further, upon determining that another player is seated on another gaming machine different from the one gaming machine, that said another player is an object suspicious person, and that said another gaming machine and the gaming machine are associated with the same imaging device, the information processing device instructs the imaging device associated with said another gaming machine to perform imaging under a predefined imaging condition if it is determined that said another player has a higher priority level based on predefined imaging priority levels (S330 to S334, etc.).

In the above-described configuration, if a plurality of object suspicious persons are detected nearby, an object suspicious person with a higher priority level is imaged, which enables efficient imaging of a fraud person.

In the imaging system, further, at a time of authenticating a player, the information processing device determines whether or not the player is included in object suspicious persons of the predetermined list.

In the imaging system described in Supplemental Notes B and Supplemental Notes C, further, each of the plurality of gaming machines includes an imager (the information reading device 2040, the camera 2045, the human body detection camera 1713, etc.), the imager of one gaming machine images a person existing in front of the one gaming machine, and upon determining that a fraud is committed in the one gaming machine, the information processing device instructs the imaging device to perform imaging under a predefined imaging condition that covers surroundings of the one gaming machine (S336 to S340, etc.).

In the imaging system described in Supplemental Notes B and Supplemental Notes C, further, the priority level is set in accordance with the number of times a fraud was reported (S332, etc.).

The above-described imaging system (or an information processing device, the imaging control device, an imaging control method, etc.) is applicable not only to a game arcade as exemplified by a casino but also to a facility with a game arcade, such as a hotel, an airport, a station, a shopping mall, a fueling station capable of supplying a fuel such as gasoline, a restaurant, or a movie theater as well as a complex facility where a plurality of facilities are collected.

The embodiments described above merely illustrate specific examples of the present invention, and should not be construed to put any particular limitations on the present invention. Specific structures of the units, etc. may be suitably designed or modified. Furthermore, the effects of the present invention described in the above embodiments are not more than examples of most preferable effects achievable by the present invention. The effects of the present invention are not limited to those described in the above embodiments.

The detailed descriptions above are mainly focused on characteristic parts, for easier understanding of the present invention. The present invention is not limited to the embodiments illustrated in the detailed description above, and is applicable to other embodiments. A diversity of applications can be made. In addition, the terms and phraseology used in the present specification are adopted solely to provide an appropriate illustration of the present invention, and in no case should be construed to limit the interpretation of the present invention. Moreover, other configurations, systems, methods, etc. covered by the concept of the present invention could be easily envisioned by those skilled in the art based on the concept of the invention described in this specification. The description of claims therefore shall encompass configurations equivalent to the present invention without departing from the technical idea of the present invention. Furthermore, the abstract is provided for the purpose of allowing, for example, the Patent Office, public institutions, engineers in the art who are not fully familiarized with patents, legal terminology, or technical terminology to quickly determine the technical features of the present application and essences thereof through a simple investigation. The abstract is therefore not intended to limit the scope of the invention which shall be construed on the basis of the description of the claims. To fully understand the object of the present invention and effects unique to the present invention, it is encouraged to sufficiently refer to disclosures of documents already made available.

The detailed description of the present invention provided hereinabove includes a process executed on a computer. The above descriptions and expressions are provided to allow the one skilled in the art to most efficiently understand the present invention. In the present specification, respective steps performed to yield one result shall be understood as a process with no self-contradiction. In addition, electrical or magnetic signals are transmitted/received or recorded in respective steps. It should be noted that, in processing of each step, such a signal is expressed in the form of bits, values, symbols, characters, terms, numbers, etc., which are adopted merely for the purpose of convenience of description. Although processing of each step may be sometimes expressed as if it is a human behavior, processing described in this specification is in principle executed by devices. Furthermore, other configurations required for executing each step are obvious from the descriptions given above.

What is claimed is:

1. An imaging system comprising:
 a gaming machine provided in a facility and including an imager;
 an imaging device provided in the facility, which imaging device is remote from and oriented toward or configured to be oriented toward the gaming machine and is operable to image the gaming machine and surroundings of the gaming machine; and
 an information processing device communicable with the gaming machine and the imaging device, which information processing device includes a CPU,
 the imager operable to image a person existing in front of the gaming machine,
 the CPU being programmed to, upon obtaining information concerning a fraud in the gaming machine, instruct the imaging device to perform imaging under a predefined imaging condition that covers the surroundings of the gaming machine while the imager is imaging the person existing in front of the gaming machine, wherein the CPU is further programmed to determine whether a fraud is committed in the gaming machine and, upon determining that a fraud is committed in the gaming machine, to cause the information processing device to instruct the gaming machine to image a hand area of the person; and wherein the CPU is further programmed to determine whether the imager is able to image a hand area of the person and, upon determining that the imager is not able to image the hand area of the person, to cause the information processing device to instruct the imaging device to image the hand area of the person.

2. The imaging system according to claim 1, further comprising another imaging device operable to image the gaming machine, wherein the CPU is further programmed to cause, upon determining that the imaging device is not able to image the hand area of the person, the information processing device to instruct said another imaging device to image the hand area of the person.

3. The imaging system according to claim 1, further comprising another imaging device operable to image the gaming machine, wherein the CPU is further programmed to, upon determining that a fraud is committed in the gaming machine, cause the information processing device to instruct said another imaging device to perform imaging under a predefined imaging condition.

4. An imaging system comprising:

a gaming machine provided in a facility and including an imager;

an imaging device provided in the facility, which imaging device is remote from and oriented toward or configured to be oriented toward the gaming machine and is operable to image the gaming machine and surroundings of the gaming machine; and an information processing device communicable with the gaming machine and the imaging device, which information processing device includes a CPU, the imager operable to image a person existing in front of the gaming machine, the CPU being programmed to, upon obtaining information concerning a fraud in the gaming machine, instruct the imaging device to perform imaging under a predefined imaging condition that covers the surroundings of the gaming machine while the imager is imaging the person existing in front of the gaming machine, wherein the CPU is further programmed to determine whether the person existing in front of the gaming machine is leaving the gaming machine and, upon determining that the person is leaving the gaming machine, to cause the information processing device to instruct the imager to perform zoom-out imaging.

5. An imaging system comprising:

a gaming machine provided in a facility and including an imager;

a plurality of imaging devices provided in the facility, which imaging devices are remote from and oriented toward or configured to be oriented toward the gaming machine and are operable to image the gaming machine and surroundings of the gaming machine; and an information processing device communicable with the gaming machine and the imaging devices, which information processing device includes a CPU, the imager operable to image a person existing in front of the gaming machine, the CPU being programmed to, upon obtaining information concerning a fraud in the gaming machine, instruct the imaging device to perform imaging under a predefined imaging condition that covers the surroundings of the gaming machine while one of the imagers is imaging the person existing in front of the gaming machine, wherein the CPU is further programmed to determine whether the person existing in front of the gaming machine is going out of the field of view of the imaging device and, upon determining that the person existing in front of the gaming machine is going out of the field of view of the imaging device, to cause the information processing device to instruct each of the plurality of imaging devices to perform imaging under a predefined imaging condition.

6. An imaging system comprising:

a plurality of gaming machine provided in a facility and including an imager;

an imaging device provided in each of the plurality of gaming machines provided in the facility and operable to image the respective gaming machine; and an information processing device communicable with the gaming machine and the imaging device, the imager operable to image a person existing in front of the gaming machine, the information processing device operable to, upon obtaining information concerning a fraud in the gaming machine, instruct the imaging device to perform imaging under a predefined imaging condition that covers the surroundings of the gaming machine;

wherein upon determining that a player is seated on one of the plurality of gaming machines and that the player is a suspicious person based on a predetermined list at a time of authenticating the player, the information processing device instructs an imaging device associated with the one gaming machine to perform imaging under a predefined imaging condition; and upon determining that another suspicious person different from the suspicious person is seated on another gaming machine and that said another gaming machine and the gaming machine are associated with the same imaging device, the information processing device instructs the imaging device associated with said another gaming machine to perform imaging under a predefined imaging condition if it is determined that said another suspicious person has a higher priority level based on predefined imaging priority levels.

* * * * *